US007555009B2

(12) United States Patent
Oshima

(10) Patent No.: US 7,555,009 B2
(45) Date of Patent: Jun. 30, 2009

(54) DATA PROCESSING METHOD AND APPARATUS, AND DATA DISTRIBUTION METHOD AND INFORMATION PROCESSING APPARATUS

(75) Inventor: Hajime Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 10/986,108

(22) Filed: Nov. 12, 2004

(65) Prior Publication Data

US 2005/0105555 A1 May 19, 2005

(30) Foreign Application Priority Data

Nov. 14, 2003 (JP) ............................. 2003-385190
Nov. 14, 2003 (JP) ............................. 2003-385191
Nov. 5, 2004 (JP) ............................. 2004-321444

(51) Int. Cl.
*H04J 3/16* (2006.01)

(52) U.S. Cl. ........................ 370/467; 370/466; 370/509

(58) Field of Classification Search ................. 370/466, 370/467, 509

See application file for complete search history.

(56) References Cited

U.S. PATENT DOCUMENTS

| | | | | |
|---|---|---|---|---|
| 6,211,800 | B1 | 4/2001 | Yanagihara et al. | 341/50 |
| 6,717,952 | B2 | 4/2004 | Jones et al. | 370/465 |
| 7,054,920 | B2 * | 5/2006 | Aoki et al. | 709/218 |
| 2006/0168290 | A1 * | 7/2006 | Doron | 709/231 |

FOREIGN PATENT DOCUMENTS

| | | |
|---|---|---|
| JP | 10-154373 | 6/1998 |
| JP | 2003-030099 A | 1/2003 |
| JP | 2003-114845 | 4/2003 |
| JP | 2004-505519 | 2/2004 |
| WO | 02/058388 A1 | 7/2002 |

* cited by examiner

*Primary Examiner*—Jason E Mattis
(74) *Attorney, Agent, or Firm*—Fitpatrick, Cella, Harper & Scinto

(57) ABSTRACT

In the processing of multimedia contents data, analyzing the structure of the multimedia contents to be reproduced and changing sync information field configuration information contained in the multimedia contents based on the structure of the analyzed multimedia contents.

31 Claims, 51 Drawing Sheets

FIG. 3

```
aligned(8) class SL_PacketHeader (SLConfigDescriptor SL) {
 if (SL.useAccessUnitStartFlag)
    bit(1) accessUnitStartFlag;
 if (SL.useAccessUnitEndFlag)
    bit(1) accessUnitEndFlag;
 if (SL.OCRLength>0)
    bit(1) OCRflag;
 if (SL.useIdleFlag)
    bit(1) idleFlag;
 if (SL.usePaddingFlag)
    bit(1) paddingFlag;
 if (paddingFlag)
    bit(3) paddingBits;

 if (!idleFlag && (!paddingFlag || paddingBits!=0)) {
    if (SL.packetSeqNumLength>0)
       bit(SL.packetSeqNumLength) packetSequenceNumber;
    if (SL.degradationPriorityLength>0)
       bit(1) DegPrioflag;
    if (DegPrioflag)
       bit(SL.degradationPriorityLength) degradationPriority;
    if (OCRflag)
       bit(SL.OCRLength) objectClockReference;

    if (accessUnitStartFlag) {
       if (SL.useRandomAccessPointFlag)
          bit(1) randomAccessPointFlag;
       if (SL.AU_seqNumLength>0)
          bit(SL.AU_seqNumLength) AU_sequenceNumber;
       if (SL.useTimeStampsFlag) {
          bit(1) decodingTimeStampFlag;
          bit(1) compositionTimeStampFlag;
       }
       if (SL.instantBitrateLength>0)
          bit(1) instantBitrateFlag;
       if (decodingTimeStampFlag)
          bit(SL.timeStampLength) decodingTimeStamp;
       if (compositionTimeStampFlag)
          bit(SL.timeStampLength) compositionTimeStamp;
       if (SL.AU_Length>0)
          bit(SL.AU_Length) accessUnitLength;
       if (instantBitrateFlag)
          bit(SL.instantBitrateLength) instantBitrate;
    }
 }
}
```

FIG. 4

```
class SLConfigDescriptor extends BaseDescriptor : bit(8) tag=SLConfigDescTag {
  bit(8) predefined;
  if (predefined==0) {
     bit(1) useAccessUnitStartFlag;
     bit(1) useAccessUnitEndFlag;
     bit(1) useRandomAccessPointFlag;
     bit(1) hasRandomAccessUnitOnlyFlag;
     bit(1) usePaddingFlag;
     bit(1) useTimeStampsFlag;
     bit(1) useIdleFlag;
     bit(1) durationFlag;
     bit(32) timeStampResolution;
     bit(32) OCRResolution;
     bit(8) timeStampLength; // must be ≤ 64
     bit(8) OCRLength; // must be ≤ 64
     bit(8) AU_Length; // must be ≤ 32
     bit(8) instantBitrateLength;
     bit(4) degradationPriorityLength;
     bit(5) AU_seqNumLength; // must be ≤ 16
     bit(5) packetSeqNumLength; // must be ≤ 16
     bit(2) reserved=0b11;
  }
  if (durationFlag) {
     bit(32) timeScale;
     bit(16) accessUnitDuration;
     bit(16) compositionUnitDuration;
  }
  if (!useTimeStampsFlag) {
     bit(timeStampLength) startDecodingTimeStamp;
     bit(timeStampLength) startCompositionTimeStamp;
  }
}
```

FIG. 5

| Predefined field value | 0x01 | 0x02 |
|---|---|---|
| useAccessUnitStartFlag | 0 | 0 |
| useAccessUnitEndFlag | 0 | 0 |
| useRandomAccessPointFlag | 0 | 0 |
| usePaddingFlag | 0 | 0 |
| useTimeStampsFlag | 0 | 1 |
| useIdleFlag | 0 | 0 |
| durationFlag | 0 | 0 |
| timeStampResolution | 1000 | - |
| OCRResolution | - | - |
| timeStampLength | 32 | 0 |
| OCRlength | - | 0 |
| AU_length | 0 | 0 |
| instantBitrateLength | - | 0 |
| degradationPriorityLength | 0 | 0 |
| Au_seqNumLength | 0 | 0 |
| PacketSeqNumLength | 0 | 0 |

FIG. 9

```
class ES_Descriptor extends BaseDescriptor:bit(8) tag=ES_DescrTag {
 bit(16) ES_ID;
 bit(1) streamDependenceFlag;
 bit(1) URL_Flag;
 bit(1) OCRstreamFlag;
 bit(5) streamPriority;
 if (streamDependenceFlag)
   bit(16) dependsOn_ES_ID;
 if (URL_Flag) {
   bit(8) URLlength;
   bit(8) URLstring[URLlength];
 }
 if (OCRstreamFlag)
   bit(16) OCR_ES_Id;
 DecoderConfigDescriptor decConfigDescr;
 SLConfigDescriptor slConfigDescr;
 IPI_DescrPointer ipiPtr[0..1];
 IP_IdentificationDataSet ipIDS[0..255];
 IPMP_DescriptorPointer ipmpDescrPtr[0..255];
 LanguageDescriptor langDescr[0..255];
 QoS_Descriptor qosDescr[0..1];
 RegistrationDescriptor regDescr[0..1];
 ExtensionDescriptor extDescr[0..255];
}
```

FIG. 14

| Field | in | out | Comment |
|---|---|---|---|
| useAccessUnitStartFlag | | ○ | BASED ON HINT TRACK INFORMATION |
| useAccessUnitEndFlag | | ○ | BASED ON HINT TRACK INFORMATION |
| useRandomAccessPointFlag | | ○ | 1 WHEN THERE IS SyncSampleBox |
| hasRandomAccessUnitOnlyFlag | | ○ | 1 WHEN THERE IS NO SyncSampleBox |
| useIdleFlag | | | |
| usePaddingFlag | | | |
| useTimeStampFlag | ○ | ○ | 1 WHEN THERE IS DecodingTimeToSampleBox |
| durationFlag | | △ | OPTION |
| timeStampResolution | | ○ | TRACK timescale VALUE |
| OCRResolution | | ○ | REFERENCED OCR timescale VALUE(WHEN THERE IS REFERENCE TO OCR TRACK) |
| timeStampLength | | ○ | 32 (MP4 VERSION 0) OR 64 (MP4 VERSION 1) |
| OCRlength | | ○ | 0 OR 32 (WHEN THERE IS REFERENCE TO OCR TRACK) |
| AU_Length | | ○ | 32 |
| instantBitrateLength | | △ | OPTION |
| degradationPriorityLength | | ○ | 0 OR 16 (WHEN THERE IS DegradationPriorityBox) |
| Au_seqNumLength | | ○ | BASED ON HINT TRACK INFORMATION |
| PacketSeqNumLength | | ○ | BASED ON HINT TRACK INFORMATION |
| timeScale | | △ | OPTION |
| accessUnitDuration | | △ | OPTION |
| compositionUnitDuration | | △ | OPTION |
| startDecodingTimeStamp | | ○ | 0 |
| startCompositionTimeStamp | | ○ | 0 |

FIG. 21

RTSP/1.0 200 OK
Server:Isma-Server
Cseq:1
Content-length:853
Content-Type:application/sdp
Content-Base:rtsp://stream.isma.tv/foo.mp4/
v=0
0=-2890844256 2890842807 IN IP4 17.202.35.74
s=/foo.mp4
t=0 0
u=http://isma.tv/
e=admin@isma.tv
c=IN IP4 0.0.0.0
a=control:/
a=range:npt=0- 7.20000
a=ISMA-compliance:1,1.0,1
a=mpeg4-iod:"data:application/mpeg4-iod;base64,
AoF/AE8BAQEBAQOBEgABQHRkYXRh
OmFwcGxpY2F0aW9uL21wZWc0LW9kLWF1O2Jhc2U2NCxBVGdCR3dVZkF4Y0F5U1FBW1FRTk1CRUFG
M0FBQVBvQUFBRERVQV1CQkFFWkFwOERGUUJsQ1FRT1FCVUFCOUFBQUQ2QUFBQStnQV1CQXc9PQQN
/wUAAMgAAAAAAAAAAAYJAQAAAAAAAAAAA2EAAkA+ZGF0YTphcHBsaWNhdG1vb19tcGVnNC1iaWZz
LWF1O2Jhc2U2NCx3QkFTZ1RBcUJYSmhCSWhRU1FVL0FBPT0EEgINAAAUAAAAAAAAAAAFAwAAQAYJ
AQAAAAAAAAAA"

FIG. 24

| | | | | | | |
|---|---|---|---|---|---|---|
| moov | | | | | | container for all the meta-data |
| | mvhd | | | | | movie header, overall declarations |
| | iods | | | | | object descriptor |
| | trak | | | | | container for an individual track or stream |
| | | tkhd | | | | track header, overall information about the track |
| | | tref | | | | track reference container |
| | | edts | | | | edit list container |
| | | | elst | | | an edit list |
| | | mdia | | | | container for the media information in a track |
| | | | mdhd | | | media header, overall information about the media |
| | | | hdlr | | | handler, at this level, the media (handler) type |
| | | | minf | | | media information container |
| | | | | vmhd | | video media header, overall information (video track only) |
| | | | | smhd | | sound media header, overall information (sound track only) |
| | | | | hmhd | | hint media header, overall information (hint track only) |
| | | | | <mpeg> | | mpeg stream headers |
| | | | | dinf | | data information box, container |
| | | | | | dref | data reference box, declares source(s) of media in track |
| | | | | stbl | | sample table box, container for the time/space map |
| | | | | | stts | (decoding) time-to-sample |
| | | | | | ctts | composition time-to-sample table |
| | | | | | stss | sync (key, I-frame) sample map |
| | | | | | stsd | sample descriptions (codec types, initialization etc.) |
| | | | | | stsz | sample sizes (framing) |
| | | | | | stsc | sample-to-chunk, partial data-offset information |
| | | | | | stco | chunk offset, partial data-offset information |
| | | | | | stsh | shadow sync |
| | | | | | stdp | degradation priority |
| mdat | | | | | | Media data container |
| free | | | | | | free space |
| skip | | | | | | free space |
| udta | | | | | | user-data, copyright etc. |

FIG. 25

```
aligned(8) class ESDBox
  extends FullBox('esds', version=0.0) {
  ES_DescriptorES;
}
  //Visual Streams

class MP4VisualSampleEntry() extends VisualSampleEntry('mp4v') {
  ESDBox ES;
}
  //Audio Streams

class MP4AudioSampleEntry() extends AudioSampleEntry('mp4a') {
  ESDBox ES;
}
  //all other Mpeg stream types
class MpegSampleEntry() extends SampleEntry('mp4s') {
  ESDBox ES;
}

aligned(8) class SampleDescriptionBox (unsigned int(32) handler_type)
  extends FullBox('stsd',0,0) {
  int i;
  unsigned int(32) entry_count;
  for (i=0;i<entry_count;i++) {
    switch (handler_type) {
      case 'soun'://AudioStream
        AudioSampleEntry();
        break;
      case 'vide'://VisualStream
        VisualSampleEntry();
        break;
      case 'hint'://Hint track
```

F I G. 29
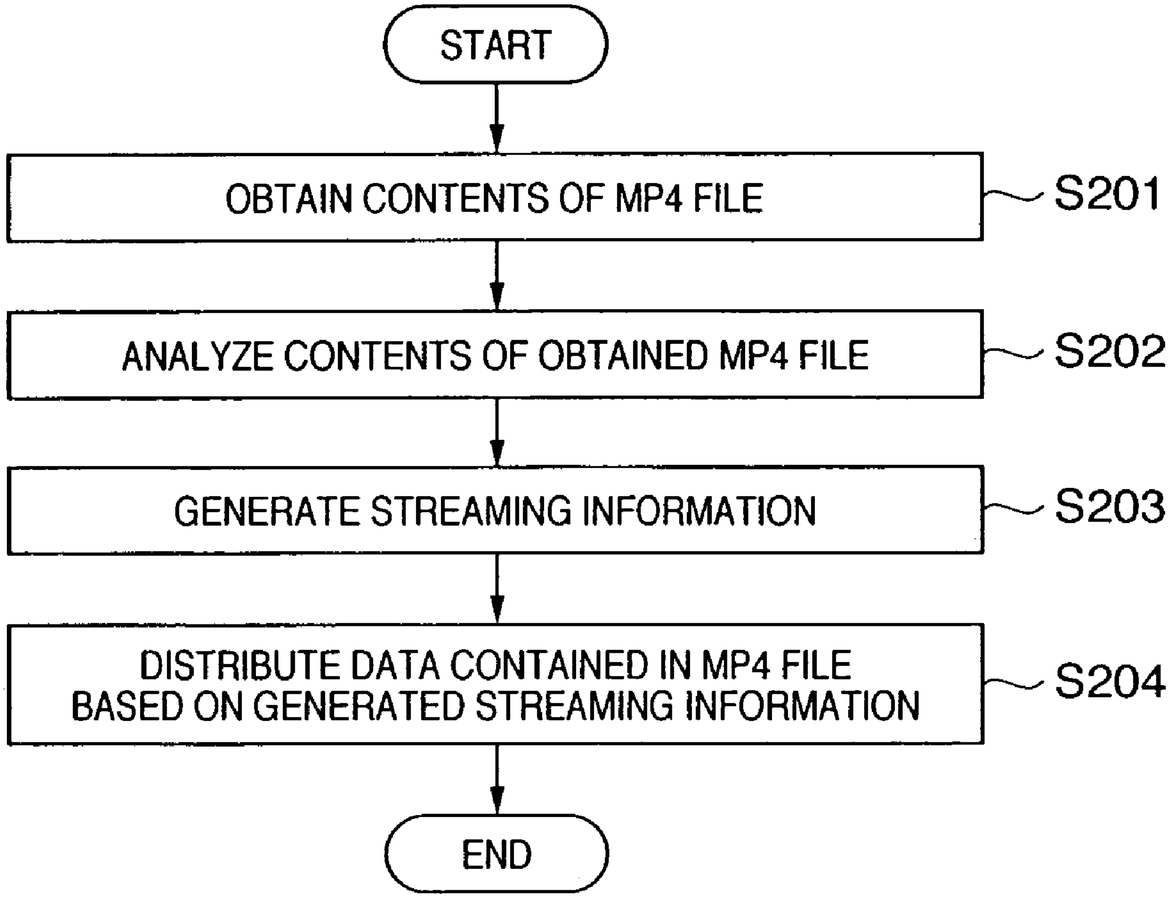

FIG. 31

```
m=video 0 RTP/AVP 96 ~ 2061
b=AS:60 ~ 2062
a=rtpmap:96 MP4V-ES/90000 ~ 2063
a=control:trackID=5 ~ 2064
a=fmtp:96 profile-level-id=1; ~ 2065
2066 { config=000001B001000001B50EE040C0CF0000010000000120008440003E83C20B4A21F
     { a=mpeg4-esid:201
```

FIG. 34 b=AS:155 ~ 2091
a=isma-compliance:1,1.0,1 ~ 2092
2093 {
a=mpeg4-iod:"data:application/mpeg4-iod;base64,AoF/
AE8BAQEBAQOBEqABQHRkYXRhOmFwcGxpY2F0aW9uL21wZWc0LW9kLWF1O2Jhc2U2NCxBVGdCR3dV
ZkF4Y0F5U1FBW1FRTk1CRUFGM0FBQVBvQUFBRERVQV1CQkFFWkFwOERGUUJsQ1FRT1FCVUFCOUFB
QUQ2QUFBQStnQV1CQXc9PQQNAQUAAMgAAAAAAAAAAAYJAQAAAAAAAAAAA2EAAkA+ZGF0YTphcHBs
aWNhdG1vbi9tcGVnNC1iaWZzLWF1O2Jhc2U2NCx3QkFTZ1RBcUJYSmhCSWhRU1FVL0FBPT0EEgIN
AAAUAAAAAAAAAAAFAwAAQAYJAQAAAAAAAAAA"

F I G. 38
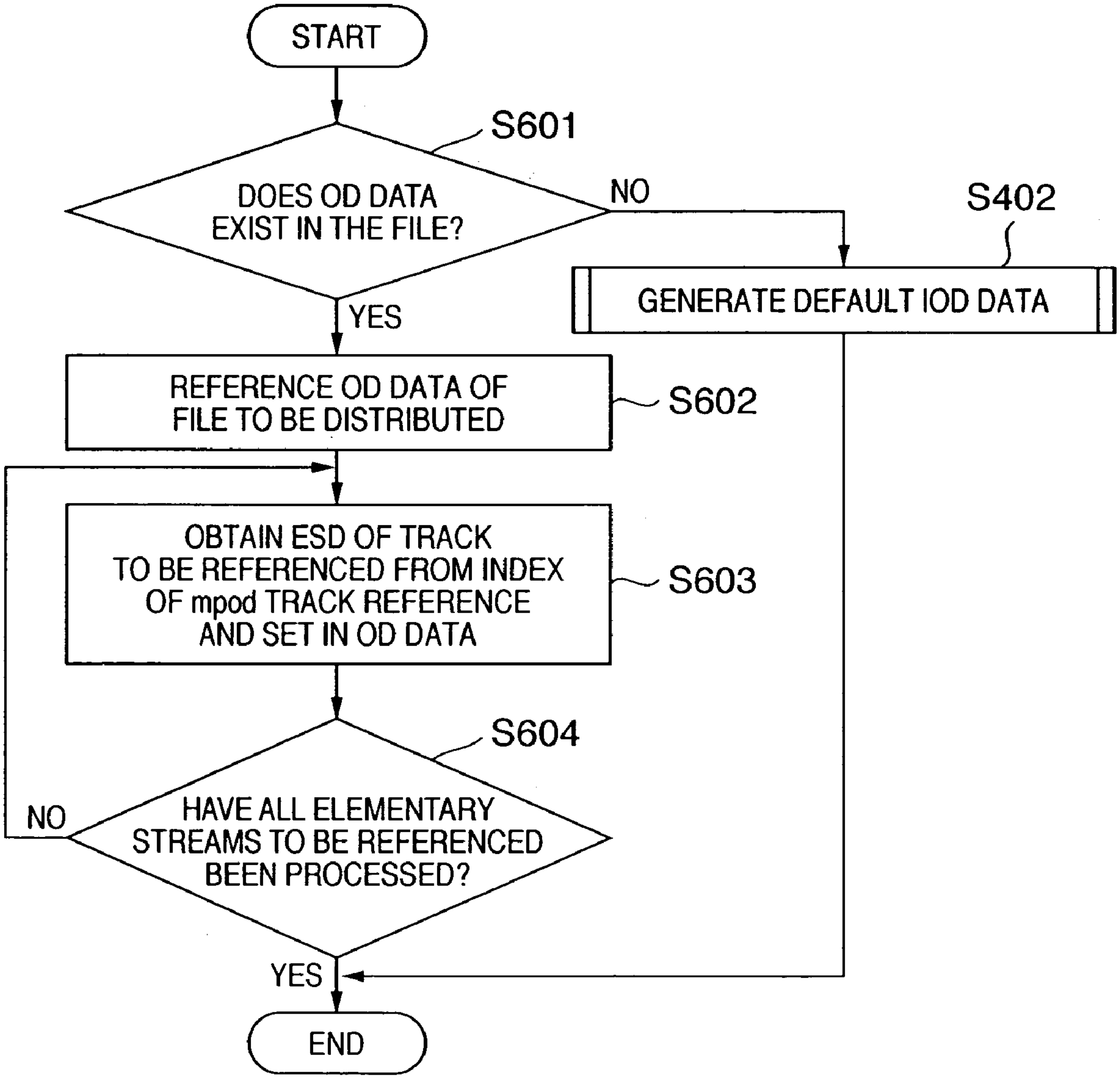

FIG. 44

MOV0001.MP4 ← FILE TO BE DISTRIBUTED
MOV0001.SDP ← MOV0001.MP4 STREAMING INFORMATION (MOVIE SESSION DESCRIPTION INFORMATION)
MOV0001-1.SDP ← MOV0001.MP4 STREAMING INFORMATION (TRACK 1 SESSION DESCRIPTION INFORMATION)
MOV0001-1.HNT ← MOV0001.MP4 STREAMING INFORMATION (TRACK 1 HINT INFORMATION)
MOV0001-2.SDP ← MOV0001.MP4 STREAMING INFORMATION (TRACK 2 SESSION DESCRIPTION INFORMATION)
MOV0001-2.HNT ← MOV0001.MP4 STREAMING INFORMATION (TRACK 2 HINT INFORMATION)

FIG. 46

```
DESCRIBE rtsp://192.168.0.1/MOV0001.MP4 RTSP/1.0 ~2211
CSeq:1
Accept:application/sdp
Bandwidth:4294967286
Accept-Language:en-US
User-Agent:ISMA-Client
```

FIG. 47

| | | | | |
|---|---|---|---|---|
| 2221 | max_pdu_size | 512 | ← | MAXIMUM PACKET SIZE |
| 2222 | repert | no | ← | SEND PACKET MULTIPLE TIMES |
| 2223 | approval_packet_loss | 10 | ← | PERMISSIBLE PACKET LOSS RATE (%) |

DATA PROCESSING METHOD AND APPARATUS, AND DATA DISTRIBUTION METHOD AND INFORMATION PROCESSING APPARATUS

FIELD OF THE INVENTION

The present invention relates to a data processing method and apparatus suitable for the processing of multimedia contents data, and more particularly, to that which is suitable for data processing of multimedia contents written in MPEG-4 file format (hereinafter also "MP4") or other, similar file formats, including synchronization (sync) control information.

Moreover, the present invention relates to a data processing method and apparatus suitable for processing object base coded contents describing definitions relating objects using object descriptor information.

Furthermore, the present invention relates to that which is suitable for data distribution processing of multimedia files written in MP4 file format or some other, similar format, including object descriptor information that describes communications control information for streaming distribution as well as contents data relational definitions.

BACKGROUND OF THE INVENTION

As the technology for compressing video and audio advances, a variety of compression formats that have come to be established as standards are currently available. Moreover, so-called multi-media contents, in which video and audio media data are treated not separately but as a single set of contents in which multiple types of media data are cross-correlated, are also widely used.

ISO/IEC 14496 (MPEG-4), established as the international standard by the ISO (International Organization for Standardization) can be offered as the archetype of this multimedia contents compression format. MPEG-4 is characterized by the fact that, in addition to encoding individual pieces of video and audio media data, it handles the media data as an object constituting a scene and encodes the data in units of objects, i.e., is an "object base coding format".

However, when actually replaying (reproducing) such data, in order to provide the kind of control that synchronizes video and audio for proper reproduction, control information such as a time stamp must also be established. Accordingly, in the MPEG (Motion Picture Expert Group) standard coding format established by the ISO, in addition to video and audio data coding, control information and a control system for synchronizing the video and audio data must also be established as the "Systems" part.

In MPEG-4 Systems (see ISO/IEC 14496-1; "Information technology—Coding of audio-visual objects—Part 1: "Systems"; ISO/IEC; 2003 Feb. 20), the architecture of the terminal that reproduces the MPEG-4 contents (that is, a reproduction terminal) is established as shown in FIG. 1. The reproduction terminal, as shown in FIG. 1, is composed of a plurality of layers 201-204. At a Delivery Layer 201, contents data is acquired from a physical device or a network, multiplexed to produce a data block 210 called a SL-PDU in which synchronization (sync) information such as a time stamp added, and the data block 210 delivered to a Sync Layer 202. At the Sync Layer 202, synchronization (sync) control is carried out based on the sync information contained in the delivered SL-PDU and the coded data block from which the sync information has been removed from the SL-PDU is delivered to a Compression Layer 203. At the Compression Layer 203 the coded data is then developed. Ultimately, a scene is developed and rendered at a Composition and Rendering Layer 204 based on the descriptive contents of the data.

With such a layered configuration, the Sync Layer 202 can process the contents data without regard to what type of protocol was used or in what kind of data format such contents data was transmitted. Moreover, similarly, the Delivery Layer 201 can process the contents data without regard to what type of encoding format it is in or whether the content of the data is correct or not.

Furthermore, with such an architecture, no matter what the transmission format or protocol, the input data to the Sync Layer 202 is always set so as to be delivered in SL-PDU format, and therefore processing can be carried out transparently, regardless of the means of transmission between the Sync Layer 202 and the Delivery Layer 201. In other words, communication between both these layers is carried out using an abstract interface called a DAI (DMIF Application Interface) so as to be able to carry out processing in the same way regardless of the transmission means. The structure of such transmission transparency and the definition of the DAI is called DMIF (Delivery Multimedia Integration Framework), and is established as one part of the MPEG-4 format (see ISO/IEC 14496-6; "Information technology—Coding of audio-visual objects—Part 6: Delivery Multimedia Integration Framework (DMIF)"; ISO/IEC; 2000 Dec. 15). Moreover, the abstract DAI (DMIF Application Interface) for carrying out communications between the Sync Layer 202 and the Delivery Layer 201 is also defined by the same part.

The SL-PDU 210, as shown in FIG. 2, is composed of two parts, an SL_PacketHeader and an SL_PacketPayload. Sets of data fields used by the Sync Layer 202 for control are stored in the SL_PacketHeader and coded data to be processed by the Compression Layer 203 and beyond are stored in the SL_PacketPayload.

Although the fields stored in the SL_PacketHeader are in general defined as shown in FIG. 3, the SL_PacketHeader field layout is not necessarily always the same but is defined by the contents of data called an SLConfigDescriptor, which defines the configuration of the SL_PacketHeader. It should be noted that the interpretive method of this type of description and the meaning of the fields is described in detail in ISO/IEC 14496-1, and thus a description thereof is omitted herein.

As shown in FIG. 4, values indicating whether or not the fields in the SL_PacketHeader are to be used are stored in the SLConfigDescriptor, and the configuration of the SL_PacketHeader can be known from those values. Accordingly, data containing an SLConfigDescriptor must be sent to the Sync Layer 201 via the DAI at the start of reproduction or at some arbitrary time so that the Delivery Layer 201 can extract the information needed for sync control from the SL_PacketHeader. It should be noted that, depending on the contents of the SLConfigDescriptor, there can also be an SL-PDU with no SL_PacketHeader.

In the configuration of the SL_PacketHeader, numbers are assigned to representative things. If the numbers are set in the "predefined" field of the SLConfigDescriptor, then the configuration of the SL_PacketHeader is interpreted as using the same things as the configuration indicated by those numbers. Therefore, much of the content of the SLConfigDescriptor can be omitted if the "predefined" field is used.

FIG. 5 shows the values that can be set in the "predefined" field as well as the corresponding configurations. For example, the "predefined" value 0x02 ("Reserved for use in MP4 files") defines the configuration when handling data contents written in MP4 file format established as the MPEG-4 standard file format (see ISO/IEC 14496-14; "Information technology—Coding of audio-visual objects—Part 14: MP4 file format"; ISO/IEC; 2003 Oct. 09), and thus "1" is set only in the "useTimeStampFlag" field of the SLConfigDescriptor. In such a case, only the time stamp is set in the SL_PacketHeader.

It is obligatory to record in the MP4 file data of an SLConfigDescriptor in which the value 0x02 is set on the "predefined" field. Accordingly, when reproducing an MP4 file, normally the SL_PacketHeader layout is the same no matter what the contents. However, even when the value of the "predefined" field of an SLConfigDescriptor recorded in the MP4 file is 0x02, there is no guarantee that the actual contents of the MP4 file reflect the contents of the SL_PacketHeader in which the "predefined" field value s 0x02.

To give an example, a "degradationPriority" field indicating the processing priority of the SL_PDU can be recorded in the MP4 file as a "DegradationPriorityBox" entry. However, when the "predefined" field value is 0x02, the "degradationPriority" is not used and accordingly the Sync Layer 202 does not control the priority. Thus, despite the existence in the MP4 file of control information for carrying out more appropriate reproduction, under these circumstances that information cannot be used at the Sync Layer 202 and beyond. Accordingly, the reproduction control that the creator of the contents expects cannot be completely implemented, and ultimately there is a possibility of degrading the quality of the reproduction.

Moreover, conversely, it is also possible that the information that should be set in the SL_PacketHeader is not in the MP4 file. For example, where "predefined"=0x02, the SL_PacketHeader time stamp is used, but it is not impossible that the "DecodingTimeToSampleBox" entry that holds the time stamp information does not exist in the MP4 file. In such a case, a contradiction arises between the SL_PacketHeader configuration and the MP4 file. If processing continues in such a state, there is no telling what data might be delivered to the Sync Layer 202, and consequently there is no guarantee that safe processing will be executed. Ultimately, there is a possibility that the reproduction system will crash.

It should be noted that the "TimeToSampleBox" entry is stipulated as indispensable to an MP4 file, and accordingly, where the "TimeToSampleBox" is missing, there is also a means of resolution known as stopping processing as an unconditional error. However, this resolution of the problem, despite the contradiction in the data itself, leaves unresolved the problem that the contents cannot be reproduced at all simply because the sync information is missing.

As described above, at present, there is no guarantee that the contents of the SLConfigDescriptor and the actual contents of the MP4 file match, and accordingly, there are problems of reproduction quality degradation and processing instability. These problems are mostly due to the forced use of fixed values for the values entered in the "predefined" field as the MP4 file format. However, even assuming that the recording in the MP4 file of a SLConfigDescriptor in which the contents are set arbitrarily is allowed, there is still no guarantee that a mismatch will not occur, and hence such an arrangement does not constitute an effective resolution of the problem.

Moreover, in order to implement object base coding, with the MPEG-4 format, the idea of scene description has been introduced in order to compose objects and form a single scene. Scene description, apart from video and audio object media data, is coded data in which are described spatial attributes indicating the positions of objects in the scene, temporal attributes indicating the timing of the appearance and disappearance of the objects, and the relations between the objects comprising the scene, and is used to compose a scene from objects.

Furthermore, with the MPEG-4 format, in order to link the object attribute information indicated by the scene description information described above with the media data corresponding to the objects, information called an object descriptor for describing the relation between these two is used. The object descriptor information makes it possible to compose correctly objects corresponding to the media data on a scene.

How the object attribute information and the media data corresponding to the objects are linked by the object descriptor is described using FIG. 6. With MPEG-4, the media data itself included in the contents are each coded separately and recorded separately. This encoded media data sequence is called an Elementary Stream (hereinafter "ES"). Media data handled as an ES is not limited to video and audio, but also includes the above-described scene description and object descriptor.

In order to be able to identify a specific ES, each ES is assigned a unique identifier called an ES-ID. With the MPEG-4 format, by using an ES_ID, the media data contained in a particular ES can be referenced. In other words, by writing this ES_ID into the object descriptor attributes, the object descriptor and the media data can be linked.

In the object descriptor, two types of data structures are defined: An InitialObjectDescriptor used as initial data when starting reproduction (hereinafter also referred to as "IOD"), and an ObjectDescriptor used as necessary after reproduction has started (hereinafter also described as "OD"). Normally, the OD is stored as ES data and the IOD is handled as independent data not included in the ES.

The IOD and the OD contain a data structure called an ES_Descriptor (hereinafter ESD) that describes the attributes of the ES to be referenced. The ES_ID contains the ESD together with data called DecoderSpecificInfo for initializing the decode and the bit rate of a stream or of a format type. Accordingly, the ES can be referenced from either the IOD or the OD. Moreover, in the IOD, OD and ESD MPEG-4 data structures, an 8-bit tag is set at the head of the data in order to identify the different types of data. It should be noted that, as the value of the tags used for each data structure, 0x01 (ObjectDescrTag) is defined for the OD, 0x02 (InitialObjectDescrTag) is defined for the IOD and 0x03 (ES_DescrTag) is defined for the ESD.

Of the archetypical MPEG-4 contents, as shown in FIG. 6 the IOD containing the ES_ID that indicates the ES of the OD is processed first. Thus, first, the ES linked to the IOD by the ES_ID is referenced and the OD data obtained from this ES. Then, similarly, the ES linked to the OD by the ES_ID is referenced and the media data obtained from the ES corresponding to the object.

Next, a description is given of how the above-described IOD and OD are processed at a contents reproduction terminal in an MPEG-4 contents reproduction system.

The architecture of a terminal for reproducing MPEG-4 contents in an MPEG-4 Systems that prescribes standards for a control system such as sync control (see ISO/IEC 14496-1) and is one part of MPEG-4 is as shown in FIG. 7. It should be noted that, although FIG. 7 shows the same architecture as FIG. 1, FIG. 7 shows the delivery of IOD and OD to the Sync Layer 202 through the DAI. The reproduction terminal, as shown in FIG. 7, is composed of a plurality of layers. The Delivery Layer 201, after obtaining contents data from a physical device or a network, multiplexes the contents data and delivers to the Sync Layer 202 a data block 25 called an SL-PDU that adds sync information such as a time stamp to the encoded data obtained from the ES.

The IOD and the OD are detached from the contents data at the Delivery Layer 201 and delivered to the Sync Layer 202 through the DAI. First, the IOD is delivered (26) to a succeeding layer immediately after the start of reproduction and before all processing. The OD, after being obtained from the ES, is delivered to the sync layer 202 as SL-PDU (25) to which sync information has been added, and through the Sync Layer 202 to the Compression Layer 203. At the Compression Layer 203, the compressed IOD is interpreted and developed into a format that the terminal can use for actual control. Thereafter, based on the descriptive contents of the developed IOD and the OD, a scene is composed according to the relation to the media data of the ES to be referenced, and, finally, the composed scene is rendered at the reproduction terminal and output. By a process like the foregoing, processing of contents data including object descriptor is executed and reproduction is carried out.

Moreover, a format called "MP4 file format" has been established by the aforementioned ISO as the standard format for recording the MPEG-4 contents data to a file (see ISO/IEC).

However, where handling contents written in this MP4 file format, a problem arises if the process described above is applied as is.

In order to better understand that problem, a brief description is first given of the outlines of the M4 file format. The MP4 file format is a format defined by the "Quicktime file format" that is the recording format in the Quicktime (registered trademark) multimedia coding technology developed by Apple Computer, Inc. of the United States. Accordingly, the configuration of an MP4 file closely resembles the configuration of a Quicktime file.

FIG. 8 shows how the relation between the media data and the object descriptor shown in FIG. 6 is expressed when written in MP4 file format. In MP4 file format, the contents data is composed of and written as "Boxes". (The Quicktime file format is the same.) Although in Quicktime and under initial MP4 specifications this data structure is called an "Atom", nevertheless it is essentially identical. The contents data, as shown in FIG. 8, is configured as a box called "Movie" that shows all the contents and contains a number of individual "Tracks" corresponding to individual pieces of media data.

In order to be able to identify each track uniquely, an identifier called a "Track ID" is assigned to each track, and that Track ID is written to a box called a "Track Reference", thus making it possible to define relations among a plurality of tracks. In order to be able to define a plurality of relations of different meanings, the Track Reference can be made to hold type information (e.g., "sync", "dpnd", "mpod", etc.) indicating the meaning of the relation. A "sync" Track Reference indicates synchronizing the referenced tracks during reproduction. A "dpnd" Track Reference indicates that, where there is a plurality of scaleable ES, there is a layer linkage between the referenced tracks. An "mpod" Track Reference indicates that the referenced track is a track that contains media data referenced from the OD data.

As shown in FIG. 8, in the case of the MP4 file format, track reference is carried out using the media data. Accordingly, the descriptive method relating to the data structure is clearly different from that shown in FIG. 6.

For one thing, in the MP4 file format, the IOD has no ESD, having instead only the track ID of the track corresponding to the referenced ES. The ESD contained in the IOD is recorded as data separate from the ES in the track to be referenced.

Moreover, the OD also has no ESD, recording instead only an index number (index) that starts with 1 and indicates the index of the data contained in the referenced track. The track ID of the track corresponding to the ES to be referenced is described in the data at the position indicated by the index number described above in the track reference type data (Track Reference) showing the relation between the OD and the ES, and it is by this track ID that the ES that the OD references is identified. As with the IOD, the ESD contained in the OD is recorded as data independent from the ES data in the tracks to be referenced.

Thus, as described above, in the MP4 file format, the format of the data that is the equivalent of the IOD, the OD and the ES is different from the structure stipulated by the MPEG-4. Accordingly, the values of the tags assigned to each of these are MP4 file format special values. As shown in FIG. 8, 0x10 (MP4_IOD_Tag) is used for the data that is the equivalent of the IOD, and 0x0E (ES_ID_IncTag) is used for the data contained therein in place of the ESD. Moreover, 0x11 (MP4_OD_Tag) is used for the data that is the equivalent of the OD, and 0x0F (ES_ID_RefTag) is used for the data contained therein in place of the ESD.

The following problems are revealed by the differences in descriptive format of contents data like that described above.

First, at layers at and beyond the Sync Layer 202, the ESD cannot be referenced from the data corresponding to the IOD and the OD.

Even if the data that is the equivalent of the OD and the IOD obtained from the contents data described by the MP4 file format is delivered as is from the Delivery Layer 201 to the Sync Layer 202, because there is no ESD contained therein, information relating to the ES cannot be obtained. In the ESD, as shown in FIG. 9, much information other than the ES_ID is defined (it should be noted that the method of interpretation of this type of description and the meaning of the various entry items is described in detail in ISO/IEC 14496-1, and therefore a description thereof is omitted in this specification). It is impossible to control the ES correctly without using such information.

Second, at layers at and beyond the Sync Layer 202, there is no standard means for transmitting ES-related information that the OD references.

In the case of the MP4 file format, information linking the OD and the ES is recorded in the Track Reference, with an index number beginning with 1 indicating the position of the data in the track reference box set in place of the ES_ID in the OD. This index number does not necessarily match the ES_ID, and as a result, in order to understand the relation between the OD and the ES, the relational information recorded in the track reference box is indispensable.

However, although an interface for transmitting the IOD and OD from the Delivery Layer 201 to the Sync Layer 202 is defined in the DAI, a standard interface for transmitting the relational information of the track reference box is not defined. Therefore, it is impossible to identify an ES to be referenced from the OD at layers at and beyond the Sync Layer 202 with the usual means.

Due to the problems just described, when adapting the conventional technique as is, whenever the contents data are written in MP4 file format, it is impossible to reproduce the contents correctly at a reproduction terminal based on MPEG-4 specifications. Moreover, in the case also of object base coded contents using not just the MP4 file format but any similar file format and architecture, as long as problems like the foregoing persist the contents cannot be reproduced correctly.

Moreover, the aforementioned ISO has established an ordinary file format called "ISO base media file format" for the purpose of recording MPEG and other such moving picture and audio contents to a file (see 14496-12; "Information technology—Coding of audio-visual objects—Part 12: "ISO base media file format"; ISO/IEC; 2004 Jan. 23). Furthermore, an extended file format for recording data in a particular coding format using this file format as a base has also been established, of which a representative example is the "MP file format", which is the standard file format for recording MPEG-4 moving picture and audio coded data (see 14496-14; "Information technology—Coding of audio-visual objects—Part 14: "ISO base media file format"; ISO/IEC; 2003 Nov. 24).

With devices such as digital cameras and mobile telephones, audio/video data is encoded in MPEG-4 format and that coded data multiplexed in order to be recorded in a file, or the multiplexed coded data is separated and extracted from the file and reproduced. The aforementioned MP4 file format is increasingly being adopted due to this multiplexing separation of the coded data.

At the same time, with the expansion of the internet and telecommunications environments, multimedia contents recorded in the above-described file format has come to be not only reproduced within terminal devices but also increasingly streamed over the network as well. Accordingly, an added data structure called a "hint track" for supporting in-file moving picture and audio data streaming is also defined in the aforementioned ISO base media file format (Hint Track)

The data units used in streaming are called "packets" of the communications protocol being used, and are not necessarily coincidental with the moving picture and audio data units. Accordingly, when streaming such data, the need arises to divide and/or combine the moving picture and audio data into units that can be transmitted as packets of the communications protocol. Furthermore, in some cases additional information for communications control purposes (for example, protocol header information, hereinafter referred to as "communications control information") must also be added to the communications packet.

Instructions for carrying out such processes as dividing and combining the contents data or adding the communications control information are described in the hint track. By recording instruction information like that described above as a hint track in the file to be streamed and having a distribution device that performs the streaming (hereinafter "streaming server") extract the hint track that corresponds to the communications protocol from the file and processing the data into packets in accordance with the instructions written it he hint track, packets are generated that comply with the communications protocol.

Generally, the packeting method differs depending on the communications protocol used and the coding format of the contents data to be distributed. For example, when using RTP for the communications protocol (see RFC1889; "RTP: A Transport Protocol for Real-Time Applications"; H. Schulzrinne, S. Casner, R. Frederick, V. Jacobson; January 1996; IETF)) and MPEG-4 for the coding format, packeting methods such as RFC3640 (see RFC3640; "RTP Payload Format for Transport of MPEG-4 Elementary Streams"; J. van der Meer, D. Mackie, V. Swaminathan, D. Singer, P. Gentric; November 2003; IETF) and RFC3016 (see RFC3016; "RTP Payload Format for MPEG-4 Audio/Visual Stream"; Y. Kikuchi, T. Nomura, S. Fukunaga, Y. Matsui, H. Kimata; November 2000; IETF) have been established. In the above-described ISO base media file format, at present, the format of the hint track corresponding to a case in which RTP is used for the communications protocol has been established.

It should be noted that the concept and usage of the hint track is described also in U.S. Pat. No. 6,717,952 and Japanese Laid-Open Patent Publication (Kokai) No. 2004-505519.

(Object Descriptor)

Moreover, MPEG-4, as described above, is an "object base coding format". Consequently, with MPEG-4, in order to link video and audio object attribute information with the coded date corresponding to the objects, information called an "object descriptor" is used to describe the relation between the two. With this object descriptor (IOD or OD), the ability to handle correctly the attributes of the contents data is as described above. It should be noted that the object descriptor is one part of MPEG-4, and is established by the MPEG-4 Systems (see ISO/IEC 14496) establishing standards relating to sync control and other such control systems.

(BIFS)

Furthermore, with MPEG-4, an idea called scene description for composing objects into a single scene has been introduced. Scene description is information in which, separate from video and audio object contents data, spatial attributes showing the positions of the objects in a scene and temporal attributes showing the appearance and disappearance of the objects are described, and is used to compose scenes from objects. In MPEG-4, scene description information is written as coded data called BIFS (BInary Format for Scene). Ordinary MP4 file format contents contain the foregoing IOD, OD and BIFS data.

(ISMA)

With respect to the above-described hint track as well as OD and BIFS data, an "Internet Streaming Media Alliance Implementation Specification" (see "Internet Streaming Media Alliance Implementation Specification Version 1.0"; Internet Streaming Media Alliance; 2001 Aug. 28; hereinafter "ISMAspecification") established by the ISMA (Internet Streaming Media Alliance), an industry group in which Apple Computer, Inc. of the United States and Philips Electric of the United States participate, has also been established as the specifications for establishing communications means for streaming MPEG-4 contents.

A description is now given of how the hint track as well as the OD and BIFS are used in the ISMA specifications, using FIG. 10.

With the ISMA specifications, as with most video distribution systems, RTSP (RFC2326; "Real Time Streaming Protocol (RTSP)"; H. Schlzrinne, A. Rao, R. Lanphier; April, 1998; IETF) and SDP (RFC2327; "SDP: Session Description Protocol"; M. Handley, V. Jacobson; April, 1998; IETF) are used as a session control protocol, and the aforementioned RTP is used as the audio/visual data streaming protocol.

The streaming server first sends the session description information written in SDP format to a reception terminal in RTSP or some other protocol (21). At this time, the IOD, OD and BIFS information is sent as text-encoded data in base 64 format as one part of the session description information. In other words, by writing the session description information in SDP format in the file to be distributed, that session description information is obtained from that file by the streaming server and transmitted.

Once a session has been established, audio/video data stream information written in SPD format is then transmitted in RTSP from a hint track previously recorded in the file to establish an RTP session for streaming (22). Then, based on the hint track contents, the audio/video data is divided, packeted, and streamed to the reception terminal on the just-established RTP session (23).

Thus, as described above, by pre-recording session description information containing a hint track as well as IOD, OD and BIFS in a file containing MPEG-4 contents, such information is used in the streaming process performed by the streaming server.

The processing performed by the streaming server described above presupposes that streaming information such as the hint track and the session description information containing the IOD, OD and BIFS is included in the file. In other words, in order to stream data, such information must be previously recorded in the target file to be streamed.

However, such streaming information is not always written in the file. In actuality, in files created by image sensing devices such as digital cameras and mobile telephones, in most cases this streaming information is not added in order to reduce data redundancy.

Consequently, in preparation for streaming, it is necessary for the creator of the contents to upload the file created by the image sensing device or recording apparatus to the streaming server only after attaching streaming information to the file.

Accordingly, the contents creator must handle two types of files depending on whether the file data is to be streamed or not, thus complicating file management. Furthermore, the burden on the contents creator increases because the creator must now attach streaming information to the file in order to stream the file. Finally, the data amount increases because of the addition of the streaming information, causing uploads to the streaming server to take more time. All these problems complicate the task of streaming data contents and lead to inefficiency.

One proposal for solving the foregoing problems involves a method of adding streaming information such as a hint track and the like to the image-sensing device/recording apparatus file during file creation regardless of whether the contents of the file are to be streamed or not.

According to such method, however, where streaming is not carried out the added streaming information remains in the file as unused redundant data, and therefore decreases data efficiency. Moreover, a separate problem arises in that the performance of the image-sensing device/recording apparatus deteriorates because the processing capacity, memory and other resources that should be directed toward accomplishing moving picture recording must instead be assigned to recording streaming information. Furthermore, even with the use of this method the aforementioned problem of the added time needed for uploading to the streaming server remains unsolved.

In addition, the above-described IOD, OD and BIFS information is not always held in the file in all file formats that can handle MPEG-4. For example, with the 3GPP file format defined by the 3GPP (3$^{rd}$ Generation Partnership Project) for third-generation mobile telephones (3GPP TS 26,244 "Technical Specification Group Services and Systems Aspects Transparent end-to-end packet switched streaming service (PSS); 3GPP file format (3GP) (Release 6)" 3$^{rd}$ Generation Partnership Project; 2003 Feb. 28) and the AMF file format used as the KDDI mobile telephone moving picture recording format, such information is not recorded in the file. Therefore, files of formats like these, because they cannot add IOD, OD and BIFS data in the format established by the ISMA specifications, cannot comply with such specifications.

SUMMARY OF THE INVENTION

The present invention is conceived as a solution to the problems described above, and has as its object to make it possible to reproduce correctly contents data written in MP4 or another, similar file format, in accordance with sync control information of said contents data.

In addition, the present invention is conceived in light of the above-described problems, and has as its object to provide a data processing method and apparatus that can correctly reproduce object base coded contents written in MP4 or a similar file format at a reproduction terminal having an architecture that conforms to MPEG-4.

In addition, the present invention is conceived in light of the above-described problems, and has as its object to provide a data distribution method and information processing apparatus that makes it possible to stream data regardless of whether or not control information for distribution is included in the file.

According to one aspect of the present invention, there is provided a processing method for multimedia contents data containing data encoded in object base, the method comprising: an analysis step of analyzing the structure of the multimedia contents; and a conversion step of converting the multimedia contents into a structure suitable for a predetermined output process, based on the structure of the multimedia contents analyzed in the analysis step.

Also, according to another aspect of the present invention, there is provided a data processing apparatus for processing multimedia contents data containing data encoded in object base, the apparatus comprising: an analysis unit configured to analyze the structure of the multimedia contents; and a conversion unit configured to convert the multimedia contents into a structure suitable for a predetermined output process, based on the structure of the multimedia contents analyzed by the analysis unit.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing SL-PacketHeader field definitions;

FIG. 4 is a diagram showing SLConfigDescriptor field definitions;

FIG. 5 is a diagram showing setting values corresponding to values for the "predefined" field;

FIG. 9 is a diagram showing definitions of SL_PacketHeader fields;

FIG. 14 is a diagram showing conversion rules applied to each field in a packet header configuration information conversion process according to one embodiment of the present invention;

FIG. 21 is a diagram showing an example of a transmission format of the InitialObjectDescriptor and the Object Descriptor in the ISMA specification;

FIG. 24 is a table showing a list of data structures defined by the MP4 file format;

FIG. 25 is a diagram showing definitions of ESDS box in MP4 file format;

FIG. 29 is a flow chart showing steps in an MP4 file distribution process in the fifth embodiment;

FIG. 31 is a diagram showing an example of audio/video data information written in SPD format;

FIG. 34 is a diagram showing an example of RTSP session description information written in SDP format;

FIG. 38 is a flow chart showing steps in an OD data conversion process in a format stored in an MP4 file, according to the sixth embodiment;

FIG. 44 is a diagram showing an example of the structure of a streaming information file;

FIG. 46 is a diagram showing an example of a RTSP file request;

FIG. 47 is a diagram showing an example of setting information used in setting a streaming information generation operation, in an eighth embodiment of the present invention;

DETAILED DESCRIPTION OF THE PREFERRED EMBODIMENTS

Preferred embodiments of the present invention will now be described in detail in accordance with the accompanying drawings.

Although the foregoing discussion of the background technology and problems described above concentrated on an example in which the contents data is in MP4 file format, the present invention can also be applied to cases in which not only MP4 but also other, similar file formats and architecture are used. For example, successor standards to the MPEG-4 such as MPEG-7 (ISO/IEC 15938) and MPEG-21 (ISO/IEC 20001) are either being established or are being studied by the ISO. Moreover, standards such as "Motion JPEG 2000 file format" (ISO/IEC 15444-3) and "AVC file format" (ISO/IEC 14496-15) are being established by the ISO. The present invention can also be adapted to any of these file formats. That is, as can be appreciated by those of ordinary skill in the art, the present invention can be adapted to any file format provided that an architecture and a file format similar to MPEG-4 is employed.

It should be noted that the state called "contents data written in MP4 file format" in this specification does not indicate that the handled data is itself a physical file. The present invention can also be adapted to data transmitted over a network and to data stored in a memory.

First Embodiment (About the Overall Process)

Figure 11:
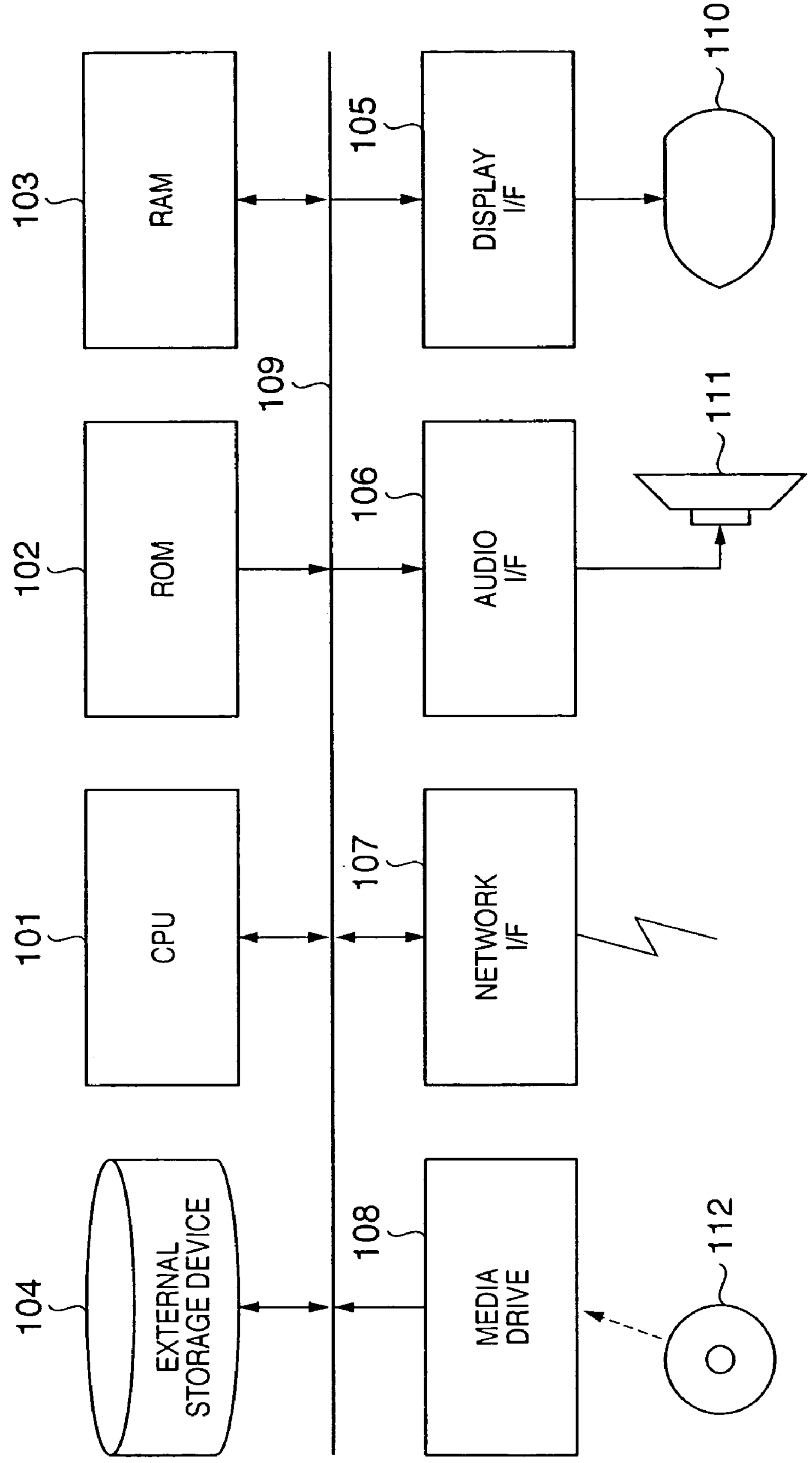
FIG. 11 is a diagram showing the configuration of a processing apparatus according to one embodiment of the present invention.

FIG. 11 is a block diagram showing the structure of an information processing apparatus implementing a multimedia contents data reproduction process according to a first embodiment of the present invention. In FIG. 11 a CPU 101 executes a predetermined process according to a control program stored in a ROM 102 or a RAM 103. A control program stored in an external storage device 104 is loaded into the RAM 103 and executed by the CPU 101. It should be noted that contents data written in MP4 file format and targeted for reproduction can be stored in the external storage device 104. Where image information is reproduced by reproduction of the contents data, such image information is output to a display 110 through a display I/F 105 and displayed. Where audio information is reproduced by reproduction of the contents data, such audio information is output to an audio device 111 through an audio I/F 106 and reproduced.

It should be noted that the contents data to be reproduced can also be obtained from a network (including the Internet, a LAN, etc.) through a network I/F 107, and contents data recorded on a media 112 such as a CD (Compact Disc) or a DVD (digital Versatile Disc) can also be obtained through a media drive 108. The foregoing components are communicably connected to each other by a bus 109 to achieve a variety of functions.

Figure 1:
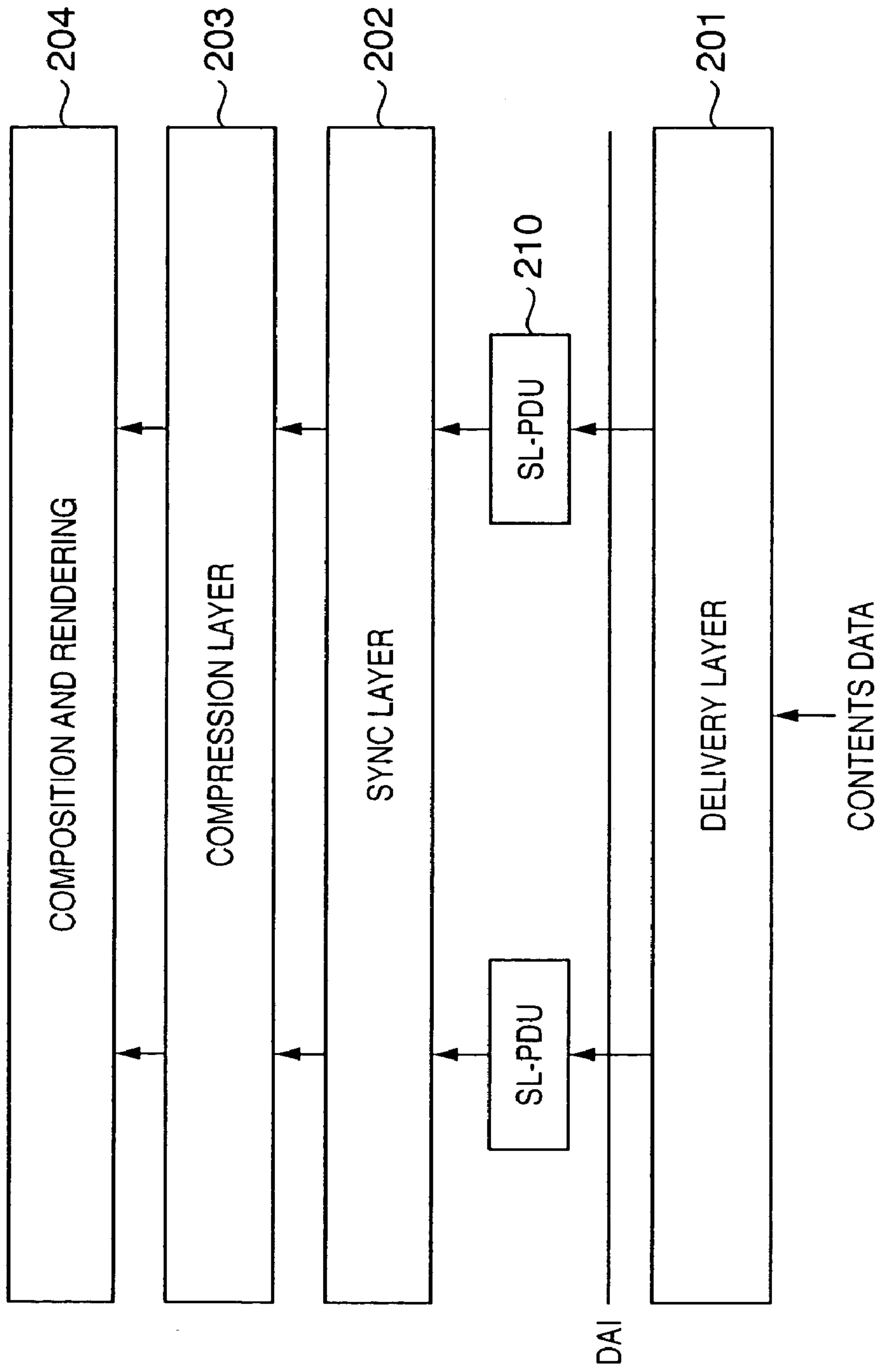
FIG. 1 is a block diagram showing the architecture of a reproduction terminal in the MPEG-4 Systems.
Figure 12:
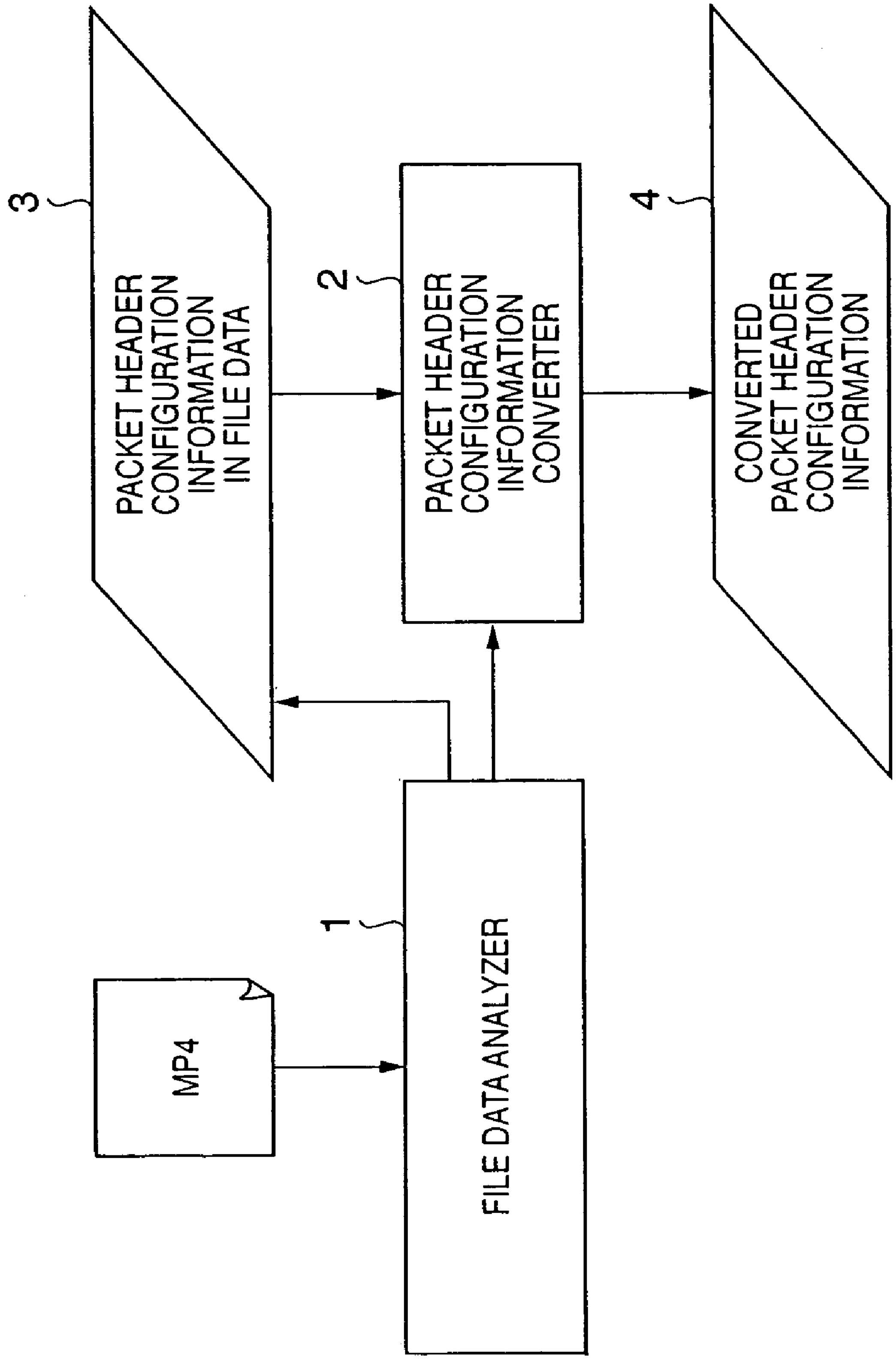
FIG. 12 is a diagram showing an example of the configuration of a module for a packet header configuration information conversion process according to one embodiment of the present invention.

The CPU 101, by executing a predetermined control program, implements a contents data reproduction architecture like that shown in FIG. 1. In the present embodiment, a configuration information generator is provided in a Delivery Layer 201 that generates packet header configuration information (SLConfigDescriptor) suitable for the contents data to be reproduced and provides that information to a Sync Layer 202. FIG. 12 is a diagram illustrating an example of the module configuration of the configuration information generator according to the present embodiment.

In FIG. 12, a file data analyzer 1 has the ability to analyze the internal structure of the contents data of the input MP4 or similar file format. The input data to the file data analyzer 1 may be input in any transmission format. For example, the data itself may be delivered to the file data analyzer 1 from an external storage or external medium through some sort of network or transmission path, or the position of the data itself, such as the file path, may be delivered, and the file data analyzer 1 may then obtain the data.

A packet header configuration information converter 2 has the ability to convert and output the SLConfigDescriptor or the packet header configuration information equivalent thereto contained in the contents data in MP4 or similar file format according to the internal structure of the actual content data. The internal structure of the contents data that the packet header configuration information converter uses is obtained or referenced from the field data analyzer 1. The packet header configuration information output as conversion results is held by the Delivery Layer 201 and also delivered to the Sync Layer 202.

The packet header configuration information is used at the Delivery Layer 201 to generate a data block containing an SL_PacketHeader or sync information similar thereto. Moreover, the packet header configuration information is used at the Sync Layer 202 for such purposes as analyzing the sync control information based on the contents of the SL_PacketHeader.

Moreover, the conversion results packet header configuration information can be output for any given module. For example, it is also possible to execute processing for the packet header configuration information converter 2 from the file data analyzer 1 and to return the output results to the file data analyzer 1. As a result, by a user requesting processing by the file data analyzer 1, it is possible to obtain data consisting of packet header configuration information that has been converted without an awareness of the presence of the packet header configuration information converter 2.

In the present embodiment, the packet header configuration information converter 2 converts and outputs the content of the SLConfigDescriptor recorded in the contents data while linked with the file data analyzer 1 so as to comply with the internal structure of the contents. As a result, it is possible to generate sync control information that matches the content of the contents data.

It should be noted that, although the file data analyzer 1 and the packet header configuration information converter 2 may be installed in any disposition, preferably the two units are logically disposed within the Delivery Layer 201 shown in FIG. 1. If the two units are disposed in different layers, for example the Delivery Layer 201 and the Sync Layer 202, then an operation that supersedes the layers is required in order to reference the internal structure of the file data. However, because only an abstract interface such as a DAI exists between layers, an interface extension must be performed in order to carry out the processes unique to the MP4 and other such data formats, and doing so results in the loss of certain advantages, such as the abstraction of processes due to a layered structure and the transparency of transmission means provided by DMIF. Consequently, although it is possible to dispose the file data analyzer 1 and the packet header configuration information converter 2 in different layers, it is not advisable to do so.

Figure 13:
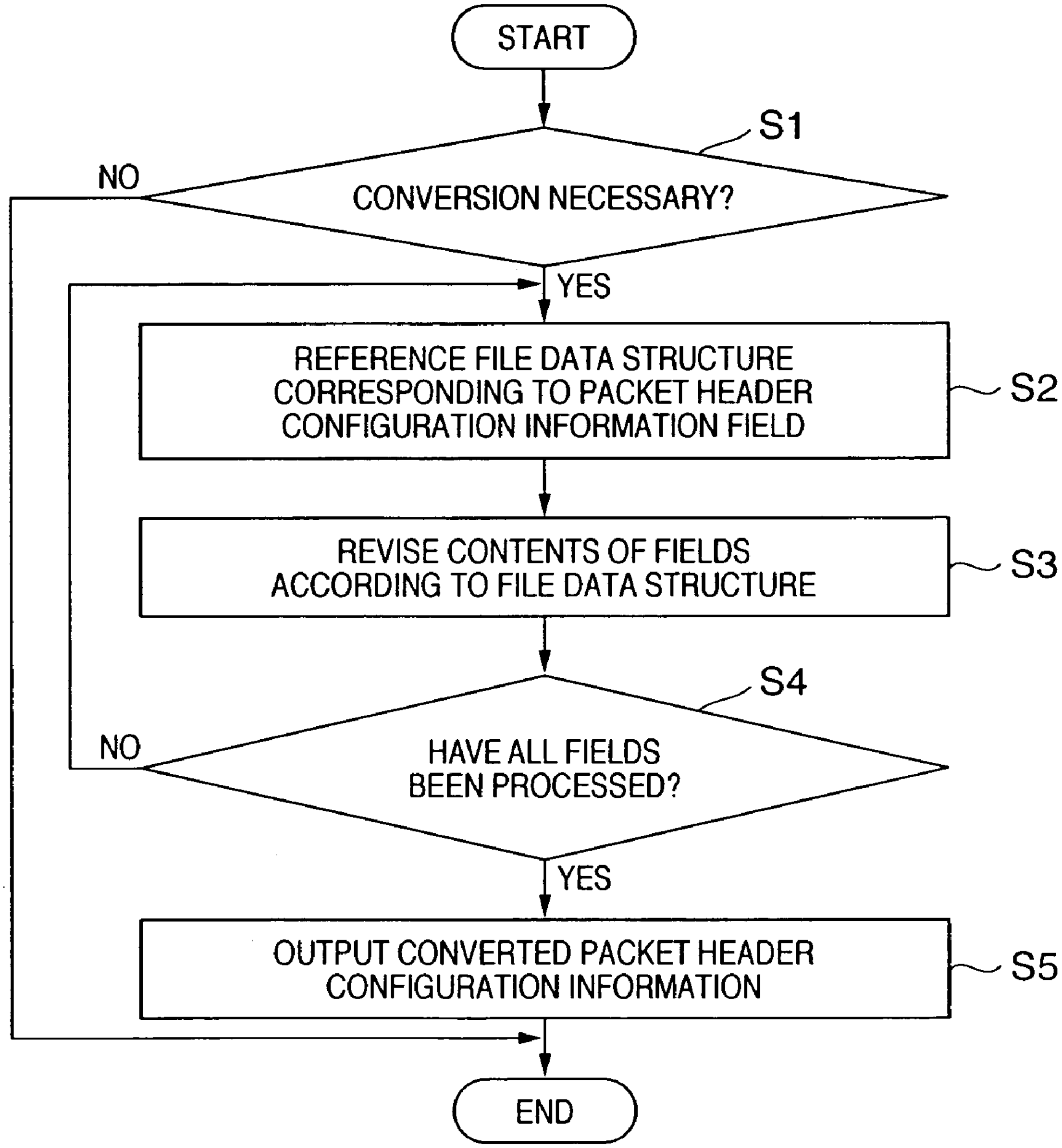
FIG. 13 is a flow chart illustrating the packet header configuration information conversion process according to one embodiment of the present invention.

Next, a description is given of the processing performed by the packet header configuration information converter 2 of the present embodiment. FIG. 13 is a diagram illustrating steps in a process of converting the packet header configuration information.

First, in a step S1, a check is made to determine if it is necessary to convert the packet header configuration information recorded in the file data to be reproduced. For example, a determination is made as to whether or not it is necessary to convert the packet header configuration information based on the format of the contents data (whether MP4 or not) and the content of the configuration information (SLConfigDescriptor). In the present embodiment, a case in which it is necessary to convert the packet header configuration information is one in which the contents data is in MP4 file format. It should be noted that whether or not such file is in MP4 file format is determined by the file data analyzer 1 checking (1) if the file name extension is ".mp4", (2) if the data structures contained in the file match the data structures defined by MP4 file format specifications. In step S1, it is confirmed if the content of the contents data matches these conditions and, as a result, only when conversion is necessary is the packet header configuration information converter 2 activated and the next part of the process executed.

Figure 8:
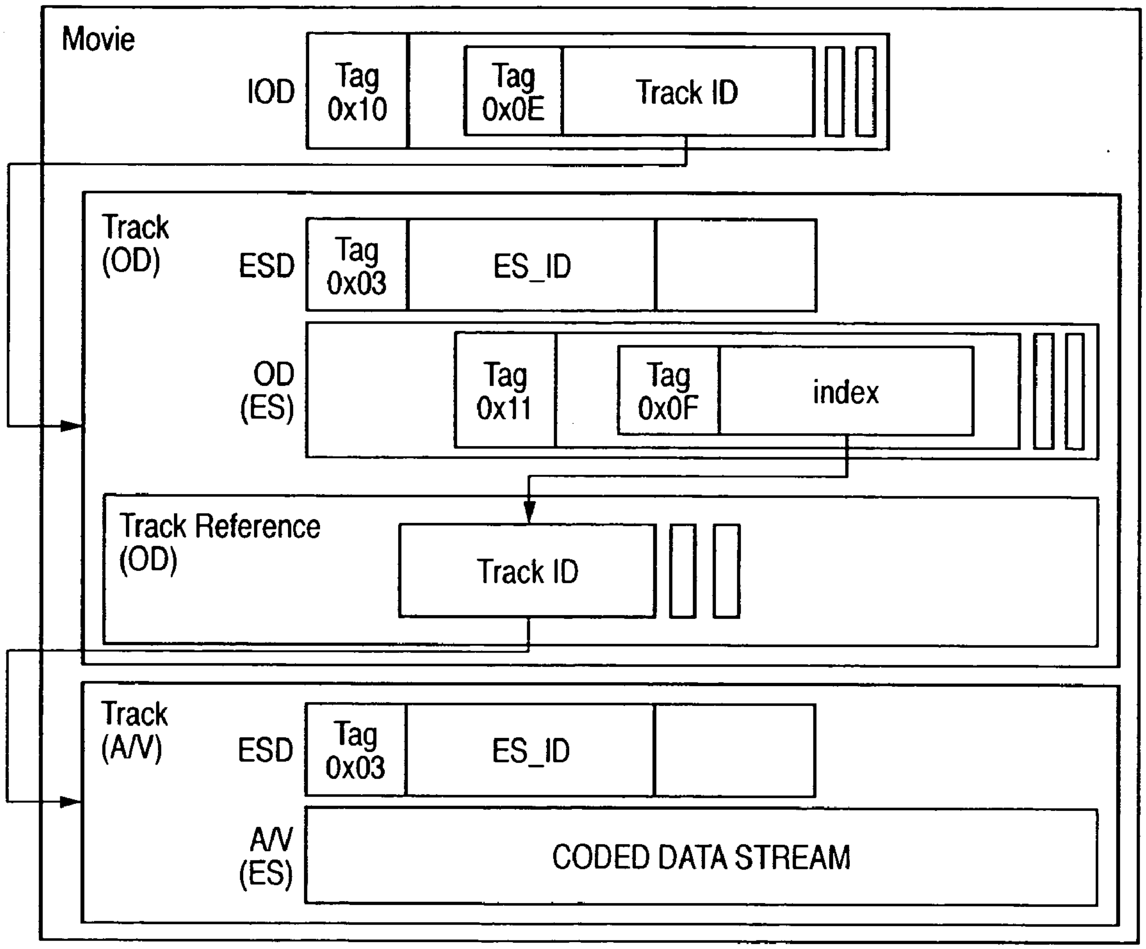
FIG. 8 is a diagram illustrating relational definitions for media data using object descriptor information in MP4 file format.

In a step S2, the packet header configuration information converter 2 references the data structures in the file data related to predetermined fields of the packet header configuration information (a description relating to the fields shown in FIG. 8 is given later, regarding a detailed example of a case in which the packet header configuration information is the SLConfigDescriptor). In order to carry out this process, the internal structure of the file data must be analyzed. Therefore, it is necessary to request of the file data analyzer 1 a data analysis either in advance or when it becomes necessary.

Next, in a step S3, the packet header configuration information converter 2 revises the contents of the fields of the corresponding packet header configuration information in accordance with the contents of the data structures referenced in step S2. The revised contents are then stored in the packet header configuration information converter 2 until processing of all fields is finished.

The processes of steps S2 and S3 are executed by the packet header configuration information converter 2 for all fields of the packet header configuration information in the file data. That is, in a step S4, it is determined whether or not the processes of steps S2 and S3 have been executed for all items of the packet header configuration information, and the processes of steps S2 and S3 are repeated until all fields have been so processed.

When all fields have been processed, processing proceeds to a step S5, where the packet header configuration information converter 1 outputs the post-conversion packet header configuration information obtained by executing the foregoing steps.

It should be noted that the output of the output packet header configuration information may be expressed in any format suited to the purposes of the user. For example, where the output packet header configuration information is to be forwarded to an external module over a network, such information may be expressed in a format suitable for a transport protocol between modules.

Through the procedures described above, the data processing method of the present embodiment can obtain packet header configuration information that matches the structure of the contents data. Next, a description is given of a more specific embodiment.

(About the Packet Header Configuration Information Conversion Process)

A detailed description is now given of the packet header configuration information (SLConfigDescriptor) conversion process executed in steps S2 and S3 where the contents data to be processed is written in MP4 file format.

The packet header configuration information converter 2 of the first embodiment converts the contents of the SLConfigDescriptor using the conversion rules shown in FIG. 14. In FIG. 14, the "Field" column indicates the fields contained in the SLConfigDescriptor. The "in" column indicates the contents of the pre-conversion SLConfigDescriptor contained in the MP4 file format data, and the "out" column indicates the contents of the SLConfigDescriptor after conversion. Fields marked with an ○ in the "in" and "out" columns represent that which is set as a valid control field in the SLConfigDescriptor. Fields for which the "in" column and the "out" column are blank are invalid fields, and are not set in the SLConfigDescriptor. Fields with a Δ in the "out" column are fields that are not described as valid fields in the present embodiment but that logically can be treated as valid control fields. The "Comment" column describes what kind of state the relevant field is in and how it is set. In the present embodiment, an SLConfigDescriptor in which 0x02 is set in the "predefined" field is to be processed, and therefore prior to conversion only the useTimeStampFlag field is valid (see FIG. 5).

Next, a description is given of how the fields shown in FIG. 14 are reflected in the SLConfigDescriptor instep S3.

First, the value of the "predefined" field of the SLConfigDescriptor is changed to x00 ("Custom"). As described above, the value of the "predefined" field of the SLConfigDescriptor is usually 0x02 when obtained from MP4 file data, and therefore the value of "predefined" must be changed to 0x00 when setting each field individually as in the present embodiment.

The "useAccessUnitStarFlag" and the "useAccessUnitEndFlag" fields are used where it is necessary to break up the packets for streaming. The information for such breaking up is described in the MP4 file using an ordinary hint track. Therefore, whether these flags are to be used or not depends on the existence of a hint track. That is, where a hint track for the stream to be processed exists in the MP4 file data, the packet header configuration information converter 2 sets "useAccessUnitStarFlag" and "useAccessUnitEndFlag" to 1.

Moreover, where "SyncSampleBox" exists in the media track, 1 is set in a "useRandomAccessPointFlag" field, and where "SyncSampleBox" does not exist in the media track, 1 is set in a "useRandomAccessUnitsOnlyFlag" field. When 1 is set in the "useRandomAccessPointFlag" field, a flag is set in the SL_PacketHeader indicting whether or not that SL-PDU can be randomly accessed. Therefore, the packet header configuration information converter 2 confirms whether or not SyncSampleBox exists in the MP4 file data and sets appropriate values in the "useRandomAccessFlag" and the "hasRandomAccessUnitsOnlyFlag" fields.

The "useIdleFlag" and "use PaddingFlag" fields are not treated in this embodiment because there are no data structures corresponding to the MP4 file format.

The "useTimeStampFlag" field is determined by the presence or absence of the "DecodingTimeToSampleBox" entry. The packet header configuration information converter 2 confirms whether or not the "DecodingTimeToSampleBox" entry exists, and sets 1 in the "useTimeStampFlag" field if the "DecodingTimeToSampleBox" entry is present and 0 if the "DecodingTimeToSampleBox" entry is absent.

A "timeScale" value of the track corresponding to the stream to be processed is used for the value set in the "timeStampResolution" field. Therefore, the packet header configuration information converter 2 obtains the relevant track from the MP4 file data and sets it as the "timeStampResolution". It should be noted that the timescale is normally 32 bits in length.

A timescale value of an OCR track referenced from the stream to be processed is used for the value set in the "OCRResolution" field. Therefore, the packet header configuration information converter 2 determines the relevant OCR track from the track reference information, and obtains and sets the OCR track timescale.

Use of the "durationFlag" as well as the "timescale", "accessUnitDuration" and "compositionUnitDuration" fields necessitates calculating the difference between the DTS and the CTS among samples in order to obtain the sample unit duration. In particular, it is difficult to obtain the "compositionUnitDuration" field value in real time because the samples are not always aligned in order of CTS. Therefore, in the present embodiment these fields are not to be processed. However, it should be noted that it is possible to use the "durationFlag" field provided that it is possible to supply a process for calculating the sample unit duration.

The maximum bit length of the "timeStampLength" and the "OCRlength" fields changes depending on the version of the MP4 file format involved. Accordingly, the packet header configuration information converter 2 confirms the version of the MP4 file format and sets in these fields the value 32 if the version is 0 and 64 if the version is 1. It should be noted that the values indicated here are bit length maximum values, and therefore, because values that do not satisfy the maximum bit length might be used in actual MP4 file data, the packet header configuration information converter 2 may be set so as to obtain and set the maximum number of bits actually used.

The value 32 established by current MP4 specifications as the entry size of the "SampleSizeBox" is set in the "AU_Length" field. However, future versions are predicted to have extensions for using 64-bit integer values, or extensions for handling streams that use small-size samples such as compressed format audio, and therefore there is a possibility that the setting values will change. In that case, the rules may be changed so as to set values that comply with the specifications.

The "instantBitRateLength" field is not to be processed in this embodiment because no item can be held in the MP4 file data that corresponds to the instantBitRate. However, it should be noted that it is possible to use the instantBitRate if a process for calculating the instantBitRate dynamically in real time is supplied.

The degradationPriorityLength is used where the DegradationPriorityBox is present. A priority value of an entry of the DegradationPriorityBox corresponding to that SL-PDU is set in the SL_PacketHeader. Therefore, the packet header configuration information converter 2 confirms whether or not DegradationPriorityBox is present and sets an appropriate value (0 or 16). It should be noted that the maximum bit length of the degradationPriority is 15 bits. Accordingly, either 15 or 16 (including a padding bit) can be set in the degradationPriorityLength field depending on the actual configuration (16 is used in FIG. 14).

The AU_seqNumLength and PacketSeqNumLength fields are mainly used to detect multiplexed transmission packets or packet loss during streaming. This type of information is ordinarily written in the hint track. Therefore, the packet header configuration information converter 2 confirms whether or not a hint track for the stream to be processed is present in the MP4 file data. If a hint track is present, then field values obtained from the hint track Sample Entry are set in the AU_seqNumLength and PacketSeqNumLength fields.

The startDecodingTimeStamp and the startCompositionTimeStamp fields are always set to 0, because the initial value of the time stamp is stipulated as 0 under current MP4 standards and there is no area that can hold this value defined in the MP4 file format.

By applying conversion process specifications like those described above to the process of step S3 in FIG. 13, the packet header configuration information converter 2 is able to convert the SLConfigDescriptor properly. It should be noted that the foregoing rules are determined on the basis of current MP4 file format standards. Consequently, it is apparent that, if an extension to the MP4 file format arises or if the present embodiment is applied to some other, similar file format, conversion rules suitable for such file formats must be defined.

(Provision of Packet Header Configuration Information to Sync Layer (Method Using IOD))

Next, a description is given of methods of delivering the SLConfigDescriptor converted as described above from the Delivery Layer 201 to the Sync Layer 202. It should be noted that, in the MPEG-4 Systems, there are two types of methods of delivering the SLConfigDescriptor from the Delivery Layer 201 to the Sync Layer 202. One method involves delivering the SLConfigDescriptor as one part of the data of the InitalObjectDescriptor (IOD) at the start of reproduction. The other method involves delivering the SLConfigDescriptor as one part of the data of the ObjectDescriptor (OD) stream at any point in time during reproduction. Below is a description of the former method. A description of the latter method is given later.

The process of delivering the SLConfigDescriptor to the Sync Layer 202 as one part of the IOD is usually executed only once, immediately after reproduction of the contents data has been started.

Figure 15:
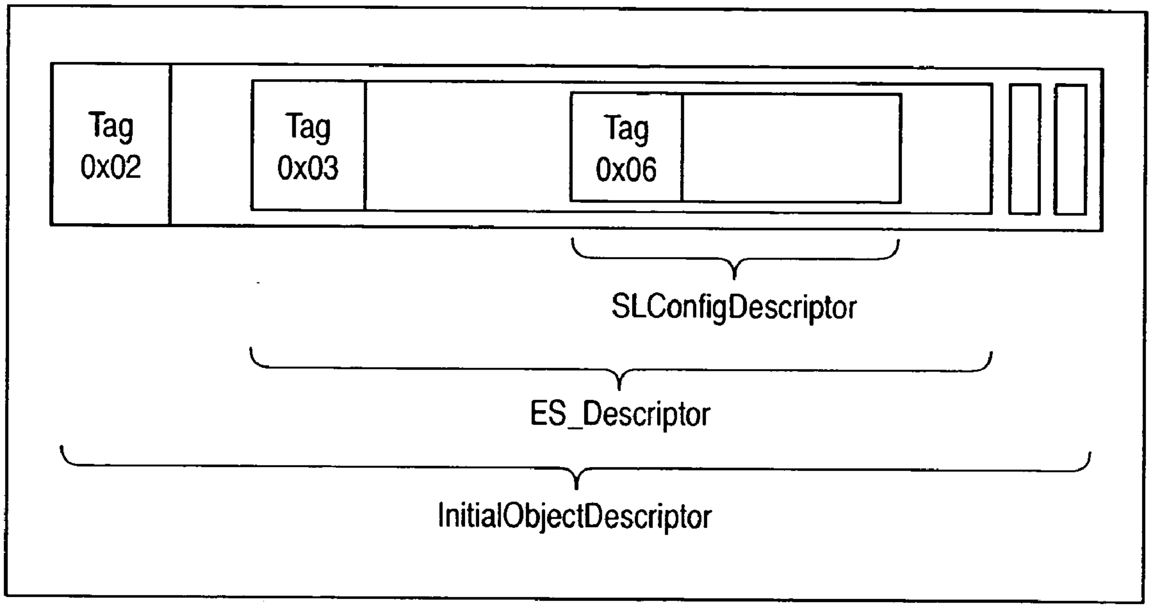
FIG. 15 is a diagram showing the configuration of an InitalObjectDescriptor.

FIG. 15 is a diagram showing the IOD data structure. As shown in FIG. 15, the SLConfigDescriptor is stored in the IOD. A plurality of SLConfigDescriptors can be stored in the IOD. Therefore, in a second embodiment of the present invention, the SLConfigDescriptors are extracted in order from the IOD.

Figure 16:
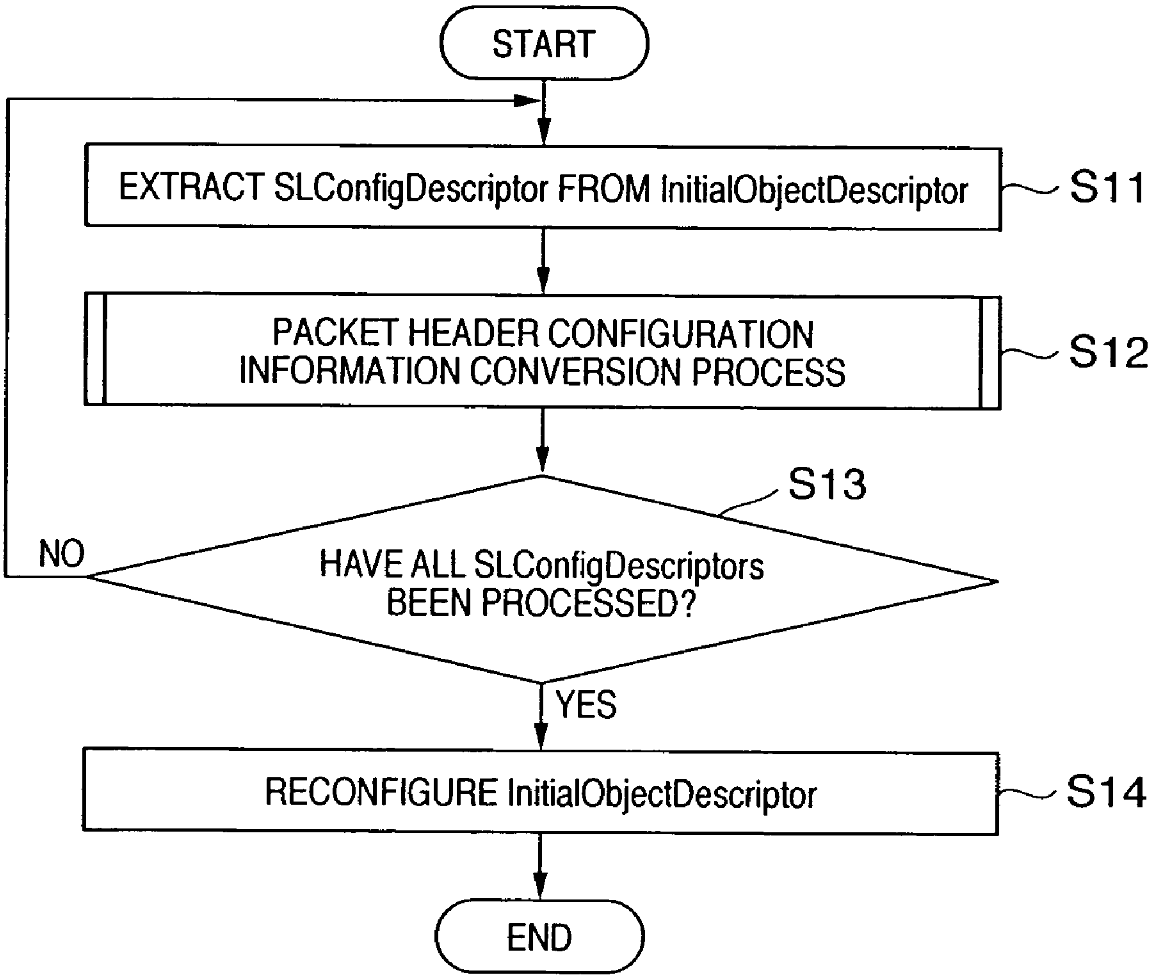
FIG. 16 is a flow chart illustrating a process of converting a SLConfigDescriptor contained in the InitalObjectDescriptor.
Figure 17:
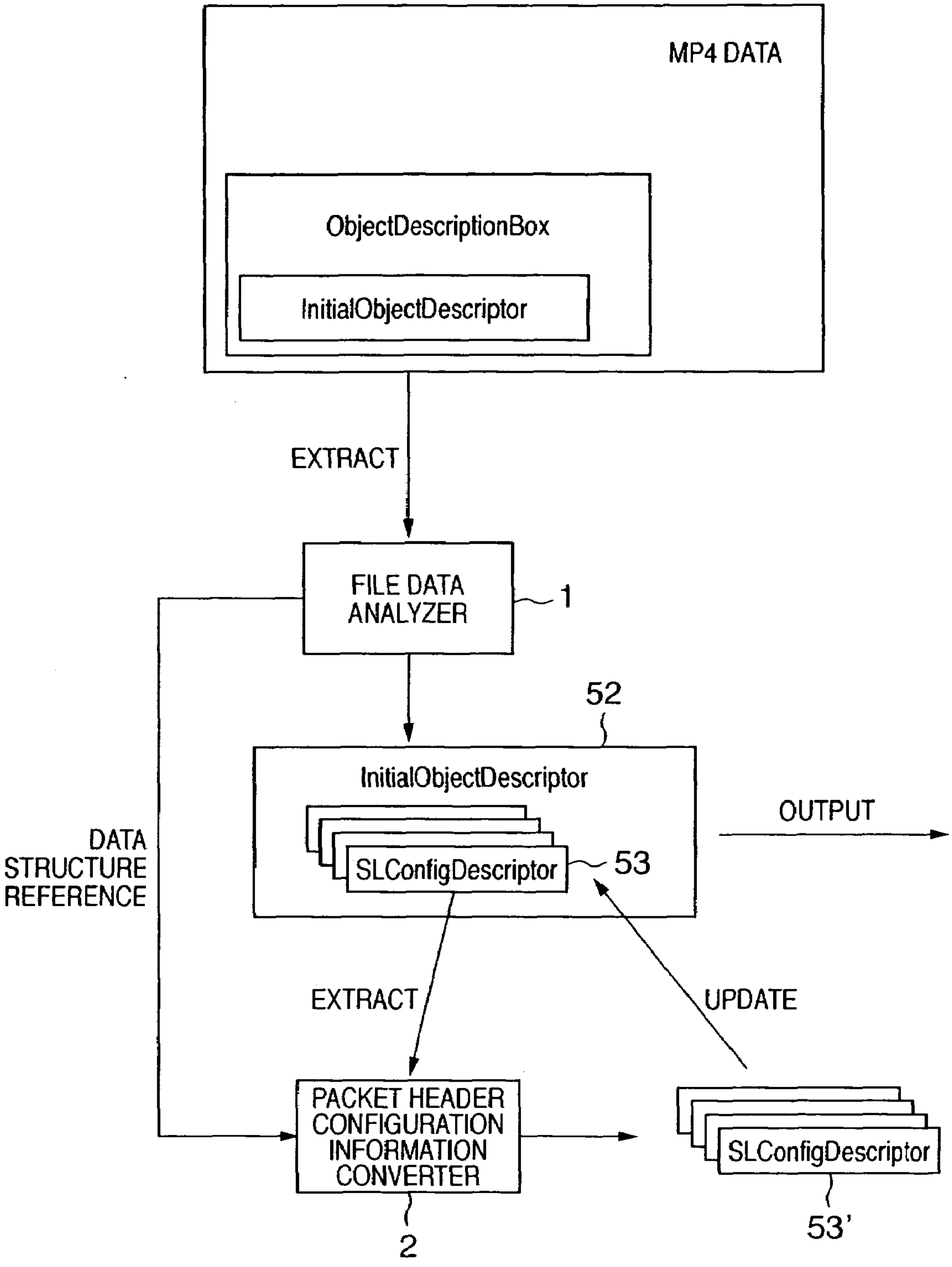
FIG. 17 is a diagram showing the outlines of the process of converting the SLConfigDescriptor included in the InitalObjectDescriptor.

A description is first given of the processing procedure in a case in which the packet header configuration information is provided to the Sync Layer using the IOD, using FIGS. 16 and 17. FIG. 16 is a flow chart illustrating the processing procedure of the present embodiment. FIG. 17 is a diagram illustrating the processing flow of the present embodiment.

First, in a step S11, the file data analyzer 1 analyzes the data of the IOD 52 contained in the MP4 file data 51, extracts the SLConfigDescriptor 53 data, and provides the extracted SLConfigDescriptor to the packet header configuration information converter 2. If in MP4 file format, the IOD 52 is held in the ObjectDescriptorBox. Therefore, before executing this process, the file data analyzer 1 first analyzes the MP4 file data and obtains the IOD 52 data.

Next, in a step S12, the packet header configuration information conversion process described in FIG. 13 is executed for the extracted SLConfigDescriptor data 53 by the packet header configuration information converter 2. The output results are stored in the Delivery Layer 201 until processing of all SLConfigDescriptors is completed.

At a step S13, a check is made to determine if all SLConfigDescriptors have been subjected to the processes of steps S11 and S12. If unprocessed SLConfigDescriptors are present, then the processes of the aforementioned steps S11, S12 are repeated until processing of all SLConfigDescriptors is finished. When processing of all SLConfigDescriptors is completed, in a step S14 the output of the packet header configuration information converter 2 (SLConfigDescriptor 53') is substituted for the contents of the SLConfigDescriptor 53 and the IOD is reconfigured. The reconfigured IOD is then output to the Sync Layer 202.

(Provision of Packet Header Configuration Information to Sync Layer (Method Using OD))

Next, a description is given of the processing procedure in a case in which the packet header configuration information is provided to the Sync Layer 202 as part of the data of the Object Descriptor (OD) stream at an arbitrary point in time during reproduction.

Figure 2:
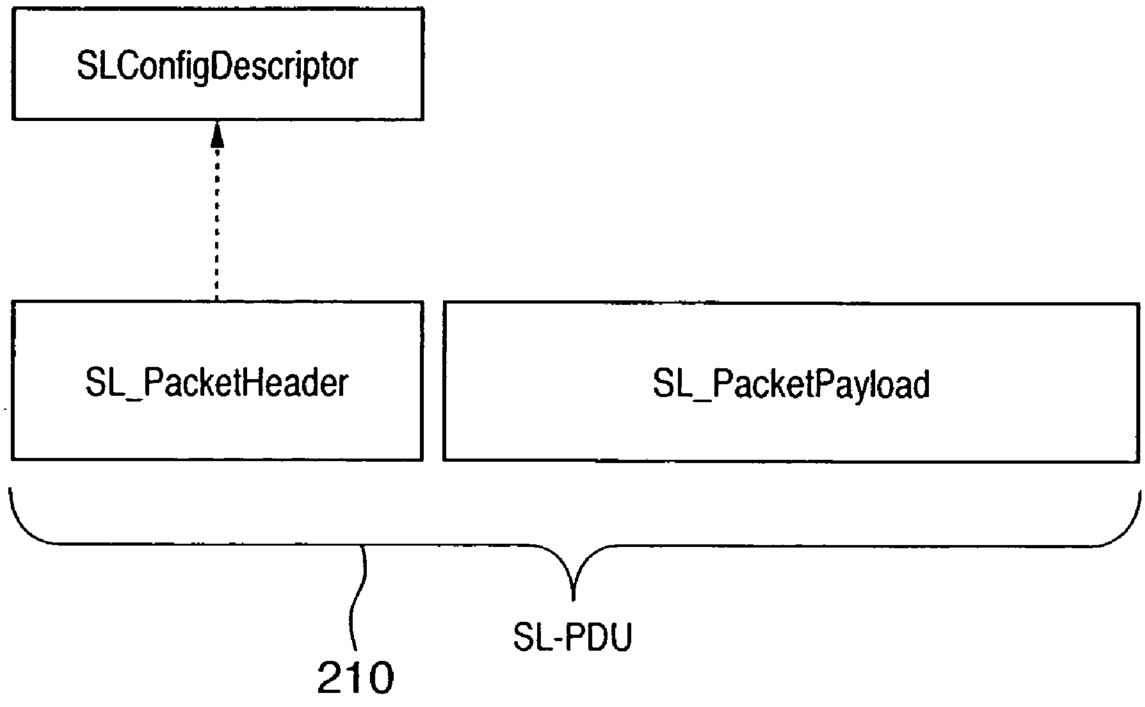
FIG. 2 is a diagram showing the configuration of an SL-PDU.
Figure 18:
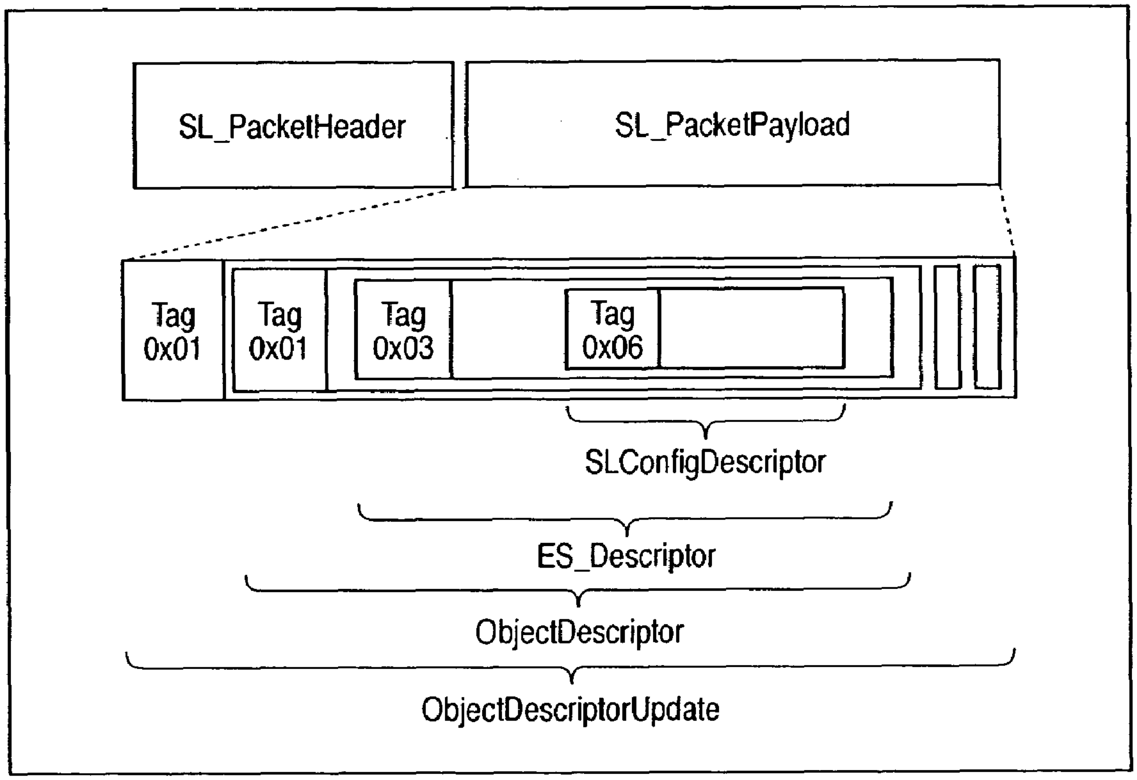
FIG. 18 is a diagram showing the configuration of an ObjectDescriptor stream SL-PDU.

FIG. 18 is a diagram showing the OD stream data structure. In the Sync Layer 202, the data of the OD stream is delivered in an SL-PDU format like that shown in FIG. 2. In other words, the data containing the SLConfigDescriptor is itself, in the case of MP4, set in the SL-PDU SL_PacketPayload. Where the SLConfigDescriptor is delivered by the ObjectDescriptor stream, the contents of the SL_PacketPayload become a data sequence indicating the ObjectDescriptorUpdate command. Data containing a plurality of SLConfigDescriptor data units can be stored in the ObjectDescriptorUpdate command data. The SLConfigDescriptor is stored in the OD as shown in FIG. 18. In addition, a plurality of SLConfigDescriptors can be stored in the OD. Therefore, in the present example it is necessary to extract in order the SLConfigDescriptors from the SL-PDU in the OD stream for processing.

Figure 19:
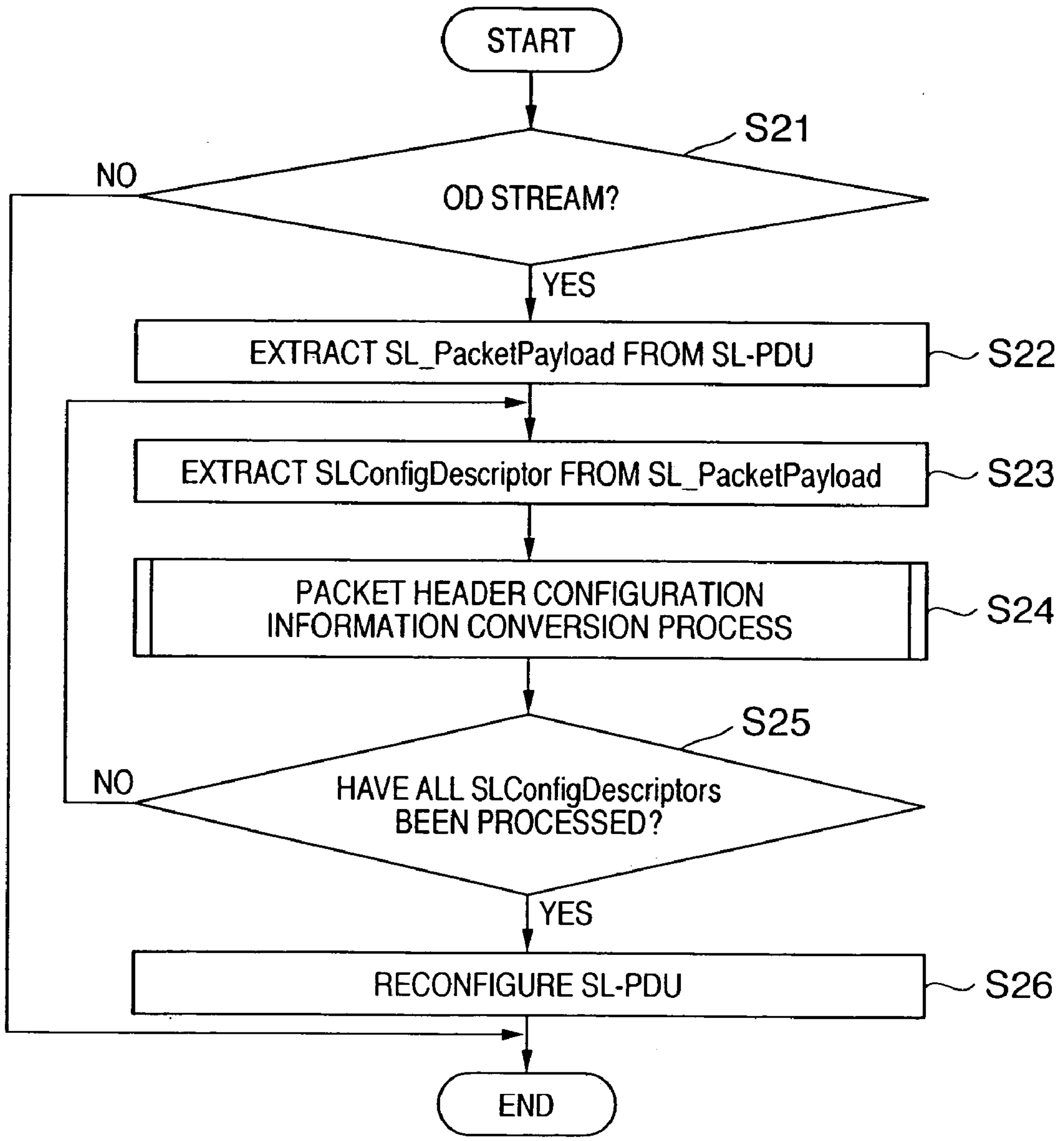
FIG. 19 is a flow chart illustrating a process of converting a SLConfigDescriptor contained in an Object Descriptor stream.
Figure 20:
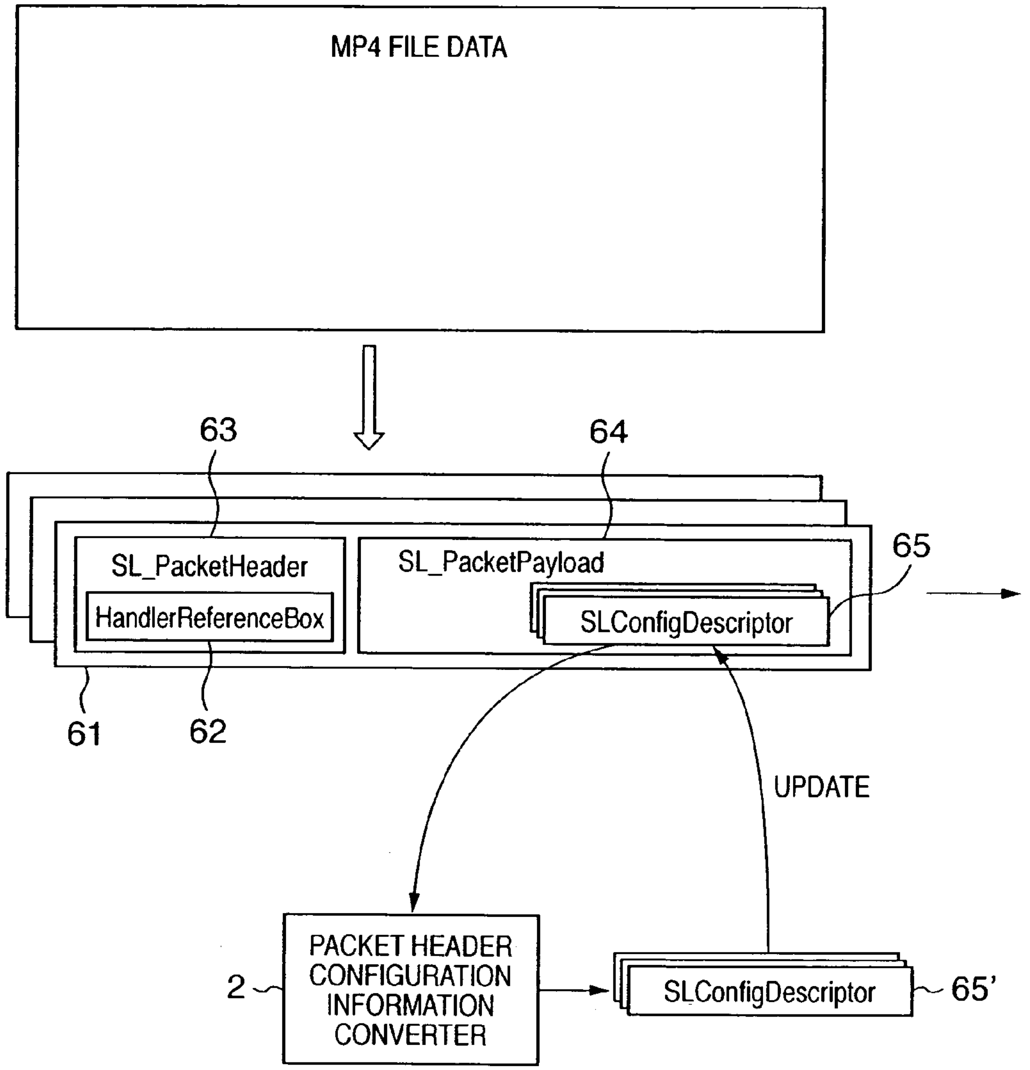
FIG. 20 is a diagram showing the outlines of the process of converting the SLConfigDescriptor included in the ObjectDescriptor.

A description is now given of the processing procedure in a case in which the packet header configuration information is provided to the Sync Layer using the OD, using FIGS. 19 and 20.

First, in a step S21, in order to determine whether or not the relevant SL-PDU contains an SLConfigDescriptor, it is determined whether or not a stream 61 to be processed is an OD stream. In the case of the MP4 file format, the type of stream to be processed can be determined by the "handler_type" field of a HandlerReferenceBox 62. In the case of the OD stream, the "handler_type" field of the HandlerReferenceBox is "odsm". If the stream to be processed is not an ObjectDescriptor stream, then the succeeding processes are skipped because there is no SLConfigDescriptor to be converted therein.

By contrast, if the stream to be processed is an OD stream, then in a step S22 the stream SL-PDU is divided into an SL_PacketHeader 63 and an SL_PacketPayload 64. Then, in a step S23, data of an SLConfigDescriptor 65 is extracted from the command data stored in the SL_PacketPayload 64. In a step S24, the extracted SLConfigDescriptor data 65 is provided to the packet header configuration information converter 2 and the packet header configuration information conversion process described in FIG. 13 is executed thereon to obtain converted SLConfigDescriptor data 65'. All conversion results are stored in memory until processing of all SLConfigDescriptors is finished.

In a step S25, a check is made to determine if the processes of steps S23 and S24 have been carried out for all SLConfigDescriptors. If any unprocessed SLConfigDescriptor exists, then the processes of steps S22 and S23 are repeated until all the SLConfigDescriptors have been processed. When processing of all SLConfigDescriptors is finished, processing then proceeds to a step S26 and the output results of the packet header configuration information converter 2 (that is, SLConfigDescriptor 65') are substituted for the contents of the SLConfigDescriptor 65 of the SL_PacketPayload 64 and the SL-PDU is reconfigured.

Second Embodiment

In the first embodiment described above, in step S5 in FIG. 13, the converted packet header configuration information is output unconditionally to the Sync Layer. In a second embodiment, however, the pre-conversion form of the SLConfigDescriptor is delivered to the Sync Layer if, as a result of conversion, the configuration of the SLConfigDescriptor obtained as a result of the execution of the packet header configuration information conversion process is unchanged from the pre-conversion SLConfigDescriptor configuration.

For example, where a fixed configuration is used using the "predefined" field, it is sufficient to set only the predef ined field in the SLConfigDescriptor, and thus the SLConfigDescriptor data size can be reduced compared to a case in which the configuration of each field is set individually without using "predefined". Such an arrangement is effective when adapting the present invention to a processing system in which the packet header configuration information output as the conversion result or the sync control information generated based thereon is transmitted to another module over a low-speed transmission path, or to a processing system in which it is necessary to reduce the data to be processed to a minimum because the useable memory and other resources are severely limited.

With the processing performed by the present embodiment, first, a copy of the SLConfigDescriptor data contained in the MP4 file data is temporarily stored in the RAM 3 or other memory. It should be noted that, at this time, if the "predefined" field is set in the SLConfigDescriptor, it is developed to all fields and saved (for example, if "predefined" is 0x01 or 0x02, it is developed as shown in FIG. 5). Then, the packet header configuration information conversion process shown in FIG. 13 is executed and an SLConfigDescriptor obtained as the output result is compared to the configuration shown by the SLConfigDescriptor data first stored in memory. If the contents of both are identical, then the SLConfigDescriptor that is the output result of the packet header configuration information converter 2 is discarded and the SLConfigDescriptor data first stored in memory and has a smaller data size is used.

Moreover, for example, when adapting the processing described above to the flow charts shown in FIGS. 16 and 19, the following is sufficient: That is, in step S11 (S23), the extracted (where "predefined" is set this is developed) SLConfigDescriptor is stored in a predetermined memory area. Then, in the reconfiguration process of step S14 (S26), the post-conversion SLConfigDescriptors and the pre-conversion SLConfigDescriptors stored in the above-described predetermined storage area are compared. If the results of the comparison indicate that the configuration contents of the pre- and the post-conversion SLConfigDescriptors are identical, then the post-conversion SLConfigDescriptors are discarded and the original, un-reconfigured SLConfigDescriptors are used.

Thus, as described above, unnecessary increases in data size of the packet header configuration information and the sync control information based thereon can be reduced.

Third Embodiment

With a third embodiment of the present invention, a description is given, in the transmission of the OD or IOD data containing a post-conversion SLConfigDescriptor obtained by the conversion processes of the embodiments described above to another reproduction terminal over a network, of an example of a process executed when converting the data to be transmitted into a form suitable for the means of communications between terminals.

In the foregoing descriptions, it is presumed that the conversion result data is to be delivered from the Delivery Layer 201 to the Sync Layer 202 of the same reproduction terminal. By contrast, in the case of the third embodiment, the conversion results are sent from the Delivery Layer 201 of one reproduction terminal to the Delivery Layer 201 of another reproduction terminal. The archetypical embodiment of such an arrangement is a reproduction system that streams contents data from a contents server to a client terminal.

As specifications for establishing communications means for streaming MP4 contents, there are the above-described ISMA specifications.

In the ISMA specifications, the InitialObjectDescriptor and the ObjectDescriptor are transmitted using RTSP (Real-Time Streaming Protocol). As shown in FIG. 21, the actual data is written as a line beginning with "a=mpeg4-iod:" in the header field of the RTSP written in a format established by the SDP (Session Description Protocol). This line of data is expressed as a URL (Uniform Resource Locator), at the end of which is set an InitialObjectDescriptor encoded in Base 64 format which is one type of binary data text encoding format. Furthermore, the Objectdescriptor stream data is also encoded in the same URL format as the InitialObjectDescriptor and embedded in the InitialObjectDescriptor (in ISMA specifications, the ObjectDescriptor stream data is recorded not as an SL-PDU but as a portion of the SL_PacketPayload, that is, only the ObjectDescriptor data is recorded).

Output in a format established by ISMA specifications is possible by a process in which, after conversion of the SLConfigDescriptor by the conversion processes of the embodiment described above, the InitialobjectDescriptor containing the SLConfigDescriptor and the ObjectDescriptor data is encoded in a predetermined URL format, molded as an SDP-format RTSP header, and transmitted using RTSP. It should be noted that the detailed procedure for the process of coding in the above-described ISMA specifications is also a procedure that exceeds the scope of the essentials of the present invention insofar as it is a commonly known process, and therefore a description thereof is omitted herein.

Thus, as described above, by processing the conversion results packet header configuration information into a format suitable for a given communications means (device-to-device protocol), it is possible to provide the output results of the present embodiment to another reproduction terminal through a network or other transmission path. In other words, the present invention may be adapted to a system composed of a plurality of devices or to an apparatus consisting of a single device.

Fourth Embodiment

In the first embodiment of the present invention, a description was given of conversion of the packet header configuration information. It should be noted that the configuration of an information processing apparatus for implementing the reproduction process for multimedia contents data according to a fourth embodiment of the present invention is the same as that of the first embodiment (shown in FIG. 11).

Figure 22:
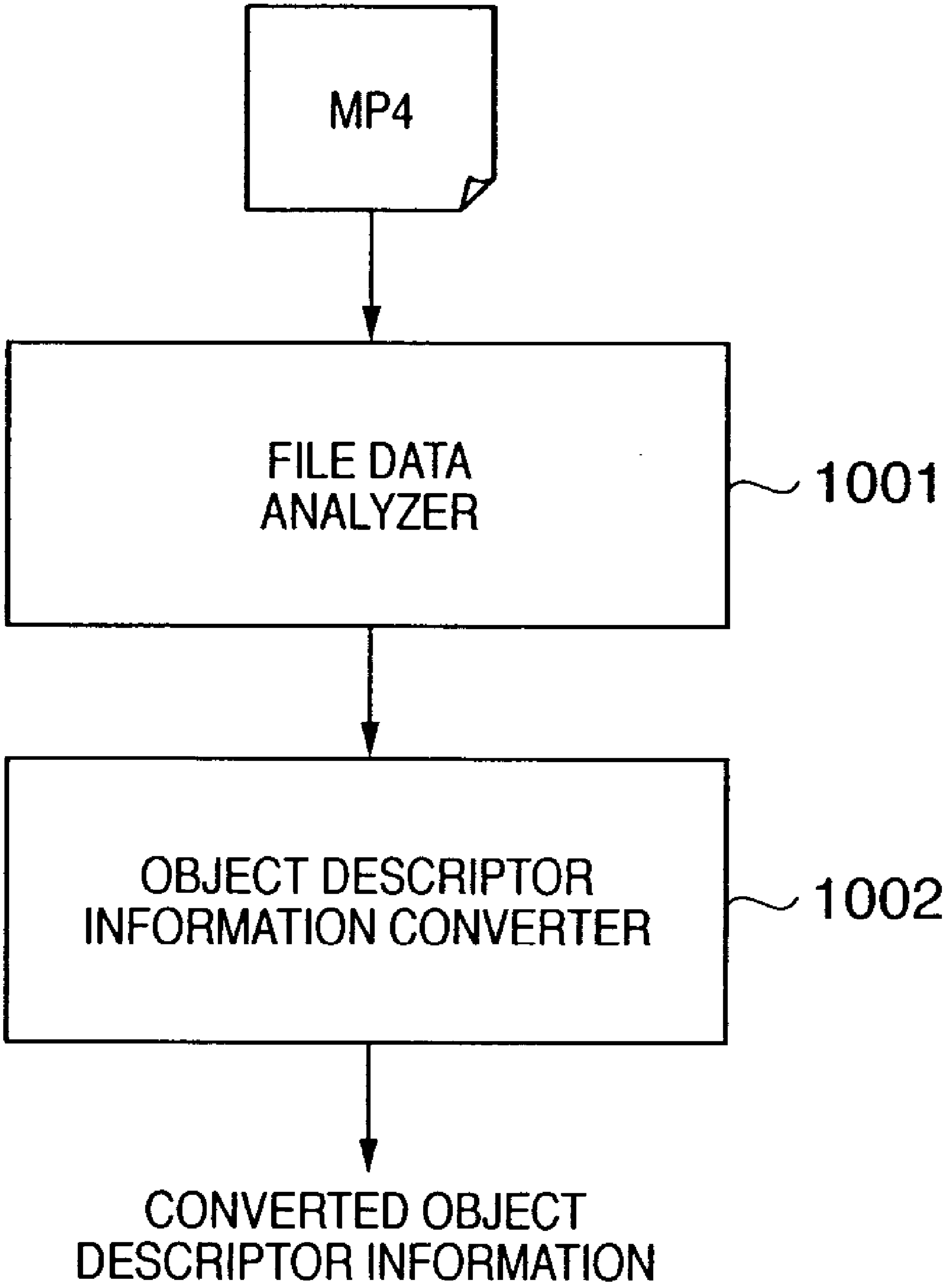
FIG. 22 is a diagram showing an example of module configuration according to a fourth embodiment of the present invention.

FIG. 22 is a diagram illustrating an example of the structure of a module of a reproduction terminal for object base coded contents according to a fourth embodiment of the present invention. The module structure is implemented by the CPU executing a predetermined control program in the information processing apparatus shown in FIG. 11.

In FIG. 22, a file data analyzer 1001 has the ability to analyze the inner structure of input contents data in MP4 file format or some other, similar file format. The input data to the file data analyzer 1001 may be input by any transmission form. For example, the actual data may be delivered to the file data analyzer 1001 over some sort of network or transmission path from an external memory or an external medium, or the position of the actual data such as the file path may be delivered so that the file data analyzer 1001 obtains the data.

An object descriptor information converter 1002 has the capability to convert and output object descriptor information or object descriptive information equivalent thereto contained in contents data in MP4 file format or some other, similar file format into a data format that can be handled at the next layer based on the internal structure of the file format to be processed. The structure of the contents data that the object descriptor information converter 1002 processes is either obtained or referenced from the file data analyzer 1001. The object descriptor information that the object descriptor information converter 1002 outputs as a conversion result is then delivered to the next layer (for example, the Sync Layer 202) through a DAI or an abstract interface equivalent thereto.

Moreover, the conversion result object descriptor information can be output to any given module. For example, the object descriptor information converter 1002 may process information from the file data analyzer 1001 and the results of that conversion returned to the file data analyzer 1001. By so doing, it becomes possible to obtain data converted without regard to the existence of the object descriptor information converter 1002 by the user requesting processing of the file data analyzer 1001.

In the present embodiment, the object descriptor information converter 1002 file data analyzer 1001 can obtain ESD data concerning the IOD and the OD as well as track reference data from the file data analyzer 1001 and convert and output such data in a format that the Sync Layer 202 and succeeding layers can handle by conventional means, in which the ESD is embedded in the IOD and the OD. Consequently, it becomes possible to propagate object descriptor information and to reproduce the contents correctly without conversion of the existing architecture (for example, an architecture established by MPEG-4).

Figure 7:
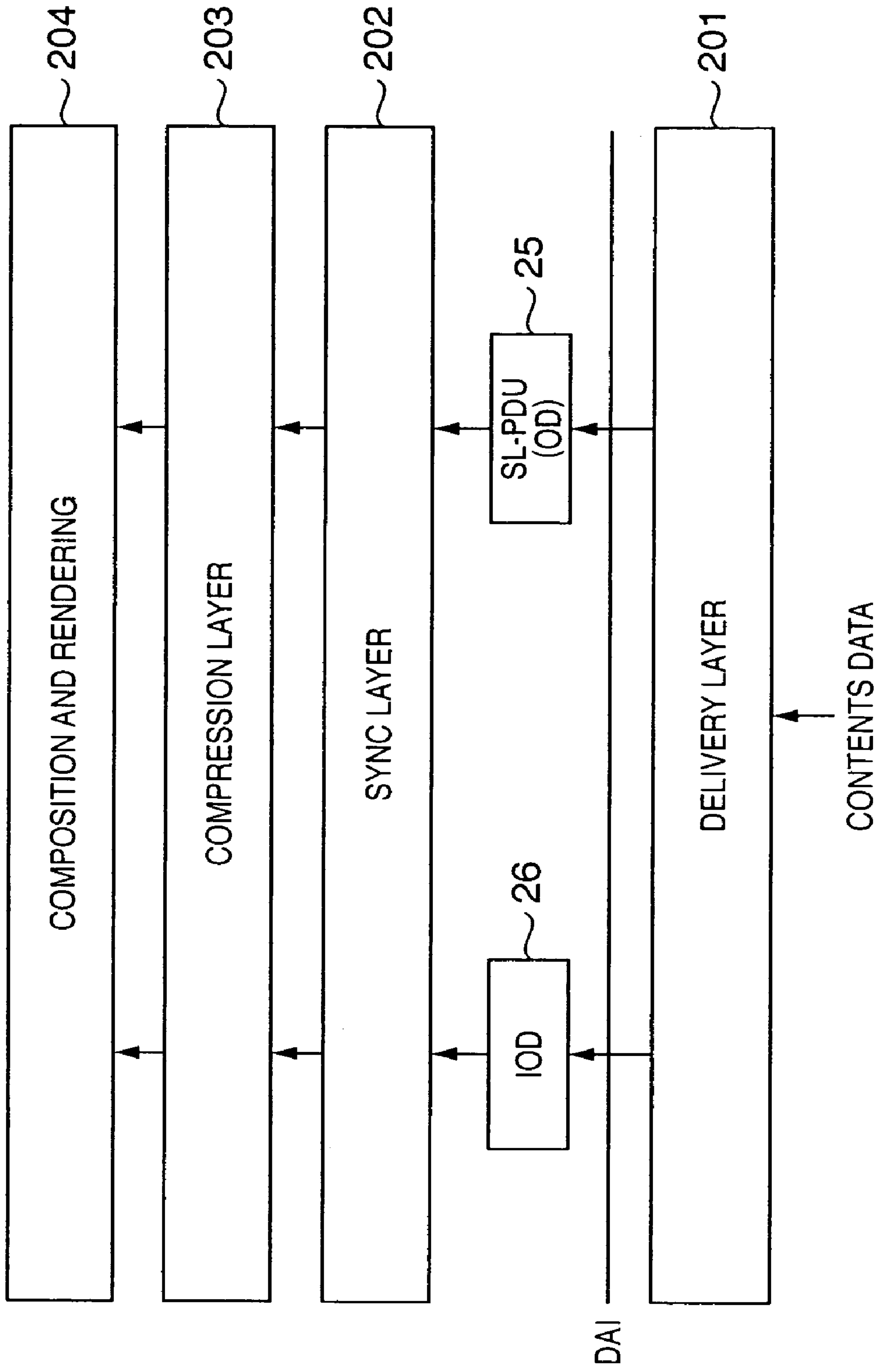
FIG. 7 is a diagram showing the architecture of a reproduction terminal in MPEG-4 Systems.

It should be noted that, logically, it is preferable that the file data analyzer 1001 and the object descriptor information converter 1002 be disposed in the Delivery Layer 201 shown in FIG. 7, as described with reference to FIG. 12 of the first embodiment.

Figure 23:
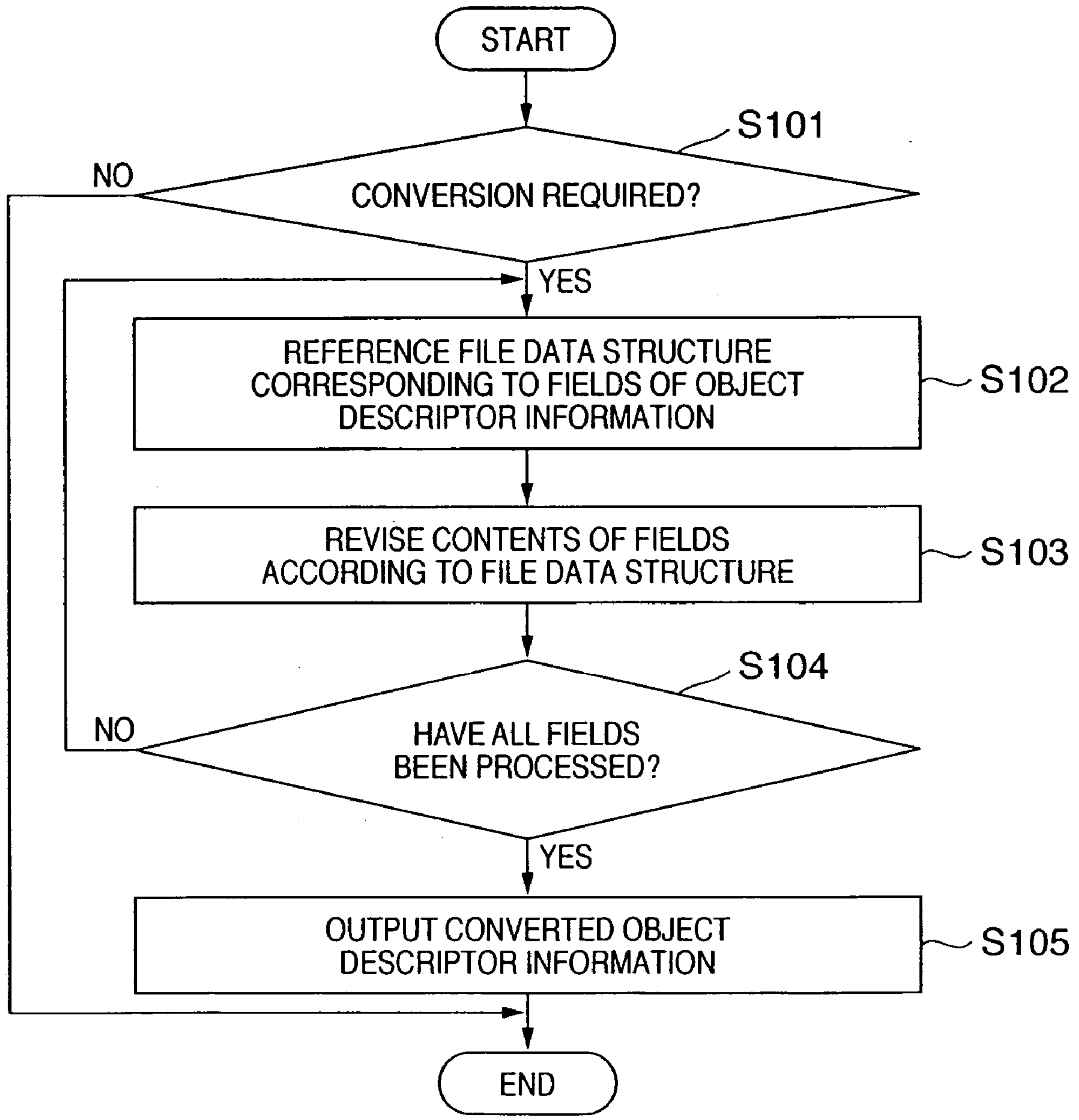
FIG. 23 is a flow chart illustrating an object descriptor information conversion process according to the fourth embodiment.

Next, a description is given of an object descriptor information conversion process according to the fourth embodiment. FIG. 23 is a flow chart illustrating the procedure for an object descriptor information conversion process in the fourth embodiment.

(Step S101)

First, a check is made to determine whether or not it is necessary to convert the object descriptor information recorded in the file data. In the present embodiment, a case in which it is necessary to convert the object descriptor information is one in which the contents data is in MP4 file format. Therefore, it is confirmed if this condition is met (that is, if the relevant file data is in MP4 file format or not). Only if the results indicate that a conversion is necessary is the object descriptor configuration information converter 2 activated and processing proceeds to a succeeding step S102. It should be noted that the method for determining whether or not the relevant file data is in MP4 file format is as described with reference to step S1 in FIG. 13.

(Step S102)

The object descriptor information converter 1002 references the data structures in the file data relating to predetermined fields of the object descriptor information (to be described in detail later). In order to carry out such process, the internal structures of the file data must be analyzed. Therefore, it is necessary to request of the file data analyzer 1001, either in advance or when it has become necessary, data analysis of the file data (Step S103)

The object descriptor information converter 1002, in accordance with the contents of the data structures referenced in step S102, (a specific example thereof to be described later) revises the contents of the fields of the corresponding object descriptor information. The revised contents are then stored inside the object descriptor information converter 1002 until processing of all items is finished.

(Step S104)

The object descriptor information converter 1002 then determines whether or not the processes of steps S102 and S103 described above have been carried out for all fields of the object descriptor information in the file data. Processing returns to step S102 if unprocessed items remain, and thus the processes of steps S102-S103 are repeated until all items are processed.

(Step S105)

The object descriptor information converter 1002 outputs the post-conversion object descriptor information obtained by execution of steps S101-S104 described above.

By the foregoing procedure is the object descriptor conversion process of the fourth embodiment executed, and object descriptor information that can be properly processed with existing architecture obtained.

Next, a description is given of a specific object descriptor conversion process embodiment, using boxes defined by MP4 file format shown in FIG. 24.

In FIG. 24, the sequences except the far right sequence indicate the type of box defined by the MP4 file format and its inclusive relation. In the far right sequence a description of the box of the relevant line is shown. To each box a 4-byte "type" for identifying the type is assigned, and is ordinarily expressed as a combination of 4 alphanumeric characters. The 4-character type is written in the sequence. In the following description, this type is used to indicate a particular box.

Moreover, in FIG. 24, a relation in which one box includes another box is indicated by the relative positions of the two sequences. This table shows that that a given box of one sequence includes a box or boxes indicated by a sequence position to the right of that sequence. For example, the "moov" box shown in the top line includes the "mvhd", "iods" and "trak" boxes. FIG. 25 shows a definition of the ESDBox for the purpose of describing the ESD data in the MP4 file format. In FIG. 25, the ESDBox is included in the MP4VisualSampleEntry ("mp4v"), MP4AudioSampleEntry ("mp4a") and MpegSampleEntry ("mp4s"), and is described in the Sample Description Box ("stsd") shown in FIG. 24.

It should be noted that a detailed description of the fields of the boxes as well as the fields contained in the object descriptor information is omitted from the present specification. The definitions described in the relevant specifications should be consulted for a description of the fields.

(Specific Example of the Process (IOD Generation) of Steps S102-S103)

A description is given of the procedure in a case in which, in the foregoing steps S102-S103, the object descriptor information converter 1002 obtains from the file data analyzer 1001 the IOD binary data stored in a format inside the MP4 file format contents data and that binary data converted. In other words, the procedure for generating an IOD in accordance with MPEG-4 from the MP4 file format contents is described, with reference to FIG. 26.

First, the file data analyzer 1001 analyzes the MP4 file data and delivers the MP4 internal format IOD binary data thus obtained to the object descriptor information converter 1002. The object descriptor information converter 1002 interprets the contents of the data thus received and carries out the following process.

(Step S111)

An ES=ID_IncTag (0x0E) in the IOD is replaced by an ES_DescrTag. At the same time, ESD data is obtained from the "esds" box of the track referenced by the Track ID following the ES_ID_IncTag and is set in a position indicated by the ES_DescrTag in the IOD. Described in terms of the example shown in FIG. 26, in the MP4 file format contents, Track 802 is specified by the Track ID in the IOD 801. The ES_ID_IncTag indicating the Track IDD is replaced with the ES_DescrTag indicating the ESD. Then, an ESD 804 in the "esds" box 803 in the designated Track 802 is obtained and set at the location of the replaced ES_DescrTag, thus substituting IOD 801' containing ESD (804).

(Step S112)

Figure 26:
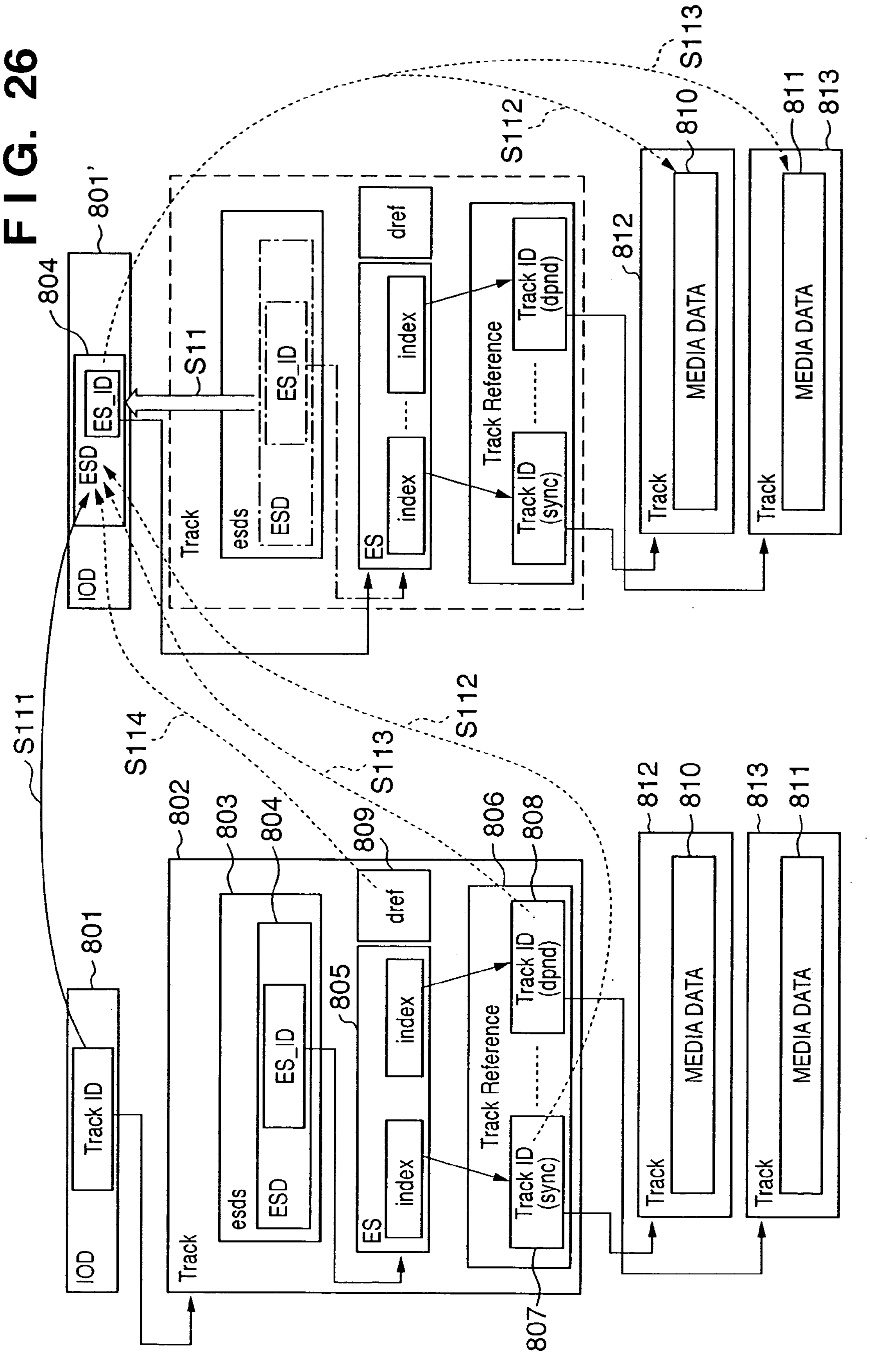
FIG. 26 is a diagram illustrating an object descriptor information conversion process according to the fourth embodiment.

The track reference data of the "sync" type contained in the track indicated in step S111 (Track 802 in FIG. 26) is obtained from the file data analyzer 1. Where such track reference data is present, 1 is set as the OCRStreamFlag value contained in the ESD 804 and the ES_ID of the track to be referenced that is described by the "sync" track reference is set as the OCR_ES_ID value. Where such track reference data is not present, the OCRStreamFlag is set to 0. For example, if the Track ID 807 in FIG. 26 is the "sync" type, then the ES_ID that indicates the media data 810 in the track 812 designated by the relevant Track ID is set as OCR_ES_ID in the ESD 804. It should be noted that the ES_ID can be obtained by referencing the ESD in the esds box of the corresponding track 812.

(Step S113)

Track reference data of the "dpnd" type contained in the track indicated in step S111 (that is, track 802 in FIG. 26) is obtained from the file data analyzer 1. Where such track reference data exists, 1 is set in the streamDependenceFlag contained in the ESD 804 and the ES_ID of the track to be referenced that is described in the "dpnd" track reference is set in the dependsOn_ES_ID. Where such track reference data does not exist, 0 is set in the streamDependenceFlag. For example, if the Track ID 808 shown in FIG. 26 is the "dpnd" type, then the ES_ID that designates the media data 811 in the track 813 specified by such Track ID is set in the dependsOn_ES_ID in the ESD 804. It should be noted that the ES_ID can be obtained by referencing the ESD in the esds box of the corresponding track 813.

(Step S114)

Data of the "dref" ("Data Reference Box"; see FIG. 24) track contained in the track indicated by step S111 (Track 802 in FIG. 8) is obtained from the file data analyzer 1. Where the data of an ES contained in the track is present as a separate file or other external matter, location information (generally a URL) for such ES data is described in the Data Reference Box. Where the relevant data exists, 1 is set in the URL_Flag contained in the ESD and the described URL data is set as the entry for the "url" type in the Data Reference Box in a URLstring. If the relevant data is not present, then the URL_Flag is set to 0. For example, as shown in FIG. 26, if the dref box 809 is present and the relevant data exists, then the URLString and the URL_Flag contained in the ESD 804 are set as described above.

By applying the aforementioned conversion process specifications to the processes of steps S102-S103 shown in FIG. 23, the object descriptor information converter 1002 can properly carry out conversion of MP4 file format internal format IOD to MPEGF-4 format IOD.

It should be noted that, in order to make possible the foregoing processing, in addition to the ability to obtain the IOD data the file data analyzer 1001 must be provided with at least the following capabilities:

track reference ("dpnd", "sync") information acquisition function

Data Reference Box URL entry ("url") information acquisition function function to obtain the ESD contained in the track specified by the track ID.

It should be noted that the foregoing conversion specifications have been established according to current MP4 file format specifications. Accordingly, as can be understood by those skilled in the art, if an extensions to the MP4 file format arises or the invention is applied to another, similar file format, conversion specifications appropriate to the file format must be defined.

(Specific Example of the Processes of Steps S102-S103 (OD Generation))

Figure 27:
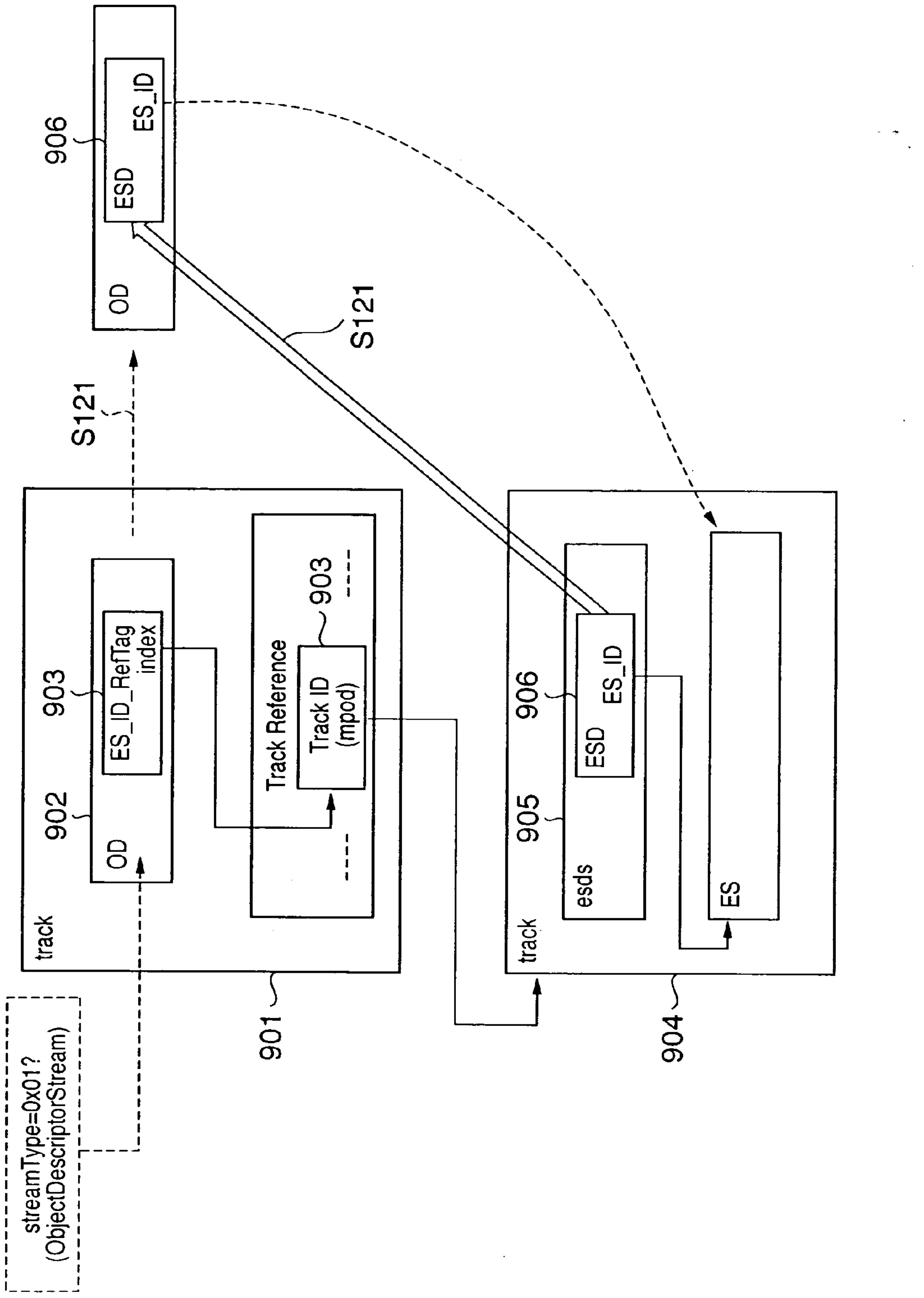
FIG. 27 is a diagram illustrating an object descriptor information conversion process according to the fourth embodiment.

Next, a description is given of the procedure where converting MP4 file format OD data, with reference to FIG. 27.

The OD data, unlike the IOD, is recorded in the track as media data contained in the ES. In other words, the OD data, as with other audio and video data formats, is handled in "samples" that are configurational units of the media data. Therefore, in order for the file data analyzer 1 to provide the OD data, the file data analyzer 1 should be equipped with the capability to obtain the track sample data, in order and as is. However, in order to obtain the OD data, information is required in order to determine if the track from which sample data is to be obtained is an OD data track or not. Whether or not the track is an OD data track can be determined by whether or not the DecoderConfigDescriptor streamType is 0x01 (ObjectDescriptorStream). In other words, the file data analyzer 1001 must have the ability to obtain the streamType of the track to be processed.

The object descriptor information converter 1002 confirms the contents of the streamType and only carries out the conversion process when streamType=0x01.

Like the IOD, the ESD contained in the OD is also expressed and recorded as a separate tag and reference format inside the MP4 file format file data. Specifically, the ESD included in the OD is held as an ES_ID_Ref that holds an index of the "mpod" track reference in the MP4 file. As a result, conversion of the OD data in MP4 internal format can be carried out in basically the same processing procedure as in the first embodiment.

(Step S121)

The OD ES_ID_RefTag is replaced with an ES_DescrTag. At the same time, ESD data is obtained from the "esds" box of the track referenced by the track ID at the position of the index number following the ES_ID_RefTag in the track reference data of the "mpod" type contained in the track that obtained the OD data, and is set at the position indicated by the ES_DescrTag in the OD.

For example, in FIG. 27, in track 901, where the DecoderConfigDescriptor streamType is 0x01, the track 901 media data is OD 902 and an area 903 defined by the ES_ID_RefTag inside the OD 902 is replaced by an ES_DescrTag. Then, an ESD 906 is obtained from an esds box 905 of a track 904 indicated by the track ID ("mpod" type) 903 designated by the index in the area 903. The ESD 906 is then incorporated into the ES_DescrTag portion. Thereafter, steps S112-S114 described above are executed on the ESD 906.

By applying the above-described conversion process specifications to the processes of steps S102-S103 shown in FIG. 23, the object descriptor information converter 1002 can properly carry out conversion of the MP4 internal format OD data.

It should be noted that, in order to make processing like that described above possible, in addition to the ability to obtain sample data from a track the file data analyzer must be provided with at least the following capabilities:

designated track streamType acquisition function function for searching for a track ID to be referenced from the track reference index track reference ("mpod") information acquisition function.

As described above, according to the fourth embodiment of the present invention, object base coded contents written in MP4 or another, similar file format can be properly reproduced at a reproduction terminal of an architecture that complies with MPEG-4 specifications.

Fifth Embodiment

Next, a description is given of a data configuration conversion process for streaming. It should be noted that, in a fifth embodiment of the present invention as well, although the description centers on a case in which the contents data is in MP4 file format, the fifth embodiment is also applicable to a case in which not only MP4 but also other, similar file formats and architecture are used. For example, the present invention is also applicable to standards such as "Motion JPEG 2000 file format" (ISO/IEC 15444-3) and "AVC file format" (ISO/IEC 14496-15) and specifications employing file formats and architecture similar to that stipulated by MP4 such as the 3GPP file format described above. In addition, any video coding format and audio coding format may be used if such formats are established so as to be used with the file format specifications applied to the present embodiment. For example, where the 3GPP file format is adopted as the file format, H.263 may be used as the video coding format and AMR (Adaptive Multi-Rate) may be used as the audio coding format.

(Configuration of the Network Camera)

Figure 28:
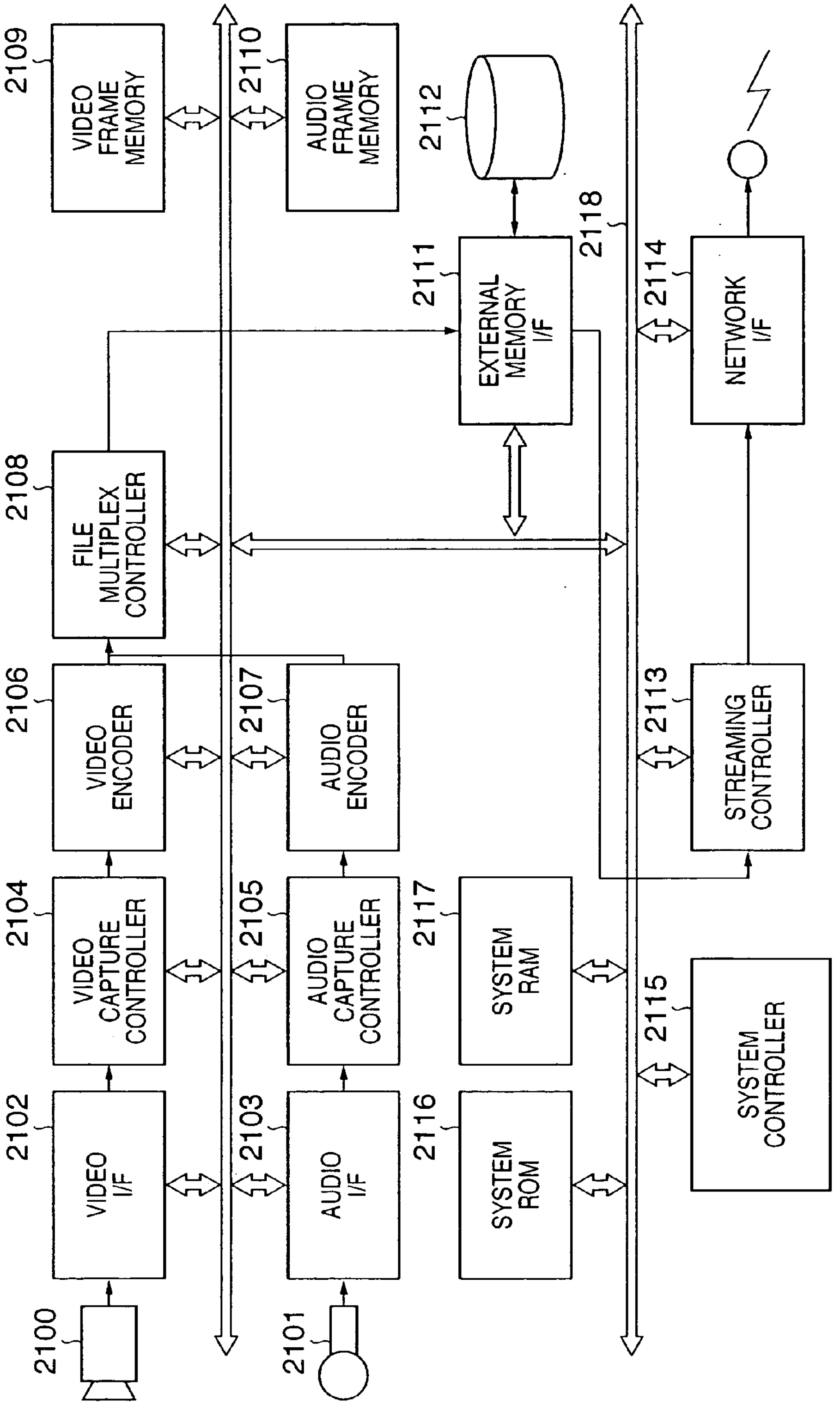
FIG. 28 is a block diagram showing the configuration of a network camera implementing a process according to a fifth embodiment of the present invention.

FIG. 28 is a block diagram showing the structure of a network camera implementing a process of distributing multimedia contents according to the first embodiment of the present invention. It should be noted that although the processing performed by the present embodiment can also be implemented using the configurations of the information processing apparatuses of the first and second embodiments as well, the description in the present embodiment concerns application to a network camera. The network camera of the third embodiment is provided with the capability to save sensed video as an MP4 files and the capability to stream the saved MP4 file over a network.

In the network camera shown in FIG. 28, the visual information at the time of image sensing is input from a camera 2100 and delivered to a video capture controller through a video I/F 2102. Similarly, audio information at the time of image sensing is input from a microphone 2101 and delivered to an audio capture controller 2105 through an audio I/F 2103. The video capture controller 2104 converts the input visual information into digital video signals and delivers these signals to a video encoder 2106 as input. Similarly, the audio capture controller 2105 converts the input audio information into digital audio signals and delivers these signals to an audio encoder 2107.

The video encoder 2106 compresses the input video signals and generates MPEG-4 video data. Similarly, the audio encoder 2107 compresses the input audio signals and generates MPEG-4 audio data. The encoded data that the video encoder 2106 and the audio encoder 2107 generate is multiplexed into MP4 file format by a file multiplex controller 2108. At this time, the file multiplex controller 2108 writes the output MP4 file data to an external memory 2112 through an external memory I/F 2111. In the present embodiment, it is envisioned that the external memory is a nonvolatile memory card such as an SD card or the like. However, as can be understood by those of ordinary skill in the art, the external memory 2112 may be a storage medium such as a CD (Compact Disc) or a DVD (Digital Versatile Disc), or it may be a memory device such as a hard disk.

Furthermore, in order to implement a streaming function, the network camera shown in FIG. 28 is also provided with a streaming controller 2113 as well as a network I/F 2114. The streaming controller 2113 provides the ability to stream the contents of an MP4 file using the RTP and RTSP described above. When the streaming controller 2113 receives through the network I/F 2114 an MP4 file distribution request from a distribution destination terminal (hereinafter "distribution destination terminal"), the streaming controller 2113 obtains the requested MP4 file from the external memory 2112 through the external memory I/F 2111. Then, the streaming controller 2113 generates an RTP packet from the data obtained by multiplexing separation, and streams the data to the aforementioned distribution destination terminal through the network I/F 2114 in RTP.

It should be noted that the constituent parts of the network camera shown in FIG. 28 are communicably interconnected by an internal bus 2118 and their operations controlled by a system controller 2115. Moreover, camera system fixed information is stored on a system ROM 2116 and variable information such as system status is stored in a system RAM 2117. However, large-capacity data such as video data and audio data are stored in dedicated memories such as a video frame memory 2109 and an audio frame memory 2110. Exchange of data between constituent parts is carried out through the above-described system RAM 2117, or the video frame memory 2109 and the audio frame memory 2110.

(Streaming Controller Process)

FIG. 29 is a flow chart illustrating in general the procedure executed by the streaming controller 2113, in the network camera of the first embodiment.

In the flow chart shown in FIG. 29, first, in a step S201, the streaming controller 2113 obtains the contents of the MP4 file to be distributed. In the present embodiment, the streaming controller 2113 obtains, through the network I/F 2114, information relating to a file distribution request sent from the distribution destination terminal, and obtains the contents of the file requested from the external memory 2112 through the external memory I/F 2111. The file distribution request from the distribution destination terminal may be transmitted using the RTSP described above.

Next, in a step S202, the streaming controller 2113 analyzes the internal structure of the MP4 file to be distributed and extracts information necessary for distribution of the coded data obtained by multiplexing separation and other succeeding processes. The extracted information is held in the system RAM 2117 and managed by the streaming controller 2113.

Next, in a step S203, streaming information is generated based on the information extracted in step S202 described above. Typically, contained in the streaming information is session information needed in order to establish a communications session with the distribution destination terminal, descriptive information needed to generate time stamp and other packet headers, information for extracting data that is to be the packet and the payload from the MP4 file to be distributed, division information for dividing the coded data into a packet size appropriate for the communications protocol and the communications conditions, or information the coded data itself that is to be the payload. In the case of the present embodiment, this streaming information can also be said to be the SDP information recorded in the MP4 file as well as the RTP hint track information.

Then, in a step S204, the steaming controller 2113 establishes a communications session by distributing the descriptive information contained in the streaming information generated by the above-described process, and thereafter carries out an RTP packetization process based on the aforementioned streaming information so as to generate RTP packets containing the coded data of the distribution file. The RTP packets thus generated are then sent over the network through the network I/F 2114 and streamed to the distribution destination terminal in RTP. In other words, in step S204, SDP format session descriptive information is transmitted in RTSP protocol and coded A/V data is transmitted using RTP protocol. It should be noted that, as is described later with reference to a sixth embodiment, where distribution is according to ISMA specifications, the session description information is transmitted in a form that contains contents determined by ISMA specifications.

Figure 30:
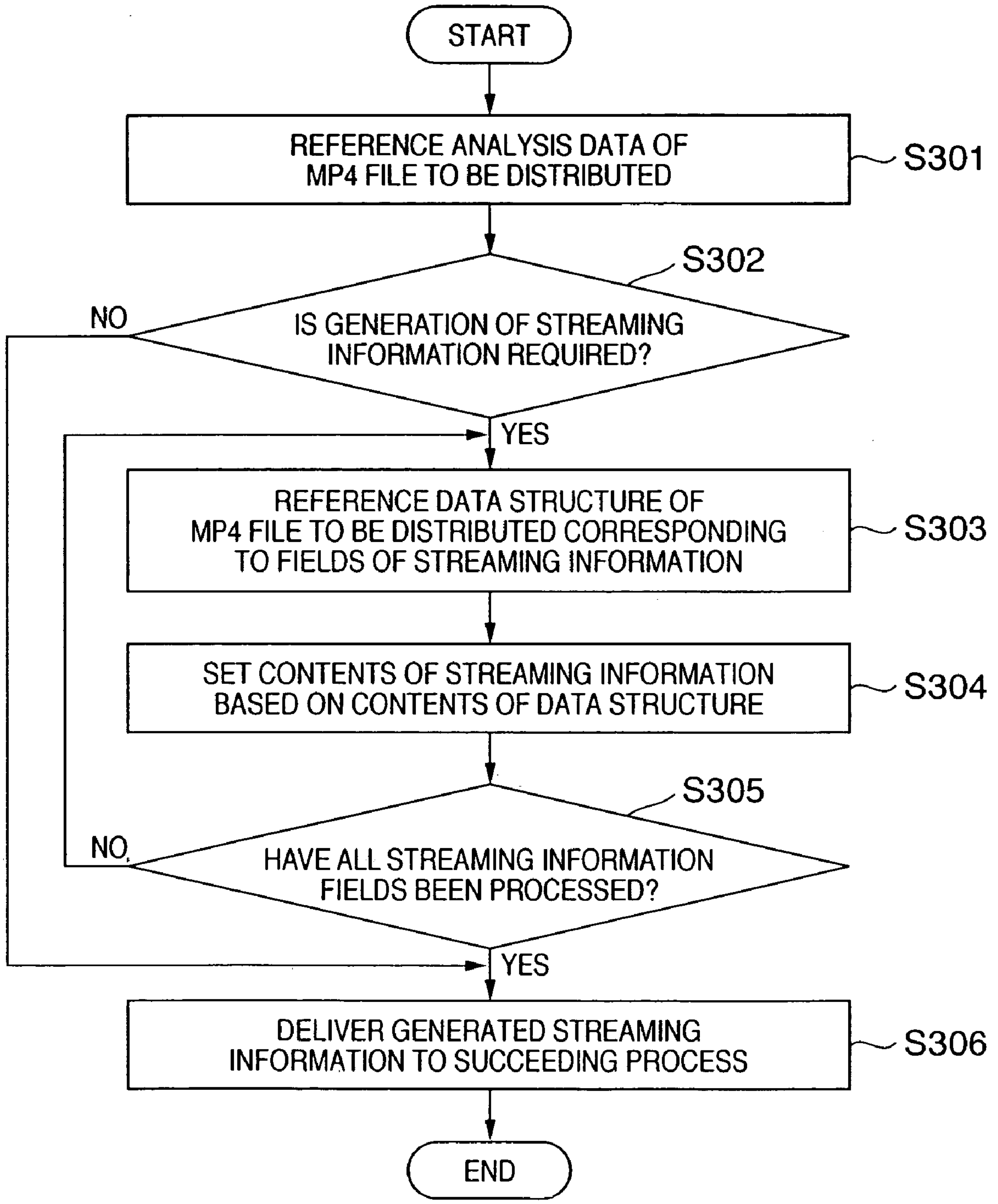
FIG. 30 is a flow chart illustrating a streaming information generation process according to the fifth embodiment.

Next, a detailed description is given of the process of generating streaming information carried out in step S203 shown in FIG. 29 in the fifth embodiment of the present invention, with reference to the flow chart shown in FIG. 30. FIG. 30 is a flow chart illustrating a streaming information generation process procedure in the fifth embodiment.

First, in a step S301, the streaming controller 2113 references the results of the analysis of the contents of the MP4 file to be distributed. The analysis results are held inside the system (that is, in the system RAM 2117) in a state in which such results can be referenced in advance depending on the analysis process of step S202 described above.

Next, in a step S302, a check is made to determine whether or not it is necessary to generate streaming information in order to carry out the process of distributing the MP4 file to be distributed. In the present embodiment, where the streaming information used in the protocol for distribution, such as the RTP hint track information and the SDP information, are not described in the MP4 file, it is determined that it is necessary to generate streaming information. Therefore, in step S302, it is confirmed if the MP4 file to be distributed matches such condition, and, where it is necessary to generate streaming information, a streaming information generation process of a step S303 and beyond is executed. Where the streaming information is present, the process of from step S303 to a step S505 is skipped, and in a step S306 the streaming information contained in the MP4 file is delivered as is to a succeeding step S304 and distributed. It should be noted that the process executed in such case is similar to the process executed by a streaming server.

Where it is necessary to generate streaming information, first, in step S303, the data structures in the MP4 file relating to data fields that constitute the streaming information are referenced (for a specific example of the data fields that comprise the streaming information, a description will be given later of the data fields shown in FIG. 31 and FIG. 32). As can be appreciated by those of ordinary skill in the art, in order to carry out such a process, the internal structure of the MP4 file to be distributed in step S202 must be analyzed in advance and the results of that analysis held inside the system (that is, in the system RAM 2117) in a state in which the results can be referenced by the streaming controller 2113.

Next, in step S304, the streaming information is set in accordance with the contents of the data structures of the MP4 file to be referenced in step S303 (a specific example of settings is described later). The contents of the settings are held without being delivered to a succeeding step S306 until all streaming information data field settings are finished.

The processes of steps S303 and S304 described above are executed for all data fields comprising the generated streaming information. In other words, in step S305, it is determined whether or not the processes of steps S303, S304 have been executed for all data fields, and steps S303 and S304 are repeated until all items are processed.

When the setting of all streaming information data fields is finished, processing then proceeds from step S305 to step S306 and the contents of the streaming information obtained by the execution of steps S303-S305 described above are delivered to the succeeding step S204.

By the procedure described above, streaming information used in distribution in the network camera of the present embodiment can be obtained.

Next, a description is given of a more detailed embodiment using a specific example. As a specific example, a description is given of details of the processes carried out in steps S303 and S304, where streaming moving picture data of MPEG-4 Video contained in contents data to be processed using RTSP or RTP. In the present example, in steps S303 and S304, audio/video data stream information written in SDP format when transmitting in RTSP is generated as RTP packet streaming information in payload format established by RFC3016 when transmitting in RTP. In the following description, how each of these two types of information is generated is explained in turn.

(Generating Audio/Video Data Stream Information)

First, the procedure for generating audio/video data stream information in SDP format sent in RTSP is shown.

FIG. 31 is a diagram showing an archetypical example of audio/video data stream information written in SDP format. The contents of the session description shown in FIG. 31 are written according to specifications shown by RFC3016. Such information is usually written in the hint track of the MP4 file as data contained in the hint track for audio/video data to be distributed. It should be noted that the information configuration shown in FIG. 31 is but one example thereof, and the data, format and order used in the actual process of distribution does not necessarily match that shown in the diagram. Therefore, in such a case, the generation order is changed so as to output data that matches the actual distribution specifications.

As an initial matter, the media information shown in the first line (2061) of FIG. 31 is set. A "video" indicating the handling of video as the media type, an RTP session port number used in the succeeding streaming process, and a value "RTP/AVP 96" indicating MPEG-4 video payload format in RFC3016 are set as such information.

Next, bandwidth information shown in the second line (2062) in FIG. 31 is set. "AS" is an abbreviation of "Application-Specific". In other words, such information depends on the application and the environment, and is set to any arbitrary content.

Next, a media sub-type and the resolution of a time stamp shown in the third line (2063) in FIG. 31 are set. The media sub-type is set to "MP4V-ES", indicting MPEG-4 Video in RFC3016. The resolution of the time stamp is set to 90000 (90 kHz) if no special designation is required.

Next, a track identifier for manipulating the hint track shown in the fourth line (2064) in FIG. 31 is set. However, because there is no hint track in the present example, "track ID-5" is set as the identifier indication a hypothetical track for the video track holding the data of the video stream to be distributed. Such content indicates that "the track that has ID number 5 is the hint track for the video stream to be distributed". However, where "trackID=5" is specified because in actuality such a track does not exist, it shall be treated as applying to a hypothetically linked video track. The value of this ID may be set to any value permitted by the specifications, provided that the relations between tracks can be managed distinctly and without overlapping with the ID of another, actual track or of the hypothetical track. It should be noted that the contents of this line are indispensable to a device that conforms to the ISMA specifications to be described later with reference to a sixth embodiment, and therefore must be set according to this description when implementing the sixth embodiment.

Next, media format type, profile level and decoder setting information shown in the fifth line in FIG. 31 are set. The format type designates the value 96, indicating MPEG-4 Video format in RFC3016. A profile level value described in the DecoderSpecificInfo contained in the video track of the input file is set in the profile level ("profile-level-id"). The entire aforementioned DecoderSpecificInfo data is translated into base 16 notation, text-encoded, and set in the decoder setting information ("config").

Next, the MPEG-4 Video stream elementary stream ID of ISMA specifications, shown in the sixth line in FIG. 31 is set. The elementary stream ID is either set by obtaining a value of ES_ID described in ESD of the video track in the input file, or is set by using a fixed value set for the video stream in advance by ISMA specifications, when conforming to such ISMA specifications as described later with respect to a sixth embodiment. It should be noted that the contents of this line are indispensable to a device that conforms to the ISMA specifications to be described later with reference to a sixth embodiment, and therefore must be set according to this description when implementing the sixth embodiment.

The data set in accordance with the above-described procedure is formed into the format shown in FIG. 31 and generated as session description information comprising the streaming information.

(Generating RTP Packet)

Next, the procedure for generating a packet in a format indicated by RFC3016 to be transmitted in RTP is shown.

Figure 32:
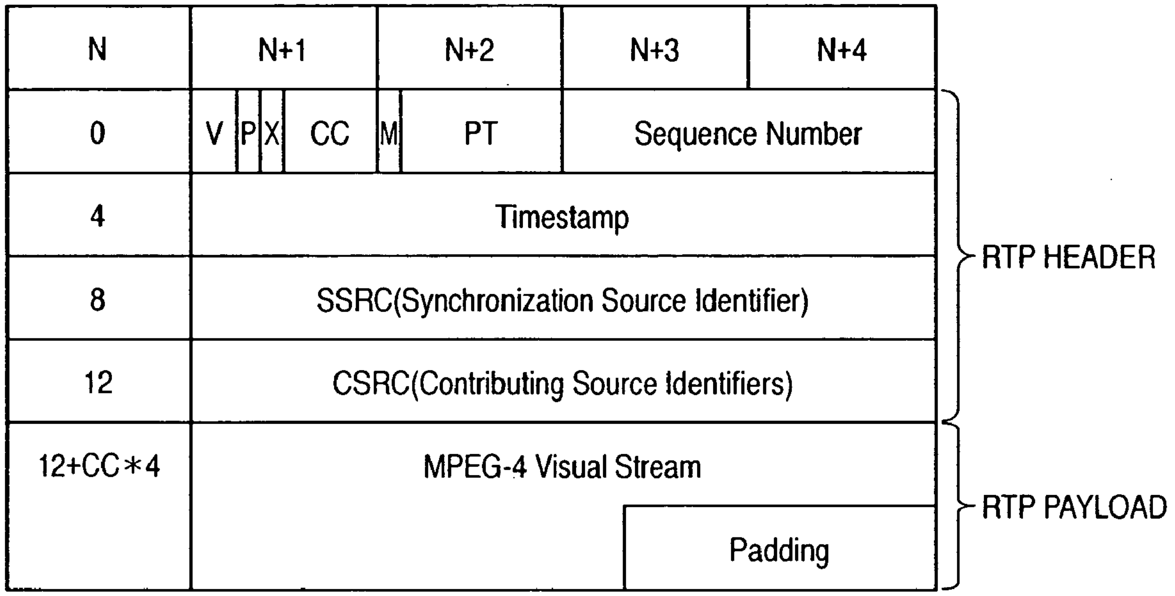
FIG. 32 is a diagram showing the layout of the fields of a packet established by RFC3016.

FIG. 32 is a diagram showing the layout of fields of a packet established by RFC3016. The column on the left side shows a byte offset N in 4-byte units for each field, and the row at the top shows a further offset, in units of bytes, of the byte offset N. In other words, the Timestamp field, for example, is positioned at the $5^{th}$ byte from the head of the packet (N=4; starting from N+1). It should be noted that, in the present embodiment, it is assumed that an expansion header or an SSRC or CSRC is not used.

First, 0x02 is set in the Version (V) field. This field indicates the RTP protocol version, and is set as described because currently version 2 is used. The next field, Padding Flag (P), is set at the end of processing and is not set here. The Extension Flag (X) indicates whether or not an extension header is to be added to the RTP header. In the present embodiment it is assumed that an extension header is not used, and therefore this field is set to 0. The CCRC Count (CC) indicates the number of entries in the succeeding CSRC. The present embodiment assumes that CSRC is not used, and therefore this field is set to 0.

The next field, Marker Bit (M), is set at the end of processing and is not set here. Payload Type (PT) indicates the packet payload type. In the present embodiment, where MP4VSample Entry ("mp4v") that is the data structure indicating that MPEG-4 Video stream data is contained in the input data, or where the value 0x02 indicating MPEG-4 Visual is set in the objectTypeIndicaton field included in the above-described ES_Descriptor comprising the MP4VSample Entry, the PT is set to 96, indicating the payload format of the MPEG-4 Video in RFC3016.

The Sequence Number begins with a specific random value and is a sequential number incremented with each transmission of an RTP packet, with an arbitrary initial value selected at the start of the RTP session. In the present embodiment, the initial value of the Sequence Number selected at the start of the RTP session is incremented with each transmission of an RTP packet.

The Timestamp field indicates a composite time. In the present embodiment, where CompositionTimeToSampleBox ("ctts") that is the data structure that describes the composite time is present in the input MP4 file, the composite time of a frame to be transmitted is obtained therefrom and set in the Timestamp. However, where the CompositionTimeToSampleBox is not present in the MP4 file, instead a decode time of the frame to be transmitted is obtained from the TimeToSampleBox ("stts") that is the data structure that describes the decode time and set as the composite time. Where the frame to be transmitted is divided into a plurality of packets, a value of the Timestamp that is the same as the first packet is also applied to the second and succeeding packets indicating the same frame.

The SSRC (Synchronization Source Identifier) is an identifier assigned so that a plurality of streams handled synchronously share the same parameters. In the present embodiment, it is assumed that an SSRC is not used, and therefore this field is set to 0.

The CSRC (Contributing Source Identifiers) indicate the sources of the stream after processing, where the stream has been modified and/or edited. In the present embodiment, it is assumed that CSRC is not used (CC=0), and therefore the CSRC is not set.

Following the above-described packet header fields, the frame data to be transmitted is set as the payload data. In the present embodiment, the frame data is divided into 1488 bytes each and used as payload data.

Figure 33:
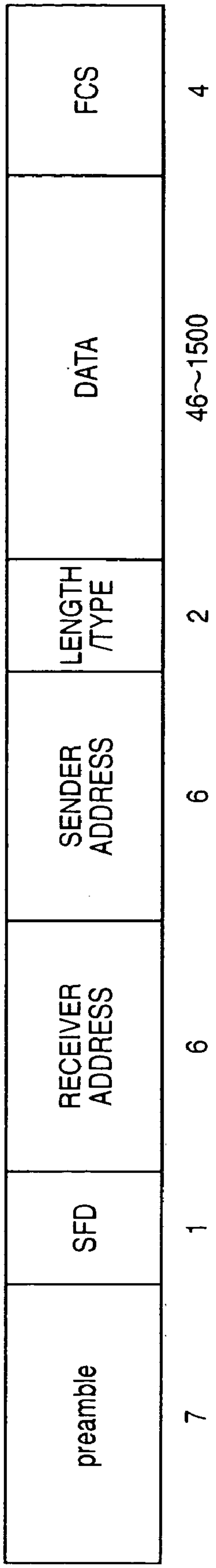
FIG. 33 is a diagram showing the layout of a data transmission unit in the Ethernet.

It should be noted that the 1488 bytes that comprise the unit of division of the above-described frame data is a value set on the assumption that the IEEE802.3 (Ethernet) used mainly in a LAN environment is used as the transmission medium. FIG. 33 is a diagram showing the layout of a data transmission unit in the Ethernet. The diagram shows that the size of the data blocks that can be transmitted over Ethernet ranges from 48 bytes to 1500 bytes. In other words, the aforementioned 1488 bytes is a reduction of 12 bytes from the 1500 MTU (Maximum Transmission Unit Size) where the Ethernet is used, the 12 bytes being the size of the RTP header described with reference to FIG. 32, and indicates the maximum payload size when RTP packets are transmitted over Ethernet.

Where, as described above, the size of the payload data generated by dividing the frame data is not a factor of 4 bytes, padding bits are added to the end of the payload, and further, 1 is set in the aforementioned Padding Bit (P) field. In addition, 1 is set in the above-described Marker Bit (M) field for the last packet generated from the data of a single frame.

It should be noted that, although the foregoing procedure generates transmission packet information in a form in which divided data is included in the packet as the payload, it is not always necessary to generate packet information in a form that includes the contents of such coded data. Alternatively, the packet information may be composed of sets of reference information pairing offset position and size for the purpose of obtaining data set as packet header information and payload. In this case, in the succeeding step S204, it is necessary to reference the coded data from the MP4 file and obtain the data based on the reference information for the payload included in the packet information. It should be noted that relational information for referencing the coded data set as the payload that is written in the MP4 file as a track reference to be described later.

In accordance with a procedure like that described above, information necessary to the generation of transmission packets is generated by the above-described step S203.

According to the above-described procedure, the session information and the transmission packets generated in step S203 are delivered to step S204 as streaming information, and transmitted through the network I/F 114 in accordance with RTSP and RTP transmission procedures in step S204 based on such information.

Thus, as described above, the network camera shown in the present embodiment can successively generate and stream streaming information needed for distribution even where distribution of an MP4 file that does not contain a hint track or session description information is requested.

Sixth Embodiment (Generating Streaming Information in Accordance With ISMA Specifications)

Next, a description is given of an example of a network camera conforming to a transmission method established by the aforementioned ISMA specifications, as a sixth embodiment of the present invention.

Figure 10:
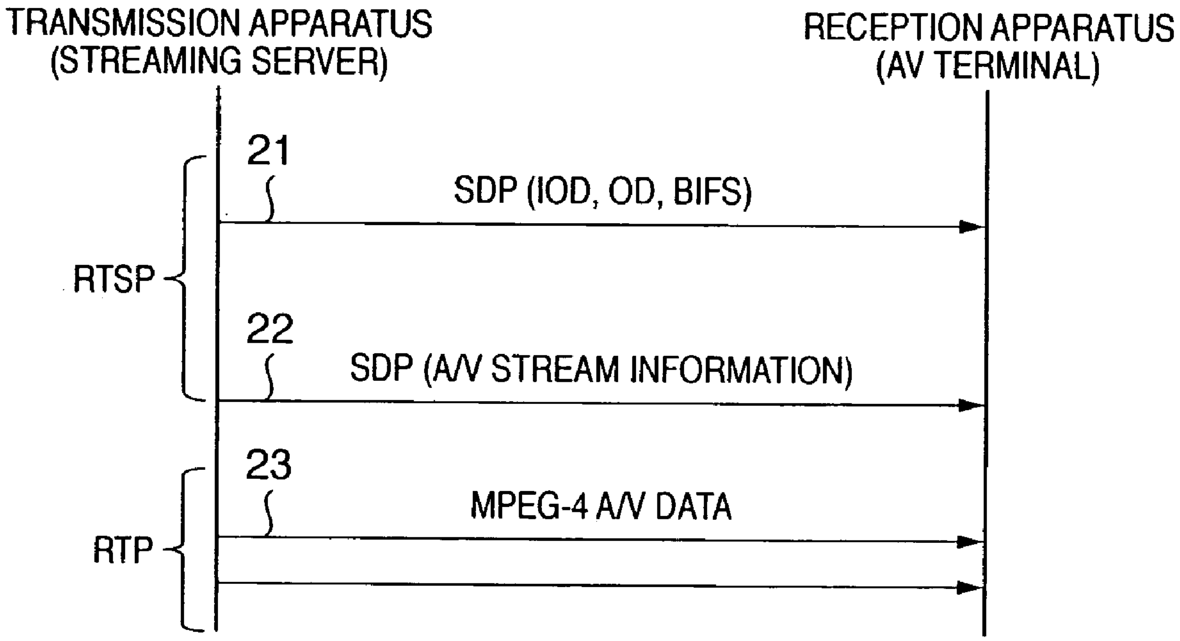
FIG. 10 is a diagram showing steps in a process of streaming in ISMA specifications.

According to ISMA specifications, as described with respect to FIG. 10, at a point in time at which transmission in RTSP is started, IOD, OD and BIFS data are transmitted. As shown in FIG. 34, the actual data is written as data of the line that begins with "a=mpeg4-iod:" in the RTSP header written in SDP format. The data of this line is expressed as a URL (Uniform Resource Locator). IOD data encoded in Base 64 format, which is one type of text-encoded format for binary data, is set at the end of the URL. Furthermore, the OD and the BIFS data are also encoded in the same URL format as the IOD, and embedded in the IOD data.

In other words, in handling transmission in a format established by ISMA specifications, it is necessary to encode the IOD, OD and BIFS data included in the MP4 file in the URL format established by ISMA specifications and to transmit the encoded data as an RTSP header in SDP format at the start of a session in RTSP. In the present embodiment, a description is given of details of a process carried out for the purpose of generating session description information that includes such IOD, OD and BIFS data.

(Generating Session Description Information Including IOD, OD and BIFS Data)

In distributing data in accordance with ISMA specifications, in step S302 shown in FIG. 30 a check is made to determine if the contents data to be distributed satisfies the requirements determined by ISMA specifications. Matters are controlled so that, for example, a case in which a plurality of audio/video streams are present does not satisfy the requirements and the rest of the process is cancelled as an error and only streams that meet the requirements are selected and used. It should be noted that details of the requirements are defined by ISMA specifications and therefore a discussion thereof is omitted from the present specification.

Thereafter, the session description information shown in FIG. 34 is generated by the processes of steps S303 and S304. It should be noted that the information configuration shown in FIG. 34 is but one example thereof, and the data, format and order used in the actual process of distribution do not necessarily match those shown in the diagram. Therefore, in such a case, the generation order is changed so as to output data that matches the actual distribution specifications.

As an initial matter, bandwidth information (2091) shown in the first line in FIG. 34 is set. Such information depends on the application and the environment, and is set to any arbitrary content.

Then, as shown by the second line (2092) in FIG. 34, a character sequence "isma-compiance:1,1.0,1" indicating compliance with ISMA specifications is set. Further, IOD data is set, including OD and BIFS and encoded in the format shown by ISMA specifications, in a format like that shown by the third line (2093) in FIG. 34.

However, because the IOD and OD data contained in the MP4 file is in a configuration different from that of the IOD and OD data established by ISMA specifications, the data recorded in the MP4 file cannot be obtained and used as is but must instead undergo a data structure conversion process. In order to facilitate an understanding of that process, a description is first given of what kind of structure the IOD and OD data has.

(IOD, OD Data Structure)

Figure 6:
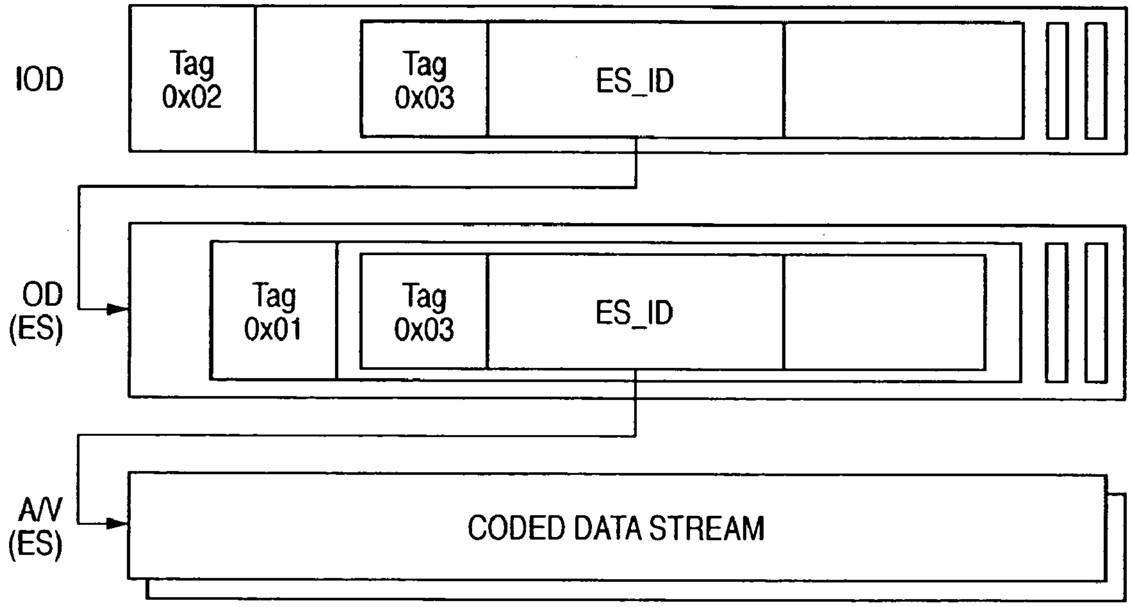
FIG. 6 is a diagram illustrating relational definitions for media data using object descriptor information in MPEG-4.

IOD and OD defined by ISMA specifications, as shown in FIG. 6, describe a relation to an elementary stream to be described using an ES_ID, which is an identifier that identifies a unique elementary stream. In the case shown in FIG. 16, the ES_ID of the OD stream is described in the IOD and the video or audio stream ES_ID is described in the OD.

However, the data structure of the IOD and the OD recorded in the MP4 file is slightly different from that shown in FIG. 6. A description is given of the data structure of the IOD and OD when recorded in the MP4 file using FIG. 35.

Figure 35:
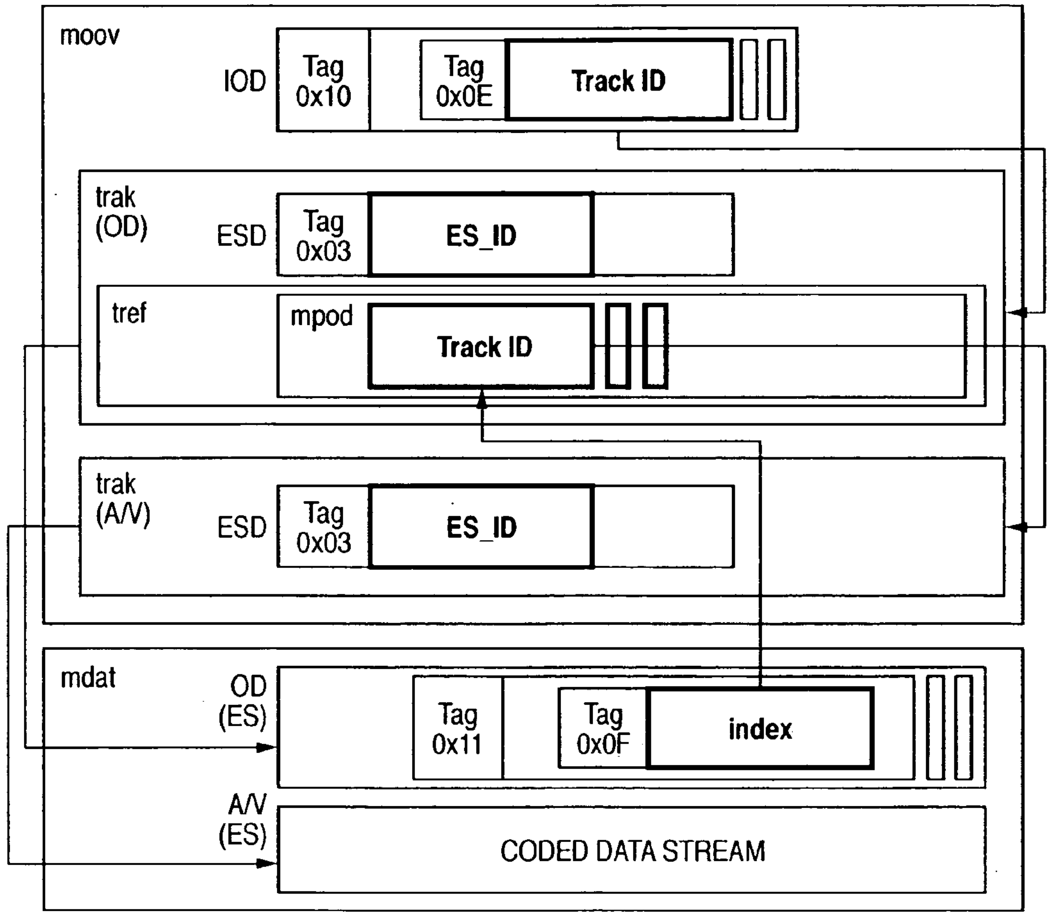
FIG. 35 is a diagram showing illustrating MP4 file media data relational definitions.

As shown in FIG. 35, the data recorded in the MP4 file is written using a data structure composed of boxes, each of which is called a "Box". The contents information is structured in tracks that correspond to individual elementary streams and that contain the boxes (each called a "trak"). Moreover, encoded data of the elementary streams corresponding to the tracks is stored inside a box called media data ("mdat").

In order to be able to identify a particular track, each track is assigned an identifier called a "Track ID". By writing the Track ID to a box called a track reference ("tref"), it is possible to define relations among a plurality of tracks. The track reference, because relations among a plurality of tracks having different meanings can be defined, can be made to hold type information indicating the meaning of the relations. Relational information for a stream referenced from the OD is written as a track reference holding a type called "mpod". Moreover, relational information of a track that contains coded data referenced from the hint track is written as a track reference having a type called a "hint".

As shown in FIG. 35, in the case of the MP4 file format, the elementary stream is referenced using the track reference. Accordingly, the method of description of the linkage is in a form that is clearly different from that shown in FIG. 6.

First, the IOD holds no ESD but instead holds only the track ID of the track that corresponds to the ES to be referenced. The ESD included in the IOD is recorded as data of the track to be referenced, which is data separate from the IOD.

Moreover, the OD also holds no ESD, and is such that only a number beginning with 1 that indicates the index of the data included in the track reference of the mpod type is recorded therein. The track ID of the track corresponding to the ES to be referenced is written in the data at a position indicated by the index number in the data of the track reference of the type that indicates the relation between the OD and the ES, and the ES that the OD references is identified by the track ID. As with the IOD, the ESD included in the OD is recorded as data separate from the OD in the track to be referenced.

Thus, as described above, with the MP4 file format, the format of the data that is the equivalent of the IOD, the OD and the ESD usually differs, and accordingly special values unique to the MP4 file format are used for the values of the tags that are assigned to each of these types of data. As shown in FIG. 35, 0x10 (MP4_IOD_Tag) is used in the data that is the equivalent of the IOD, and 0x0E (ES_ID_IncTag) is used in the data that is used in place of the ESD contained therein. Additionally, 0x11 (MP4_OD_Tag) is used in the data that is the equivalent of the OD, and 0x0F (ES_ID_RefTag) is used in the data that is used in place of the ESD included therein.

Since the difference in descriptive format of the IOD and OD described above exists, in order to generated IOD and OD data in accordance with ISMA specifications, the MP4 file box structure must be analyzed to generate IOD and OD data in a form that includes ES_ID that accurately reflects the reference relations among tracks as well as the ESD of each track.

Figure 36:
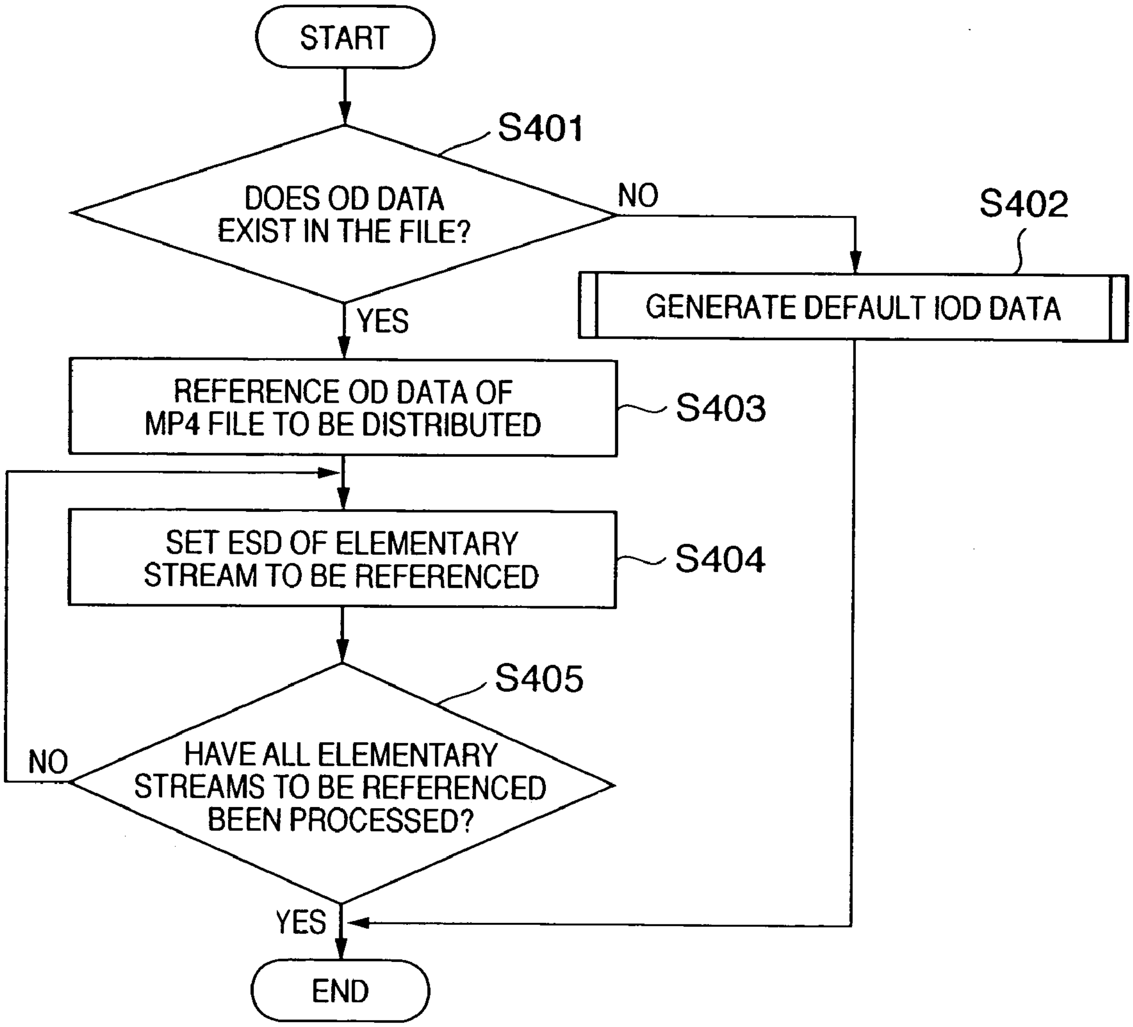
FIG. 36 is a flow chart illustrating steps in an IOD data conversion process in a format stored in an MP4 file, according to a sixth embodiment of the present invention.

A description is now given of the conversion process for the data structure of the IOD in a format stored inside the MP4 file, using the flow chart shown in FIG. 36. It should be noted that the flow chart shown in FIG. 36 illustrates in greater detail the process of setting the IOD in step S304 executed by the streaming controller 2113.

(IOD Conversion Process)

First, in a step S401, it is confirmed whether or not IOD data is contained in the file. Usually, IOD data is included in the MP4 file, but when IOD data is not included, the process proceeds to a step S402, a process of creating default IOD data is executed and the following processes skipped. It should be noted that details of the default IOD generation process are described later.

Where IOD data is contained in the file IOD, the process proceeds to a step S403 and IOD binary data in a format stored in the MP4 file is obtained. The IOD data is held in a state in which it can be obtained by the streaming controller 2113 (specifically, held in the system RAM 2117) as a result obtained by analyzing the MP4 file in step S202 in advance.

Figure 37:
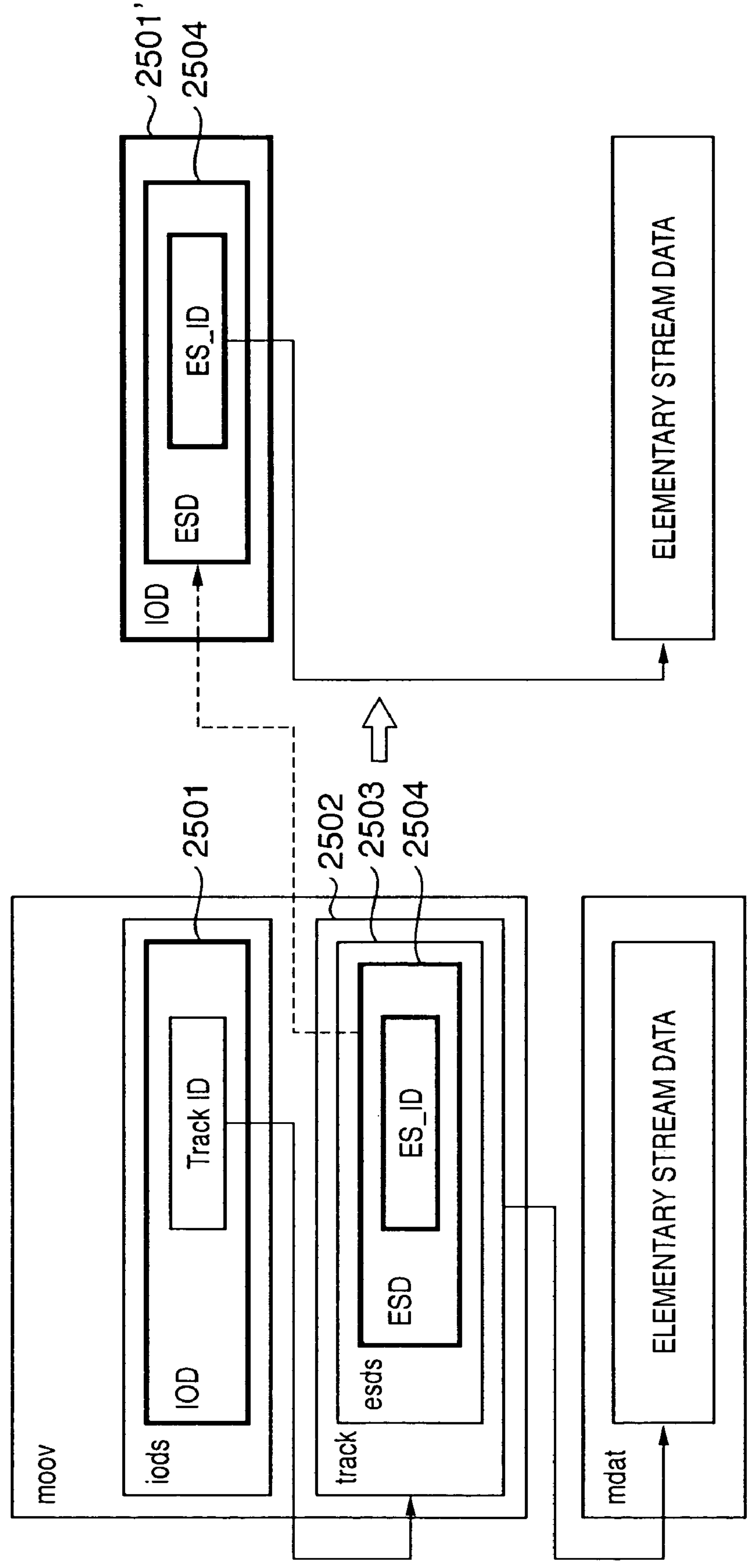
FIG. 37 is a diagram illustrating IOD data conversion process according to the sixth embodiment.

Next, in a step S404, the ES_ID_IncTag in the IOD is replaced by an ES_DescrTag. At the same time, ESD data is obtained from the "esds" box of the track referenced by the track ID that follows the ES_ID_IncTag and set at a position indicated by the ES_DescrTag in the IOD. In terms of the example shown in FIG. 37, in the MP4 file, a track 2502 is designated by the Track ID in the IOD 2501. The ES_ID_IncTag that indicates this Track ID is replaced with the ES_DescrTag that indicates the ESD. Then, an ESD 2504 in the "esds" box 2503 in the designated track 2502 is acquired and set at the position of the replacement ES_DescrTag.

Then, in a step S405, a check is made to determine whether or not the process of setting the ESD has been carried out for all the elementary streams referenced from the IOD. If processing of all elementary streams is not finished; then the process returns to step S404 and the unprocessed elementary streams are processed.

According to the conversion process described above, IOD data in a format stored in an MP4 file can be properly converted.

(OD Conversion Process)

Next, a description is given of a procedure for converting MP4 file format OD data, using FIG. 38. It should be noted that the flow chart shown in FIG. 38 illustrates in greater detail the process of setting OD carried out as step S304 by the streaming controller 2113.

The OD data, unlike the IOD, is recorded in the MP4 file as elementary stream data. In other words, the OD data, like other video and audio data formats, is handled in media data constituent units of "samples". Therefore, in order to process the OD data, an analysis process for the purpose of being able to reference the OD stream sample data in an as-is state must be carried out in step S202. Furthermore, in order to obtain the OD data, information for the purpose of determining whether or not the track for which sample data is sought is an OD data track is necessary. Whether or not the track is an OD data track can be determined by whether or not the DecoderConfigDescriptor streamType included in the ESD of that track is 0x01 (ObjectDescriptorStream). Therefore, in the process of step S202, it is necessary to hold the track streamType in the system RAM 2117, in a state in which it can be referenced.

In the following OD conversion process, the content of the streamType of the track is confirmed, and, if the streamType=0x01 that track is considered to be an OD stream, the data of that track undergoes a conversion process.

The ESD included in the OD as well, like the IOD, is also expressed and recorded as a separate tag and a reference format inside the MP4 file. Specifically, the ESD contained in the OD is held in the MP4 file as an ES_ID_Ref that holds a "mpod" track reference index. Accordingly, the conversion of the OD data in MP4 file format is carried out with essentially the same processing procedure as that of conversion of the IOD.

First, in a step S601, it is confirmed whether or not OD data is included in the file. The presence or absence of the OD data can be confirmed by checking whether or not a track in which the ESD streamType is 0x01 is present in the file. Usually, OD data is included in the MP4 file, but, when it is not included, the process of creating default IOD data is executed in step S402 to create default OD data together with IOD. Details of the default IOD generating process of step S402 are given later.

Where OD data is included in the MP4 file, however, then in a step S602OD data in a format stored inside the MP4 file is obtained. Next, in a step S603, the ES_ID_RefTag in the OD data is replaced with the ES_DescrTag. At the same time, ESD data is obtained from the "esds" box in the track reference data of the "mpod" type contained in the track from which the OD data is obtained, and set at the position indicated by the ES_DescrTag in the OD.

Figure 39:
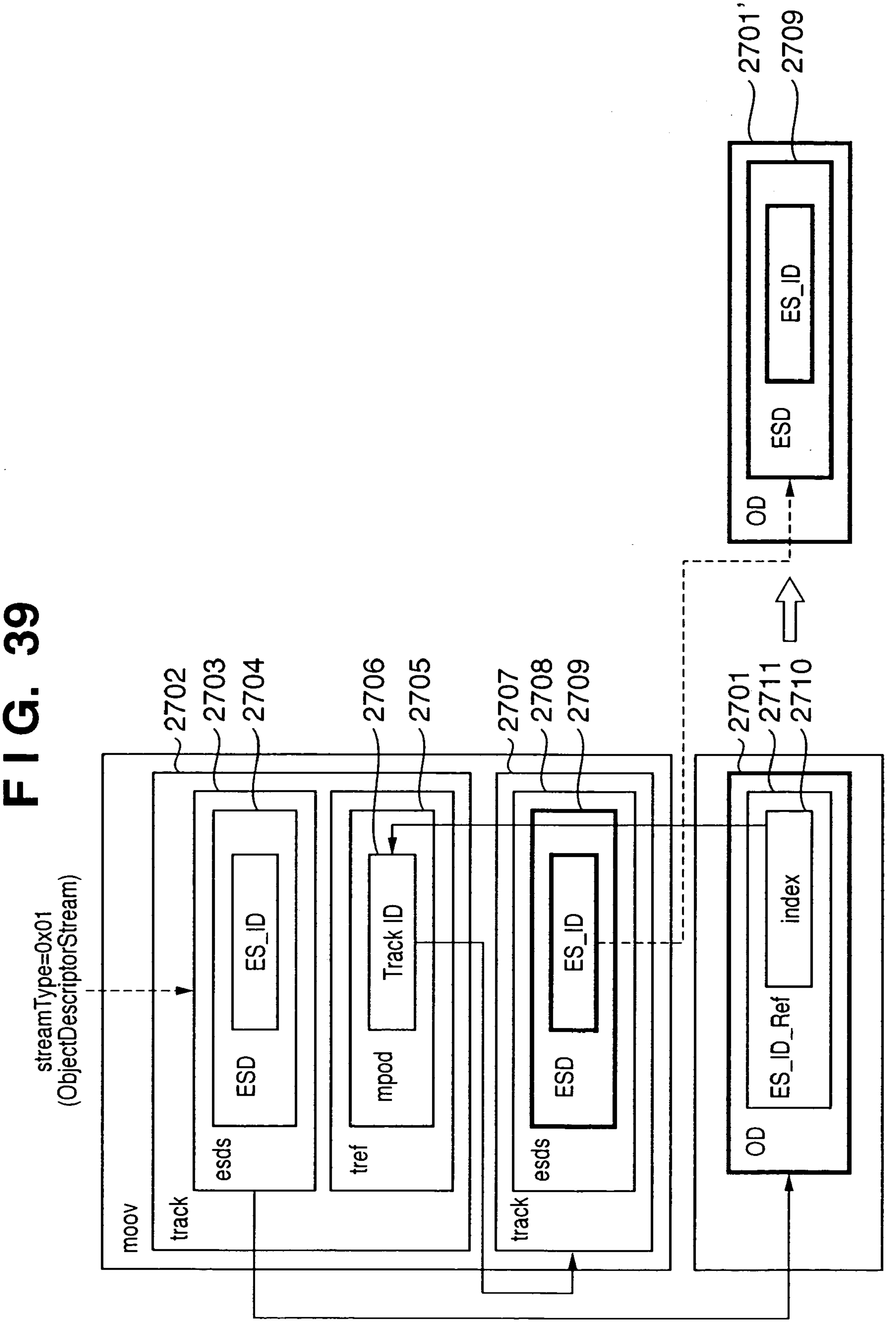
FIG. 39 is a diagram illustrating an IOD data conversion process according to the sixth embodiment.

For example, in FIG. 39, where DecoderConfigDescriptor streamType is 0x01 and the elementary stream corresponding to track 2702 is OD 2701, in a track 2702, an area 2710 indicated by the ES_ID_RefTag in the OD 2701 is replaced by ES_DescrTag. Then, a track ID 2706 indicated by the index 2711 in area 2710 is obtained from a track reference number 2705 of the "mpod" type contained in the OD track, and an ESD 2709 is obtained from an "esds" box 2708 of the reference track 2707 of the OD indicated by the track ID 2706. Then, the OD data 2701' incorporating the ESD 2709 into the ES_DescrTag portion is generated.

Then, in a step S604, a check is made to determine if the ESD setting process has been carried out for all the elementary streams that the OD references. If unprocessed elementary streams are present, then processing returns to step S603.

(Converting IOD Data to ISMA Format)

In the case of IOD data used in data distribution according to ISMA specifications, according to the process described above, that data must be converted from IOD data and OD data of a format that is stored in the MP3 file into a format established by ISMA specifications.

Figure 40:
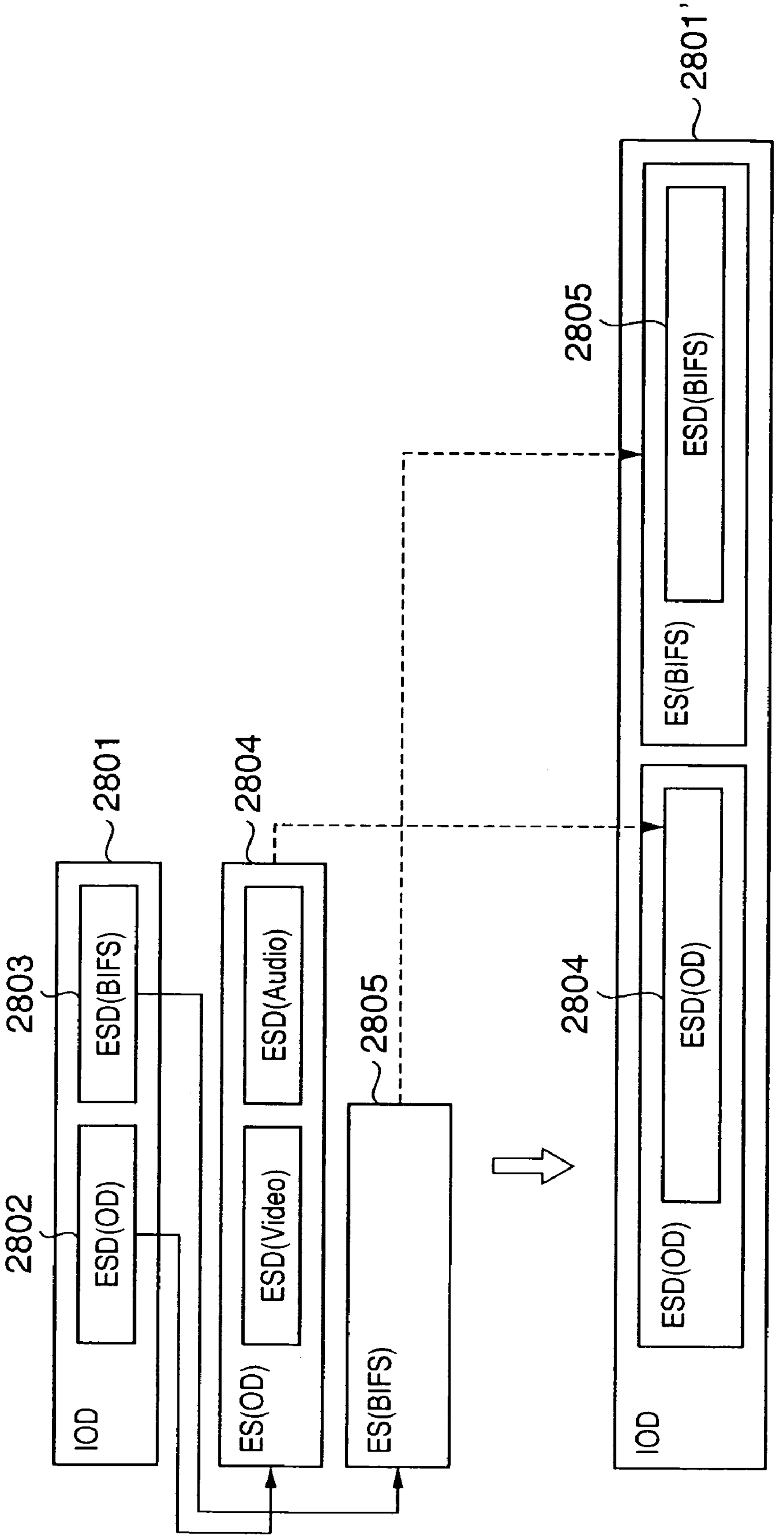
FIG. 40 is a diagram illustrating a process of converting IOD data to ISMA format.

The difference between IOD and OD converted by the above-described process and ISMA specifications IOD and OD data structures is shown in FIG. 40. With the format obtained by the process described above, an IOD 2801 in FIG. 40 typically includes an ESD that corresponds to an OD stream 2804 and an ESD 2803 that corresponds to a BIFS stream 2805. However, the actual stream data of the OD stream 2804 and the BIFS stream 2805 exists as data that is independent of the IOD 2801.

Figure 41:
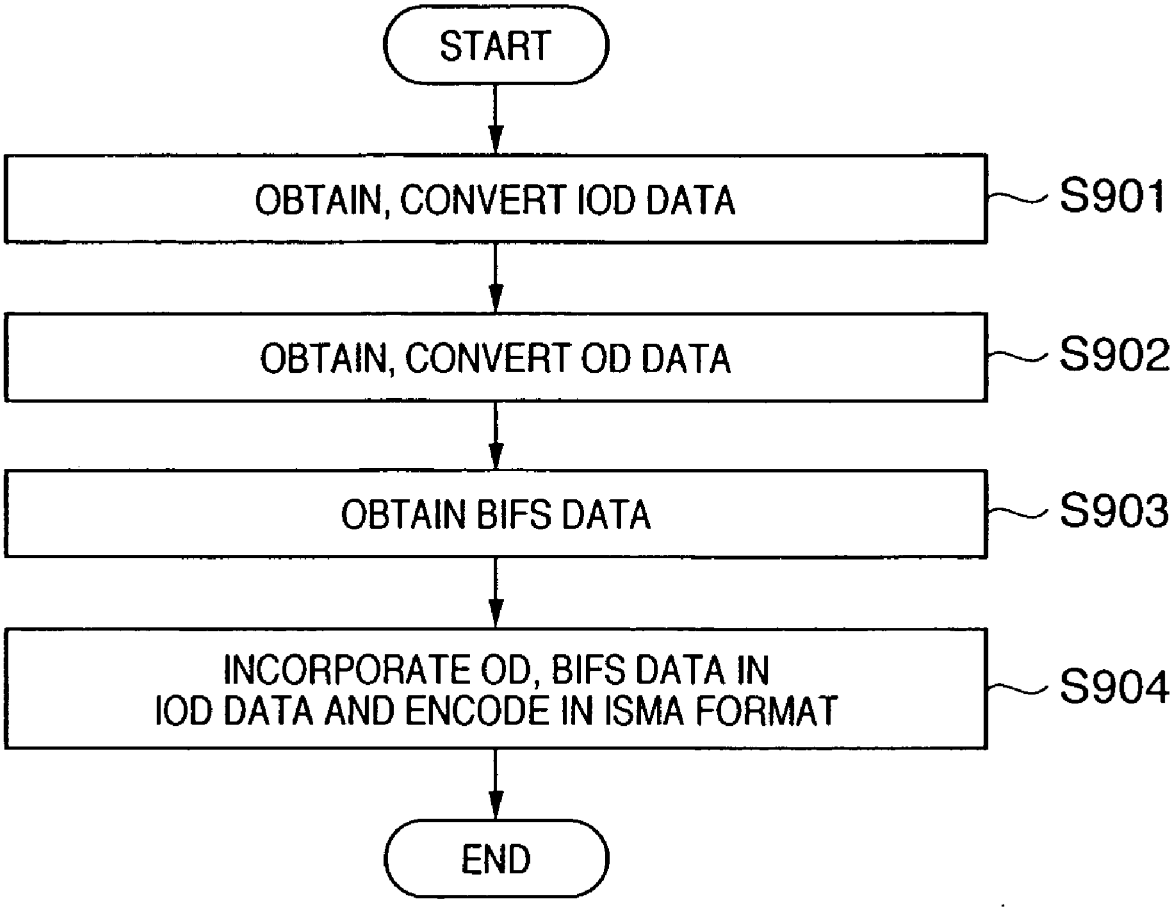
FIG. 41 is a flow chart showing steps in a process of converting IOD data to ISMA format.

By contrast, in the case of the ISMA format, the format of the IOD becomes a format like that of the IOD 2801', in a form that incorporates the OD data 2804 and the BIFS data 2805. Accordingly, to create ISMA-compliant streaming information, the IOD obtained by the process described above must then be converted into ISMA format. The procedure for that conversion process is described using the flow chart shown in FIG. 41.

First, in a step S901, the IOD data is obtained from the MP4 file by the procedure shown in the flow chart shown in FIG. 36 and the process of conversion is carried out. Next, in a step S902, the OD data is obtained from the MP4 file by the procedure shown in the flow chart shown in FIG. 38 and the process of conversion is carried out.

Next, in a step s903, a process of obtaining the BIFS data from the MP4 file is carried out. In order to obtain the BIFS data, a search is conducted for a track that has an ESD in which the DecoderConfigDescriptor streamType is 0x03 (SceneDescriptionStream) as described above and the data of that track is obtained. It should be noted that the BIFS track is usually present in the MP4 file, and in the present example it is not assumed that there is no BIFS track.

Then, in a step S904, the OD data and the BIFS data obtained in steps S902 and S903 are incorporated in the IOD data obtained in step S901 as described above, in a format established by ISMA specifications. With the ISMA specifications, the OD and BIFS data incorporated in the IOD is text-encoded in base 64 format and held in the URL string field of the ESD, in text form in which a header, either "data: application/mpeg4-od-au;base64" (in the case of OD) or "data:application/mpeg4-bifs-au;base64" (in the case of BIFS) is added to the head. The process of combining and encoding IOD, OD and BIFS data in a format like that of the foregoing is carried out and IOD data in a form established by ISMA specifications is generated.

By carrying out a process like that described above, IOD, OD, BIFS and other such system data included in the MP4 file can be converted into a form that complies with ISMA specifications. By so doing, even if ISMA specifications-compliant IOD data is not included in the MP4 file, IOD data can be generated in a format adapted to streaming according to ISMA specifications and transmitted.

(Default IOD Generation Process (Process of Step S402))

Although the foregoing description concerns a process of converting into IOD and OD data obtained from an MP4 file into ISMA-specification format, it does not matter what type of file in which data such as the IOD and the OD are included. For example, unlike in an MP4 file, data such as the IOD, BIFS and OD are not included in a 3GPP file. Accordingly, when handling a file such as a 3GPP file, the IOD and other data are not obtained from the file and it is necessary to carry out a process of creating a default IOD.

The default IOD data is provided in advance as fixed data in the system ROM 2116 of the network camera of the present embodiment. Alternatively, a process may be carried out in which the fixed data held in the system ROM 2116 may be made into a template, and, of the IOD data on the system ROM 2116, that IOD data which rewrites that portion of the data entries that changes according to the bit rate, the decide buffer size, the DecoderSpecificInfo and other conditions is held in the system RAM 2117 and used. It should be noted that the contents of the default IOD varies depending on the stream configuration of the file to be distributed (for example, video only, audio only, or a combination of audio/video), and therefore it is necessary to provide in advance a plurality of default IODs for each configuration.

Figure 42:
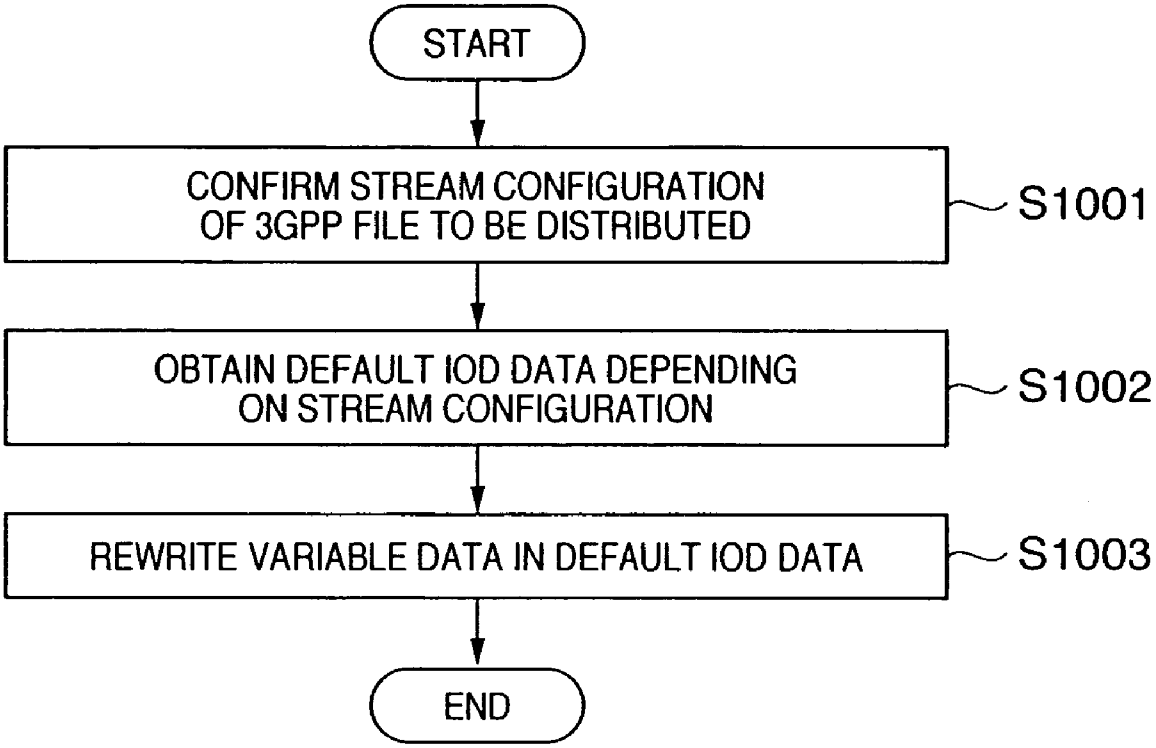
FIG. 42 is a flow chart illustrating a default IOD generation process according to the sixth embodiment.

A description is now given of a process of generating default IOD when handling a 3GPP file in which IOD does not exist in the file, using the flow chart shown in FIG. 42. It should be noted that the flow chart describes in detail the process performed in step S402 when handling a 3GPP file, in the processes shown in FIG. 36 and FIG. 38.

First, in a step S1001, it is confirmed that the stream configuration of the 3GPP file to be processed is one of a video only, an audio only, or an audio/video combination. Next, in a step S1002, default IOD data corresponding to the stream configuration of the 3GPP file confirmed in step S1001 is obtained from the system ROM 2116 and held in the system RAM 2117. Then, in a step S1003, the contents of such data as can be obtained from the file, such as the data in the default IOD held in the system RAM 2117 that changes depending on encoding conditions such as the bit rate, the decode buffer size and the DecoderSpecificInfo, as well as the ES_ID, are obtained from the 3GPP file and written over the default IOD data in the system RAM 2117.

By carrying out such a process, it is possible to generate and use IOD data established by ISMA specifications even with a file such as a 3GPP file, in which IOD, OD and BIFS data are not contained in the file.

Thus, as described above, with the network camera of the present embodiment, streaming information can be created in step S203 and that streaming information can be used for streaming using the several processes like those described above. As noted in the descriptions up to this point, and in particular with the network camera shown in the sixth embodiment, session description information in a form that complies with ISMA specifications can be generated and streaming can be carried out even with contents files that do not contain session description information, like that shown in FIG. 34, and with files of a format that does not contain IOD, OD and BIFS, like the 3GPP file format.

Seventh Embodiment

Next, a description is given of a network camera that outputs streaming information generated during distribution as a file.

The streaming information generated in step S203 of FIG. 29, in the fifth embodiment described above, is discarded immediately after creation without being saved, after being used in the streaming process. In a seventh embodiment, however, such output data is held and managed in the apparatus in a form, such as a file, that can be used even after the distribution process is finished, and re-used if there is another request for distribution of a file that has been distributed previously. As a result, distribution can be carried out without minutely reproducing the streaming information generation process.

(Streaming Information File Output Process)

Figure 43:
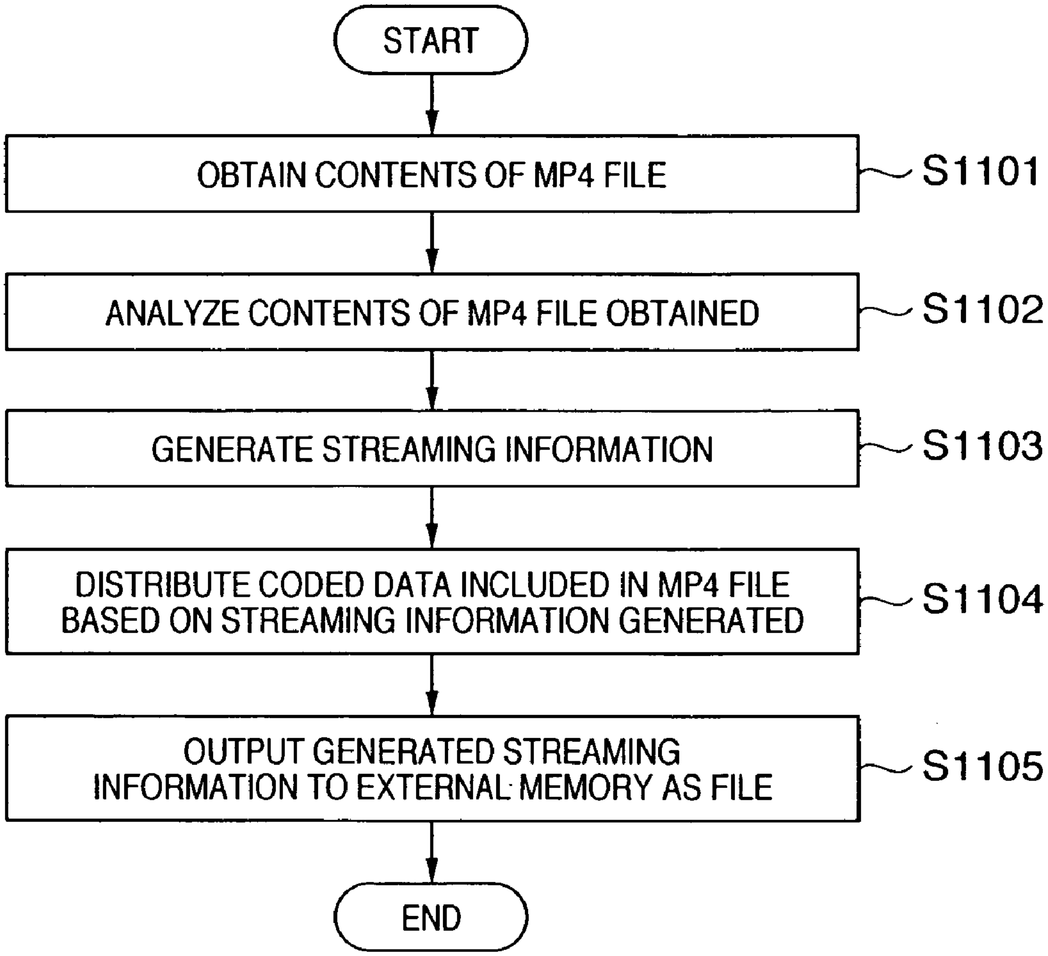
FIG. 43 is a flow chart showing steps in processing according to a seventh embodiment of the present invention.

A description is now given of a process of outputting and recording as a file streaming information generated during distribution in the network camera of the seventh embodiment, using the flow chart shown in FIG. 43.

The process shown in the flow chart shown in FIG. 43 is virtually identical to that shown in FIG. 29. The process of from a step S1104 to a step S1104 (inclusive) is the same as the process of from step S201 through to step S204 (inclusive) shown in FIG. 29, and therefore a detailed description of such process is omitted here. In the flow chart shown in FIG. 43, after the process of from steps S1101 to S1104 (inclusive) is carried out, the process of outputting the streaming information generated in a step S1103 is carried out.

In a step S1105, the streaming controller 113 records the streaming information generated in step S1103 as a file in the external memory through the external memory I/F 111. It is sufficient if the streaming information is recorded in such a way that the correspondence with the contents data from which it is generated is understood and the information is retrievable later. In the present embodiment, the streaming information is saved in the form of a file like that shown in FIG. 44. In this example, in the case of an MP4 file to be distributed that has the file name "MOV0001.MP4", the information output in step S1105 is output under a file name in which an extension indicating the type of information output is added to the base name "MOV0001 of the file name of the file to be distributed. Furthermore, the information of each track of the file is output as a file name in which consecutive numbers identifying the track are attached to the base name "MOV0001". For example, the movie session description information is "MOV0001. SDP" and the hint track information given to the first track is "MOV0001-1.HNT".

(Distribution Process Using Streaming Information File)

Figure 45:
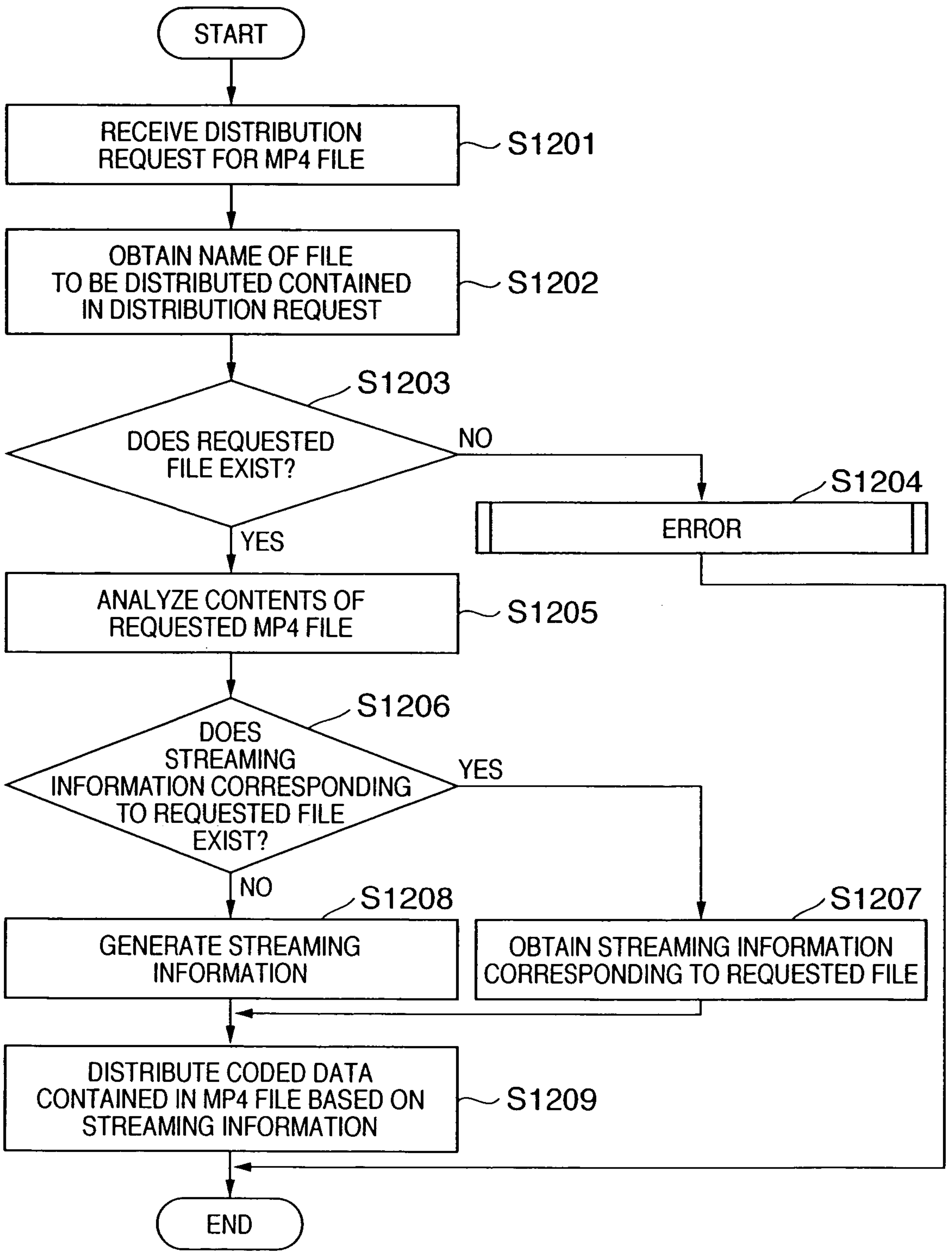
FIG. 45 is a flow chart showing steps in a process of outputting streaming information according to the seventh embodiment.

Next, a description is given of the procedure for a distribution process using streaming information recorded in a file by the above-described process, using the flow chart shown in FIG. 45.

First, in a step S1201, the streaming controller 2113 receives a distribution request for an MP4 file sent from the distribution destination terminal through the network I/F 2114. In the present embodiment, it is assumed that the MP4 file distribution request is sent from the distribution destination terminal using RTSP in a form like that shown in FIG. 46. In FIG. 46, the MP4 file to be distributed is indicated by the "MOV0001.MP4" portion of the "rtsp://192.168.0.1/MOV0001.MP4" URL character sequence designated by an RTSP DESCRIBE command (2211).

In a step S1202, the streaming controller 2113 obtains the file name to be distributed which is included in the received distribute request. In the example shown in FIG. 46, the "MOV0001.MP4" portion is obtained by analyzing the URL.

Next, in a step S1203, the streaming controller 2113 checks if the requested file exists or not. In the example shown in FIG. 46, the streaming controller checks if a file having the file name "MOV0001.MP4" is present in the external memory 2112, and if not present carries out an error process shown in step S1204 and terminates processing of the relevant distribution request without carrying out the rest of the process.

If the requested file is present, then in a step S1205 the streaming controller 2113 analyzes the contents of the requested MP4 file. However, in the example of the present embodiment, the analysis results are used in succeeding processes such as distribution of the encoded data, but are not used to generate streaming information. It should be noted that this process of analysis is the same as the process of step S202 shown in FIG. 29, and therefore a description thereof is omitted here. Next, in a step S1206, the streaming controller 2113 checks if a file in which streaming information corresponding to the requested MP4 file is recorded is present. In the example shown in FIG. 46, the requested file name is "MOV0001.MP4", and therefore the streaming controller 2113 checks if a streaming information file group like that shown in FIG. 44 and having "MOV0001" as the base name of the file is present in the external memory 2112.

If a streaming information file corresponding to the requested file exists, then in a step S1207 the streaming information file is obtained from the external memory 2112. If the streaming information file does not exist, then a streaming information generation process is carried out in a step S1208. It should be noted that this generation process is the same as the process of step S203 shown in FIG. 29 described above, and therefore a description thereof is omitted.

Then, in a step S1209, the streaming controller 2113, based on the streaming information either obtained in step S1207 or generated in step S1208 as described above, streams the coded data of the requested MP4 file through the network I/F 2114.

Thus, as described above, by generating a file in a form in which it is linked to the file to be distributed, when distribution of the file is again requested later, where there exists a streaming information file having the requested file base name, it is possible to stream using the information of that file.

It should be noted that, in the present embodiment, the descriptive format of the streaming information output to the file in step S1105 may be written in a standard file format such as the MP4 file format, or it may be written in an arbitrary, original format.

Moreover, although in the present embodiment the correlation between the MP4 file to be distributed and the streaming information file is defined using the file name, management data for defining the relation between the MP4 file to be distributed and the streaming information file may be generated separately in the MP4 file to be distributed, or the streaming information itself may be additionally recorded to the MP4 file to be distributed.

Eighth Embodiment

A description is given of an eighth embodiment of the present invention, using as an example a network camera that can change the way in which the streaming information is generated, either statically or, during execution, actively.

In the present embodiment, by providing setting information concerning the method of generating streaming control information to the streaming controller 2113, the streaming controller 2113 can change the generation plan and the generation form of the streaming information.

An example of the setting information provided to the streaming controller 2113 is shown in FIG. 47. For example, the "max_pdu_size" shown in the first line (2221) in FIG. 47 indicates the maximum size of the packet that the streaming controller 2113 generates. Based on this value, the streaming controller 2113 controls the division of the payload data. The "repeat" shown in the second line (2222) indicates whether or not the packet is to be transmitted multiple times in anticipation of a transmission error. Based on this value, the streaming controller 2113 sets a resend flag in the packet. The "approval_packet_loss" of the third line indicates the permissible packet loss rate (in percent). If the packet loss rate detected at the network I/F 2114 exceeds the designated packet loss rate, then the streaming controller 2113 sets the packet resend flag and otherwise increases resistance to error.

It should be noted that the setting information described above may be held as fixed data on the system ROM 2116 or as rewritable data in the external memory 2112 or the system RAM 2117. Alternatively, the setting information may be held as a table so that setting conditions suitable for the circumstances of distribution, such as the distribution mode, the state of network traffic and the number of sessions, may be selected. By so doing, the network camera shown in the present embodiment can carry out appropriate streaming even when the streaming information does not match the network environment actually adapted.

Ninth Embodiment

A description is given of a ninth embodiment of the present invention using an example of a network camera that generates streaming information when the distributed MP4 file is recorded.

Figure 48:
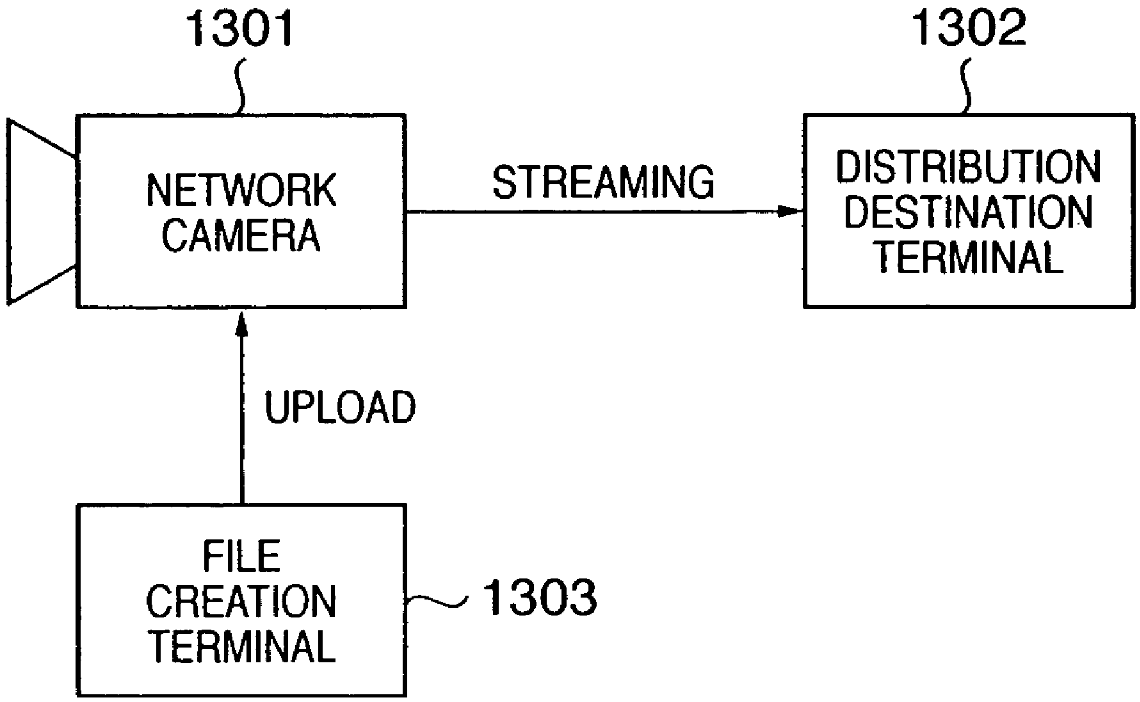
FIG. 48 is a schematic diagram showing the structure of an archetypical contents distribution system capable of adapting a ninth embodiment of the present invention.

It is assumed that the network camera of the present embodiment is used as a constituent element of a contents distribution system like that shown in FIG. 48. FIG. 48 is a schematic diagram showing the structure of an archetypical contents distribution system. In FIG. 48, a creator of the contents, by uploading a created MP4 file from a file creation terminal 1303 to a network camera 1301 that serves the function of a distribution server, can register the contents as a file to be distributed. The file creation terminal 1303 may be anything capable of transmitting a contents file to the network camera 1301. Moreover, the transmission path at upload may be a public network such as the Internet, a wireless transmission path such as Bluetooth, UWB, or IEEE 802.11, or a device-to-device connection external bus such as a USB or an IEEE1394.

The MP4 file registered in the network camera 1301 by the above-described upload process, can be viewed and its distribution requested from the distribution destination terminal 1302. In other words, the network camera 1301 streams the MP4 file in response to a distribution request from the distribution destination terminal 1302.

In the contents distribution system shown in FIG. 48, the network camera 1301 outputs streaming information to a file as shown in the third embodiment when it receives an uploaded MP4 file from the file creation terminal 1303. In the present embodiment, when the MP4 file is registered in the network camera 1301, only the generation of streaming information is carried out. In other words, the registered file is not distributed. After receiving a request for distribution from the distribution destination terminal 1302, the network camera 1301 uses the streaming information generated at registration of the MP4 file and distributes the requested file.

(Streaming Information Generation Process at File Registration)

Figure 49:
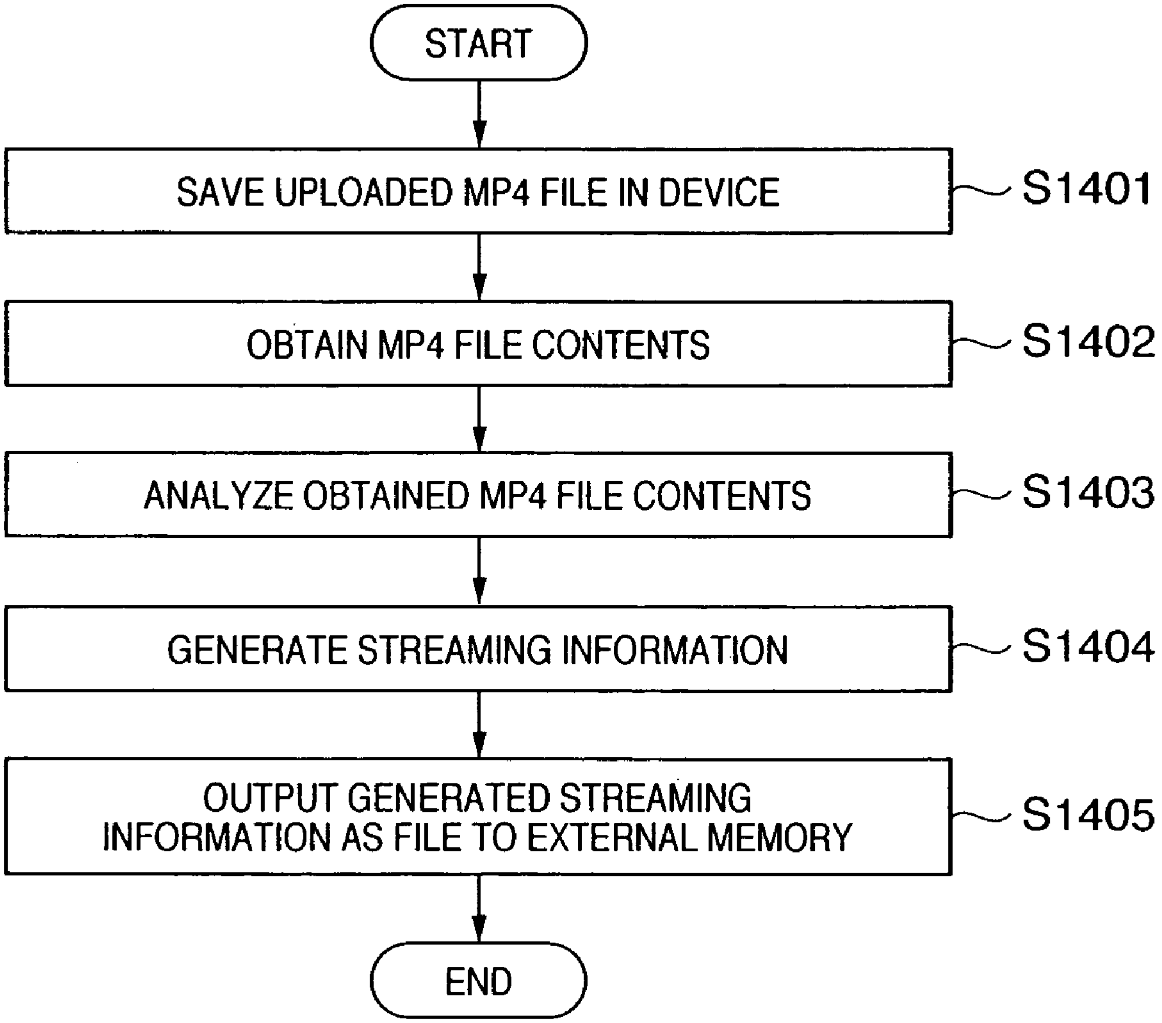
FIG. 49 is a flow chart showing steps in processing of the ninth embodiment.

A description is now given of the procedure for a streaming information generation process carried out when registering the file in the network camera of the present embodiment, using the flow chart shown in FIG. 49.

First, in a step S1401, the network camera 1301 accepts the MP4 file uploaded from the file creation terminal 1303 via the network I/F 2114 and saves the file in the external memory 2112 through the external memory I/F 2111. It should be noted it is not necessary that this process be carried out in tandem with the streaming distribution process, and therefore may be carried out by the system controller 2115 or some other control module that is not shown in the diagrams instead of by the streaming controller 2113. In that case, however, because the rest of the process is executed by the streaming controller 2113, the module that executes the process of step S1401 must notify the streaming controller 2113 by some means that the file has been registered.

Next, in a step S1402, the streaming controller 2113 obtains the contents of the MP4 file registered in step S1401 from the external memory 2112', analyzes the obtained MP4 file in a step S1403, and in a step S1404 generates the MP4 file streaming information. It should be noted that the processes of step S1402 to step S1404 (inclusive) are the same as the processes of from steps S201 to S203 (inclusive) shown in FIG. 29.

Then, in a step S1405, the streaming controller 2113 outputs the generated streaming information as a file. This file, as described in the seventh embodiment, is used for streaming distribution control when there is a request for distribution of the professed MP4 file. It should be noted that the process of step S1405 is the same as the process of step S1105 shown in FIG. 43.

With a network camera like that shown in this ninth embodiment of the present invention, even an MP4 file that was not originally created for streaming can be streamed without performing the additional operation of adding streaming control information to the MP4 file. Moreover, because the uploaded MP4 file data size is small, the load on the upload and the time needed for the upload can be reduced.

Tenth Embodiment

Figure 50:
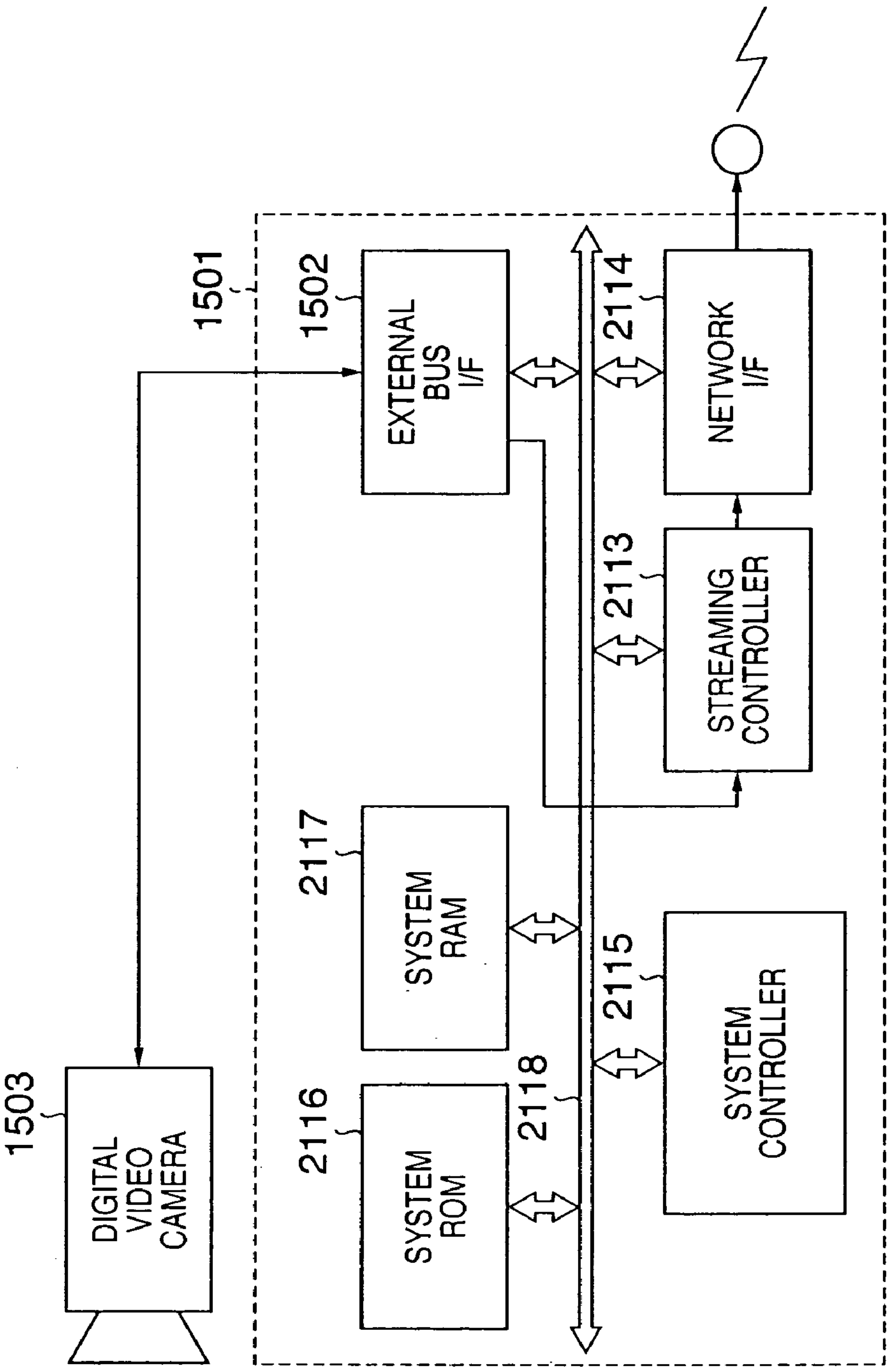
FIG. 50 is a block diagram showing the structure of a streaming server implementing processing according to a tenth embodiment of the present invention.

FIG. 50 is a block diagram showing the structure of a streaming server that provides streaming of multimedia contents according to a tenth embodiment of the present invention. The streaming server of the present embodiment is provided with the ability to obtain the MP4 file from a connected external apparatus and stream the file over a network.

In FIG. 50, the streaming server 1501, like the network camera of the first embodiment, is comprised of a streaming controller 2113, a network I/F 2114, a system controller 2115, a system ROM 2116 and a system RAM 2117. The constituent parts are interconnected by an internal bus 2118 and all parts are controlled by the system controller 2115. The streaming server 1501 is provided with an external bus I/F 1502 that provides a data input-output capability to a connected external device. In the present embodiment, it is assumed that a digital video camera 1503 adapted to a USB mass storage class is connected as the external apparatus.

The streaming controller 2113 obtains the MP4 file to be distributed from the digital video camera 1503 and, as with the first embodiment, generates RTP packets from the coded data obtained by multiplexing separation and streams same in RTP to the distribution destination terminal through the network I/F 2114.

It should be noted that the processing procedure described in the fifth through ninth embodiments of the present invention can also be adapted to a device configuration that accumulates MP4 files like that described above in an external apparatus (the streaming server 1501).

Eleventh Embodiment

Figure 51:
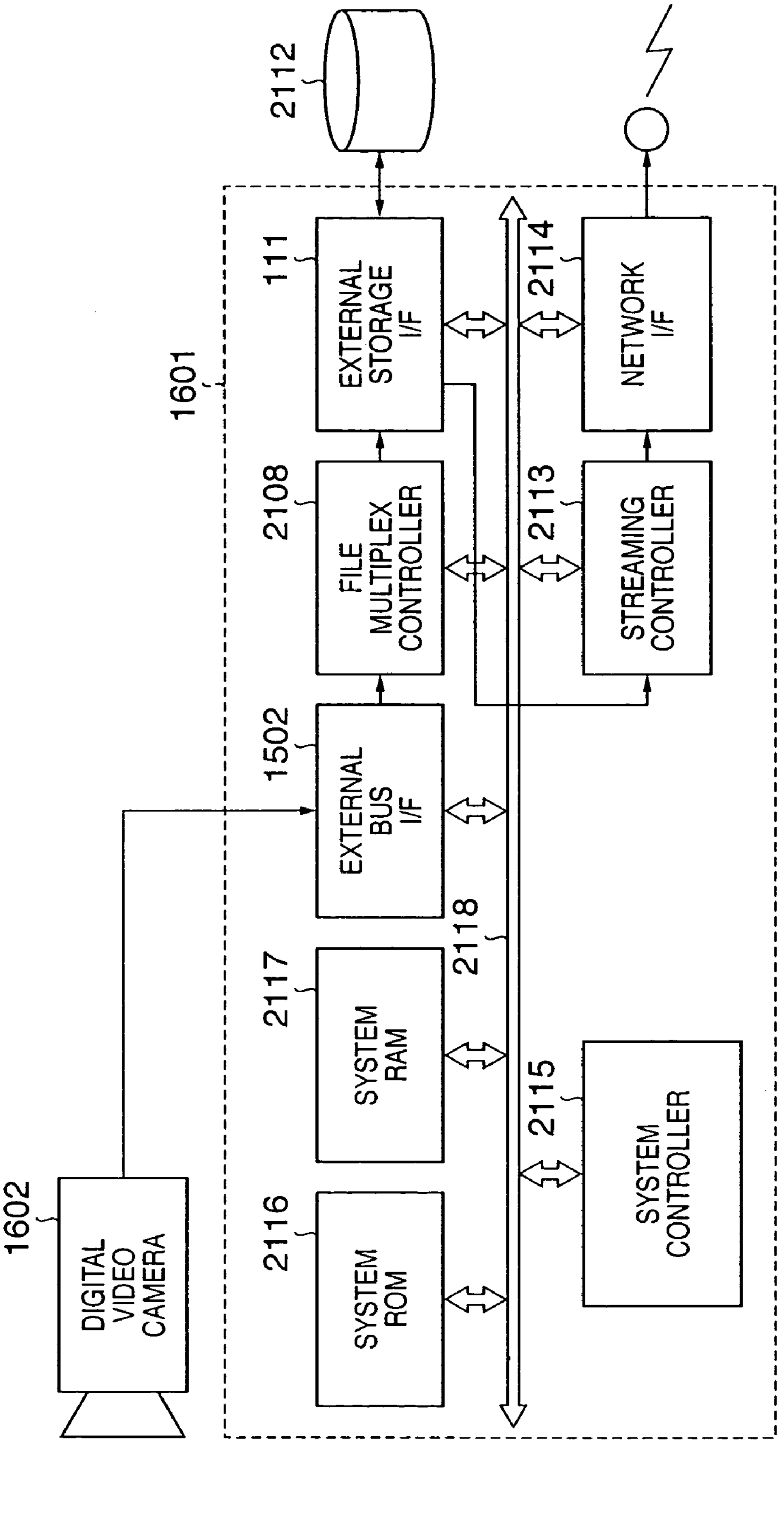
FIG. 51 is a block diagram showing the structure of a streaming server implementing processing according to an eleventh embodiment of the present invention.

FIG. 51 is a block diagram showing the structure of a streaming server according to an eleventh embodiment of the present invention. A streaming server 1601 of the present embodiment is provided with the capability to multiplex and to record as an MP4 file video data and audio data transmitted from a connected image-sensing apparatus and the capability to stream the recorded MP4 file over a network.

In addition to the streaming server 1501 of the tenth embodiment, the streaming server 1601 is further comprised of a file multiplex controller 2108 like that shown by the network camera of the fifth embodiment, an external memory I/F 2111 and an external memory 2112. Moreover, in the present embodiment, it is assumed that a digital video camera adapted to USB video class is connected as the image-sensing apparatus and that the sensed video and audio data is MPEG-4 encoded and transmitted by isochronous transport via USB.

When video and audio coded data sensed by the digital video camera 1602 is input to the streaming server 1601 through the external bus I/F 1502, like the network camera of the fifth embodiment, the file multiplex controller 2108, multiplexes the data into MP4 file format and outputs the MP4 file to the external memory 2112 through the external memory I/F 2111.

Furthermore, as with the fifth embodiment, the streaming controller 2113 obtains the MP4 file from the external memory I/F 2111, generates RTP packets by multiplexing separation, and streams the contents in RTP to the distribution destination terminal through the network I/F 2114.

Thus, as described above, the processing procedure described in the fifth through ninth embodiments can be applied as is to a device configuration (streaming server 1601) that does not have an image sensing capability.

Other Embodiments

The information generated with the present invention, by being processed into a format suitable for a given means of communication (that is, a device-to-device protocol) and a given data format, can provide the output of the present embodiment for other devices as well, over a network or other transmission path. In other words, the present invention may be applied to a system comprised of a plurality of devices or to an apparatus comprised of a single device.

According to the present invention, streaming can be carried out whether or not control information for distributing a file is contained in the file.

The objects of the present invention can be achieved by supplying a storage medium storing a software program that implements the functions of the foregoing embodiments to a system or apparatus, reading the supplied program code stored on the storage medium with a computer (or CPU or MPU) of the system or apparatus, and then executing the program code. In this case, since the program code read from the storage medium itself implements the functions of the above-described embodiment, the program code itself as well as the storage medium on which the program code is stored comprise the invention.

In addition, the invention includes not only the functions of the foregoing embodiment being implemented by a computer executing the read-out program code but also a case in which an OS (operating system) or the like running on the computer performs all or a part of the actual processing based on instructions of the program code, with the functions of the foregoing embodiment implemented by that processing.

Furthermore, the invention also includes a case in which, after the program read from the storage medium is written to a function expansion board inserted into the computer or to a memory provided in a function expansion unit connected to the computer, a CPU or the like mounted on the function expansion board or function expansion unit performs all or a part of the actual processing, with the functions of the foregoing embodiment implemented by that processing.

Where the present invention is adapted to a storage medium as described above, program code corresponding to the flow charts described above are stored on that storage medium.

According to embodiments 1-3, contents data written in MP4 or another, similar file format can be reproduced properly and stably in accordance with the sync control information.

According to the fourth embodiment, for example, object base coded contents written in MP4 or a similar file format can be properly reproduced at a reproduction terminal having an architecture established by MPEG-4.

According to embodiments 5-10, the contents creator only handles a single file regardless of whether streaming is to be carried out or not, and thus file management can be simplified. Moreover, the added task of adding streaming information to the file is no longer required, and therefore the work load on the contents creator can be lightened. Moreover, because redundant data is no longer attached, the time needed to upload to the streaming server can be shortened. Furthermore, even files that do not contain IOD, OD and BIFS data, for example, can be distributed in a format established by ISMA specifications so as to provide compatibility.

As many apparently widely different embodiments of the present invention can be made without departing fro the scope and spirit thereof, it is to be understood that the invention is not limited to the specific embodiments thereof except as defined in the appended claims.

CLAIM OF PRIORITY

This application claims priority from Japanese Patent Application No. 2003-385190 filed on Nov. 14, 2003, Japanese Patent Application No. 2003-385191 filed on Nov. 14, 2003, and Japanese Patent Application No. 2004-321444 filed on Nov. 5, 2004, which are hereby incorporated by reference herein.

What is claimed is:

1. A processing method for multimedia contents data containing data encoded in an object base, the method comprising:

an analysis step of analyzing the structure of the multimedia contents;

a conversion step of convening configuration information of a sync control field contained in the multimedia contents into configuration information associated with an internal structure of content data included in the multimedia contents, based on the structure of the multimedia contents analyzed in the analysis step; and a determination step of determining whether or not the structure of the configuration information converted in the conversion step is identical to the configuration information prior to conversion, and outputting the configuration information with the smallest data size if it is determined that the configuration information is identical.

2. The method according to claim 1, further comprising a determination step of determining whether or not to execute the conversion step based on a contents of the configuration information and a format of the contents data in the structure of the multimedia contents obtained in the analysis step.

3. The method according to claim 1, further comprising an extraction step of extracting one or more pieces of configuration information from the data contained in the multimedia contents, and wherein the conversion step converts the configuration information extracted in the extraction step.

4. The method according to claim 1, further comprising:

an identification step of identifying a control data stream containing one or more pieces of configuration information; and an extraction step of extracting configuration information from the control data stream, wherein the conversion step converts the configuration information contained in the control data.

5. The method according to claim 1, further comprising a transmission step of transmitting data containing configuration information after conversion in the conversion step to an external apparatus through a communications means.

6. The method according to claim 5, wherein the transmission step converts the data containing configuration information into a format established by a device-to-device communications protocol.

7. The method according to claim 1, wherein, if it is determined from the analysis results of the analysis step that a description for distribution control is not included in the multimedia contents, the conversion step includes a generation step of generating distribution control information based on the analysis results of the analysis step and converts the multimedia contents into a form that contains the distribution control information generated in the generation step.

8. The method according to claim 7, further comprising a distribution step of distributing to a network encoded contents data of the multimedia contents and the distribution control information obtained and generated in the conversion step.

9. The method according to claim 8, wherein:

the distribution control information contains information for establishing a session with a communications counterpart; and the distribution step establishes a session with the communications counterpart based on the distribution control information generated in the generation step and distributes the encoded contents data to the communications counterpart over the network.

10. The method according to claim 8, wherein the conversion step converts a description concerning an object having the multimedia contents into a description suited to a distribution protocol in the distribution step based on the analysis results.

11. The processing method according to claim 10, wherein, if information corresponding to the description of the distribution protocol does not exist in the multimedia contents data, the conversion step obtains a description adapted to the distribution protocol by revising a preset default description based on the analysis results.

12. The processing method according to claim 7, wherein the conversion step generates the distribution control information when transmission of the multimedia contents data is requested and distribution is carried out.

13. The method according to claim 8, further comprising a holding step of executing in advance the generation step for the multimedia contents and saving a relation between the generated distribution control information and the multimedia contents in an identifiable form, and wherein the distribution step, in response to an instruction to distribute the multimedia contents, reads the relevant distribution control information from a memory and distributes the multimedia contents based on the read distribution control information.

14. The method according to claim 7, wherein the generation step changes the distribution control information generation operation based on setting information.

15. The method according to claim 8, wherein the distribution step generates a packet based on the contents of the distribution control information.

16. A data processing apparatus for processing multimedia contents data containing data encoded in an object base, the apparatus comprising:

an analysis unit configured to analyze the structure of the multimedia contents;

a conversion unit configured to convert configuration information of a sync control field contained in the multimedia contents into configuration information associated with an internal structure of content data included in the multimedia contents, based on the structure of the multimedia contents analyzed by the analysis unit; and a determination unit configured to determine whether or not the structure of the configuration information converted by the conversion unit is identical to the configuration information prior to conversion, and output the configuration information with the smallest data size if it is determined that the configuration information is identical.

17. The apparatus according to claim 16, further comprising a determination unit configured to determine whether or not to execute the conversion unit based on a contents of the configuration information and a format of the contents data in the structure of the multimedia contents obtained by the analysis unit.

18. The apparatus according to claim 16, further comprising an extraction unit configured to extract one or more pieces of configuration information from the data contained in the multimedia contents, and wherein the conversion unit converts the configuration information extracted by the extraction unit.

19. The apparatus according to claim 16, further comprising:

an identification unit configured to identify a control data stream containing one or more pieces of configuration information; and an extraction unit configured to extract configuration information from the control data stream, wherein the conversion unit converts the configuration information contained in the control data.

20. The apparatus according to claim 16, further comprising a transmission unit configured to transmit data containing configuration information after conversion by the conversion unit to an external apparatus through a communications means.

21. The apparatus according to claim 20, wherein the transmission unit converts the data containing configuration information into a format established by a device-to-device communications protocol.

22. The apparatus according to claim 16, wherein, if it is determine from analysis results of the analysis unit that a description for distribution control is not included in the multimedia contents, the conversion unit includes a generation unit configured to generate distribution control information based on the analysis results of the analysis unit and converts the multimedia contents into a form that contains the distribution control information generated by the generation unit.

23. The apparatus according to claim 22, further comprising a distribution unit configured to distribute to a network encoded contents data of the multimedia contents and the distribution control information obtained and generated by the conversion unit.

24. The apparatus according to claim 23, wherein:

the distribution control information contains information for establishing a session with a communications counterpart; and the distribution unit establishes a session with the communications counterpart based on the distribution control information generated by the generation unit and distributes the encoded contents data to the communications counterpart over the network.

25. The apparatus according to claim 23, wherein the conversion unit converts a description concerning an object having the multimedia contents into a description suited to a distribution protocol in the distribution unit based on the analysis results.

26. The processing method according to claim 25, wherein, if information corresponding to the description of the distribution protocol does not exist in the multimedia contents data, the conversion unit obtains a description adapted to the distribution protocol by revising a preset default description based on the analysis results.

27. The processing method according to claim 22, wherein the conversion unit generates the distribution control information when transmission of the multimedia contents data is requested and distribution is carried out.

28. The apparatus according to claim 23, further comprising a holding unit configured to execute in advance the generation unit for the multimedia contents and save a relation between the generated distribution control information and the multimedia contents in an identifiable form, and wherein the distribution unit, in response to an instruction to distribute the multimedia contents, reads the relevant distribution control information from a memory and distributes the multimedia contents based on the read distribution control information.

29. The apparatus according to claim 22, wherein the generation unit changes the distribution control information generation operation based on setting information.

30. The apparatus according to claim 23, wherein the distribution unit generates a packet based on the contents of the distribution control information.

31. A computer-readable medium storing a control program for causing a computer to execute the data processing method according to claim 1.

* * * * *